US012674991B2

(12) United States Patent
Bobuk et al.

(10) Patent No.: US 12,674,991 B2
(45) Date of Patent: Jul. 7, 2026

(54) AUGMENTED-REALITY GLASSES TEMPLE ARM COMPONENTS, ARRANGEMENTS, AND ASSEMBLIES, AND SYSTEMS AND METHODS OF USE THEREOF

(71) Applicant: Meta Platforms Technologies, LLC, Menlo Park, CA (US)

(72) Inventors: Aaron Bobuk, Bellevue, WA (US); Aaron Tyler Nelson, West Linn, OR (US); Luke Jonathan Gilson, Bellevue, WA (US); Trevin Baker, Woodinville, WA (US); Yixing Shi, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/919,317

(22) Filed: Oct. 17, 2024

(65) Prior Publication Data

US 2025/0164810 A1      May 22, 2025

Related U.S. Application Data

(60) Provisional application No. 63/567,384, filed on Mar. 19, 2024, provisional application No. 63/601,698, filed on Nov. 21, 2023.

(51) Int. Cl.
*G02B 27/01* (2006.01)
*G06T 19/00* (2011.01)

(52) U.S. Cl.
CPC ........ *G02B 27/0176* (2013.01); *G06T 19/006* (2013.01); *G02B 2027/0178* (2013.01)

(58) Field of Classification Search
CPC ........ G02B 27/0176; G02B 2027/0178; G06T 19/006
See application file for complete search history.

(56) References Cited

U.S. PATENT DOCUMENTS

| | | | |
|---|---|---|---|
| 10,288,888 B2 | 5/2019 | Sugihara et al. | |
| 2006/0019614 A1* | 1/2006 | Yamasaki | G06F 1/1671 |
| | | | 348/E5.145 |
| 2007/0030442 A1* | 2/2007 | Howell | G02C 5/143 |
| | | | 351/158 |

(Continued)

OTHER PUBLICATIONS

International Search Report and Written Opinion for International Application No. PCT/US2024/055674, mailed Feb. 10, 2025, 9 pages.

*Primary Examiner* — Md Saiful A Siddiqui
(74) *Attorney, Agent, or Firm* — McDermott Will & Schulte LLP

(57) ABSTRACT

Temple arms of augmented-reality glasses are disclosed. An example temple arm includes a curved temple arm housing configured to couple to a frame of a pair of augmented-reality glasses. The curved temple arm housing has a head shaped curvature to contour a portion of the user's head. The curved temple arm housing includes a set of electronic components coupled within the head shaped curvature of the curved temple arm housing and an input device configure to control one or more electronic components positioned within the frame of the pair of AR glasses. The set of electronics including a speaker, a front battery cell and a rear battery cell. The speaker is positioned adjacent to a user's ear and between the front battery cell and the rear battery cell.

20 Claims, 21 Drawing Sheets

(56)        References Cited

U.S. PATENT DOCUMENTS

| | | | | |
|---|---|---|---|---|
| 2012/0050668 | A1* | 3/2012 | Howell | G02C 11/10 |
| | | | | 351/158 |
| 2012/0155064 | A1* | 6/2012 | Waters | A42B 1/242 |
| | | | | 362/103 |
| 2022/0236566 | A1* | 7/2022 | Kim | G03B 17/17 |
| 2022/0248572 | A1* | 8/2022 | Jung | G02B 27/01 |
| 2024/0103303 | A1* | 3/2024 | Shutzberg | G02C 11/10 |
| 2024/0219738 | A1* | 7/2024 | Shams | G02C 11/10 |
| 2024/0393614 | A1* | 11/2024 | Lau | G02C 11/10 |
| 2025/0199331 | A1* | 6/2025 | Li | G02C 5/008 |

* cited by examiner

137

135

117c

140

Curved temple arm
110

117b

113

141
Speaker

156

143

121

Adhesive

117a

AUGMENTED-REALITY GLASSES TEMPLE ARM COMPONENTS, ARRANGEMENTS, AND ASSEMBLIES, AND SYSTEMS AND METHODS OF USE THEREOF

RELATED APPLICATIONS

This application claims priority to U.S. Provisional Application Ser. No. 63/601,698, filed Nov. 21, 2023, entitled "Augmented-Reality Headset Temple Arm Components, Arrangements, And Assemblies, And Systems and Methods of Use Thereof," and U.S. Provisional Application Ser. No. 63/567,384, filed Mar. 19, 2024, entitled "Augmented-Reality Headset Temple Arm Components, Arrangements, And Assemblies, And Systems and Methods Of Use Thereof," which are each hereby incorporated herein by reference in their respective entireties.

TECHNICAL FIELD

This relates generally to augmented-reality glasses temple arms, including but not limited to techniques for forming the augmented-reality glasses temple arms and coupling electronic components within the augmented-reality glasses temple arms.

BACKGROUND

Existing augmented-reality glasses place a majority of electronic components in the frame and/or front display of the augmented-reality glasses. The placement of the electronic components in the frame and/or front display of the augmented-reality glasses is challenging due to compact form factors of these augmented-reality glasses units. Specifically, limited physical space to place electronic components, such as power sources and other components. The placement of the electronic components further leads to weight, balance, and/or temperature control issues. For example, the weight of the augmented-reality glasses can be concentrated on a user's face, which decreases comfort and and/or increase the likelihood that the augmented-reality glasses are knocked or fall from the user's face. Additionally, the frame of the augmented-reality glasses can experience high temperatures when all of the electronic components are active, which can create discomfort to a user if worn for extended periods of time.

As such, there is a need to address one or more of the above-identified challenges. A brief summary of solutions to the issues noted above are described below.

SUMMARY

The systems and methods disclosed herein provide one or more temple arms that house one or more electronics devices or components in a lightweight small form factor, such as glasses or glasses temple arms. The temple arms are water resistant (or waterproof) and provide structural support to protect the one or more electronic devices against impact (e.g., drops) and/or vibrations. The methods, systems, and devices described herein are configured to dispose one or more electronic components in a temple arm of a head-wearable device (e.g., augmented-reality glasses). By placing the electronic components in the temple arm, the methods, systems, and devices described herein evenly distribute the weight of the augmented-reality glasses such that the weight is not concentrated at a single portion of a user's face (e.g., nose and eyes portion of the face). Additionally, by evenly distributing the weight of the augmented-reality glasses, the methods, systems, and devices described herein allow for the augmented-reality glasses to be balanced such that they remain in place and are more comfortable to users while worn (e.g., do not move around or fall off the user's face when the user moves or the user and/or augmented-reality glasses are unintentionally bumped or contacted). Additionally, the temple arms have curved temple arm housings that improve user comfort and allow for the even distribution of components with the temple arms. The temple arms and their configurations are discussed in detail below.

The methods, systems, and devices described herein allow for improved thermal control of the augmented-reality glasses by disposing one or more electronic components within the temple arms of the augmented-reality glasses. Specifically, the methods, systems, and devices described herein distribute the heat generated by the electronic components of the augmented-reality glasses across the augmented-reality glasses (instead of being focused on a single location, such as the frames), which allows for a higher thermal design power or greater control of the temperature of the electronic components.

One example temple arm configured to couple with augmented-reality glasses is described herein. This example temple arm includes a curved temple arm housing that is configured to couple to a frame of a pair of augmented-reality glasses. The curved temple arm housing has a head shaped curvature to hug a portion of the user's head. More specifically, the curved temple arm housing contours a user's head to increase the amount of surface area and pull the front frame to the wearer's face. The curved temple arm housing includes a set of electronic components coupled within the head shaped curvature of the curved temple arm housing, the set of electronics including a speaker, a front battery cell (analogous to a power source 170; FIGS. 1A-3B) and a rear battery cell. The speaker is positioned adjacent to a user's ear and between the front battery cell and the rear battery cell, and an input device is configured to control one or more electronic components positioned within the frame of the pair of augmented-reality glasses.

Having summarized the first example temple arm above, a second example temple arm is now summarized.

Another example temple arm configured to couple with augmented-reality glasses includes one or more batteries, a speaker, one or more sensors, an external-environment-facing temple arm housing, and a skin-facing temple arm cover configured to couple with the external-environment-facing temple arm housing. The external-environment-facing temple arm housing includes a head shaped curvature to contour (or hug) a portion of the user's head when the temple arm is worn, a cavity opposite an external-environment-facing surface of the external-environment-facing temple arm housing, and one or more troughs for receiving an adhesive. The cavity is configured to hold the one or more batteries, the speaker, and the one or more sensors. The skin-facing temple arm cover includes a corresponding head shaped curvature to contour the portion of the user's head when the temple arm is worn, and one of more tabs. When the skin-facing temple arm cover couples with the external-environment-facing temple arm housing, the skin-facing temple arm cover (i) encases the cavity and (ii) the one of more tabs engage the one or more troughs forming a mechanical bond with an adhesive received within the one or more troughs. The trough and tabs are used to effectively increase an available adhesive surface area between the external-environment-facing housing and the skin-facing housing, which would otherwise be unavailable with a clamshell adhesive joint.

Having summarized the second example temple arm above, an example method of forming the temple arm is now summarized.

A yet another example temple arm configured to couple with augmented-reality glasses includes a curved temple arm housing having a head shaped curvature to contour a portion of the user's head, a plurality of ribs, and a set of electronic components coupled within the head shaped curvature of the curved temple arm housing. The plurality of ribs forms a planar surface for coupling one or more electronic components and includes one or more identifiable marking for guiding placement of the one or more electronic components. The set of electronics includes a speaker, a front battery cell and a rear battery cell. The plurality of ribs defines an area for placement of at least the front battery cell or the rear battery cell such that a position of the set of electronic components is predetermined.

Having summarized the third example temple arm above, an example method of forming the temple arm is now summarized.

One example method of forming the temple arm includes providing an external-environment-facing temple arm housing. The method includes coupling a set of electronic components within a cavity of the external-environment-facing temple arm housing and coupling a hinge assembly to an end of the external-environment-facing temple arm housing. The method further includes applying an adhesive over a portion of the cavity of the external-environment-facing temple arm housing and attaching a temple-facing temple arm housing cover to the external-environment-facing temple arm housing. The temple-facing temple arm housing cover and the external-environment-facing temple encase the set of electronic components and a portion of the hinge assembly.

The features and advantages described in the specification are not necessarily all inclusive and, in particular, certain additional features and advantages will be apparent to one of ordinary skill in the art in view of the drawings, specification, and claims. Moreover, it should be noted that the language used in the specification has been principally selected for readability and instructional purposes.

Having summarized the above example aspects, a brief description of the drawings will now be presented.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

Figure 1A:
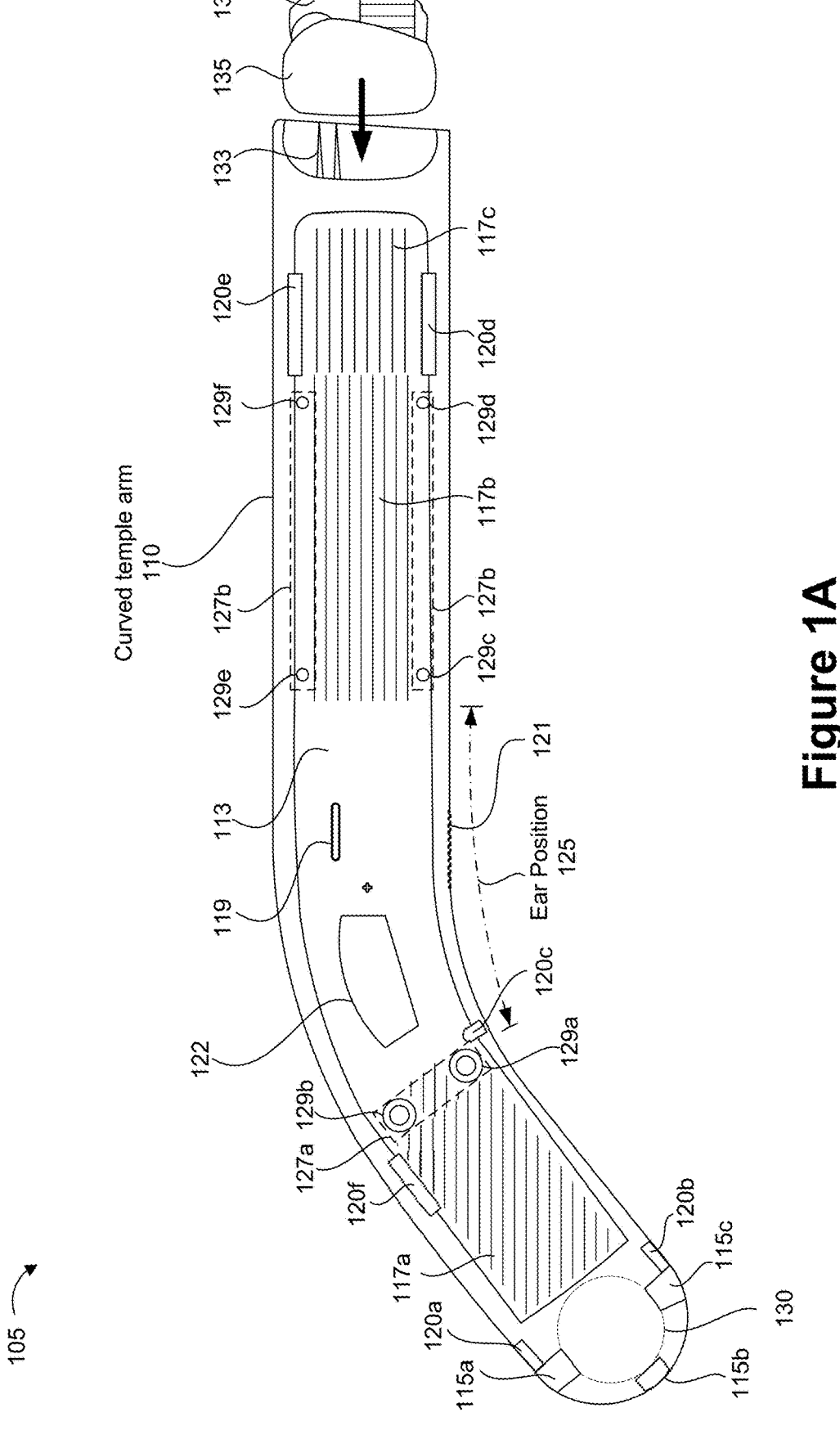
FIGS. 1A-1H illustrate a temple arm and one or more temple arm components, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

Embodiments of this disclosure can include or be implemented in conjunction with various types or embodiments of artificial-reality systems. Artificial-reality (AR), as described herein, is any superimposed functionality and or sensory-detectable presentation provided by an artificial-reality system within a user's physical surroundings. Such artificial-realities can include and/or represent virtual reality (VR), augmented reality, mixed artificial-reality (MAR), or some combination and/or variation one of these. For example, a user can perform a swiping in-air hand gesture to cause a song to be skipped by a song-providing API providing playback at, for example, a home speaker. An AR environment, as described herein, includes, but is not limited to, VR environments (including non-immersive, semi-immersive, and fully immersive VR environments); augmented-reality environments (including marker-based augmented-reality environments, markerless augmented-reality environments, location-based augmented-reality environments, and projection-based augmented-reality environments); hybrid reality; and other types of mixed-reality environments.

Artificial-reality content can include completely generated content or generated content combined with captured (e.g., real-world) content. The artificial-reality content can include video, audio, haptic events, or some combination thereof, any of which can be presented in a single channel or in multiple channels (such as stereo video that produces a three-dimensional effect to a viewer). Additionally, in some embodiments, artificial reality can also be associated with applications, products, accessories, services, or some combination thereof, which are used, for example, to create content in an artificial reality and/or are otherwise used in (e.g., to perform activities in) an artificial reality.

A hand gesture, as described herein, can include an in-air gesture, a surface-contact gesture, and or other gestures that can be detected and determined based on movements of a single hand (e.g., a one-handed gesture performed with a user's hand that is detected by one or more sensors of a wearable device (e.g., electromyography (EMG) and/or inertial measurement units (IMU) s of a wrist-wearable device) and/or detected via image data captured by an imaging device of a wearable device (e.g., a camera of a head-wearable device)) or a combination of the user's hands. In-air means, in some embodiments, that the user hand does not contact a surface, object, or portion of an electronic device (e.g., a head-wearable device or other communicatively coupled device, such as the wrist-wearable device), in other words the gesture is performed in open air in 3D space and without contacting a surface, an object, or an electronic device. Surface-contact gestures (contacts at a surface, object, body part of the user, or electronic device) more generally are also contemplated in which a contact (or an intention to contact) is detected at a surface (e.g., a single or double finger tap on a table, on a user's hand or another finger, on the user's leg, a couch, a steering wheel, etc.). The different hand gestures disclosed herein can be detected using image data and/or sensor data (e.g., neuromuscular signals sensed by one or more biopotential sensors (e.g., EMG sensors) or other types of data from other sensors, such as proximity sensors, time-of-flight sensors, sensors of an inertial measurement unit, etc.) detected by a wearable device worn by the user and/or other electronic devices in the user's possession (e.g., smartphones, laptops, imaging devices, intermediary devices, and/or other devices described herein).

As described herein, a temple arm is configured to couple to frames of augmented-reality glasses and configured to support the weight of the augmented-reality glasses when worn by a user. Specifically, the temple arms rest on the user's ears and coupled the augmented-reality glasses to the user's head. The methods and devices described herein include describe one or more components included in the temple arm as well as the formation of the temple arm. As described herein, a temple arm allows for one or more electronic components to be moved from the frame of the augmented-reality glasses to the temple arm. Additionally, the temple arms are light weight, water resistant (or waterproof), and impact resistant.

FIGS. 1A-1H illustrate a temple arm and one or more temple arm components, in accordance with some embodiments. The temple arm 100 (FIGS. 1G and 1H) is configured to (mechanically) couple with a frame of a pair of augmented-reality glasses. In particular, the frame of the pair of augmented-reality glasses is configured to couple with two temple arms 100 (e.g., a first temple arm and a second temple arm, opposite the first temple arm). The temple arms 100 and the frame of the pair of augmented-reality glasses include respective electronic components (e.g., one or more electronic components described below in reference to FIGS. 7A-7C) that are electrically and/or communicatively coupled when the temple arms 100 and the frame of the pair of augmented-reality glasses are coupled. The first temple arm, the second temple arm, and the frame of the pair of augmented-reality glasses, when coupled, are generally referred to as augmented-reality glasses.

As described below in reference to FIGS. 1A-1H, each temple arm 100 is formed of an external-environment-facing temple arm housing 105 and a skin-facing temple arm cover 190. The external-environment-facing temple arm housing 105 can be a curved temple arm housing 110 having a head shaped curvature to contour a portion of the user's head (e.g., when the temple arm 100 is worn). The head shaped curvature curved temple arm contour a user's head to increase the amount of surface area and pull the front frame to the wearer's face. The curved temple arm housing 110 (used synonymously with the external-environment-facing temple arm housing 105) is further configured to house one or more components as described below. Differences between the temple arms 100 coupled with the frame of the pair of augmented-reality glasses (e.g., the first temple arm and the second temple arm), when present, are identified below.

FIG. 1A shows a cavity 113 of the curved temple arm housing 110. The cavity 113 is opposite the external-environment-facing surface of the curved temple arm housing 110. More specifically, the cavity 113 is an inner surface of the curved temple arm housing 110 that is not exposed to the external environment and does not contact a portion of a user's skin. The cavity 113 is configured to hold a set of electronic components, such as one or more power sources 170 (e.g., batteries, battery packs, or battery cells), one or more speakers 145, one or more microphones 150, and one or more sensors (e.g., an inertial measurement unit (IMU) 153, a proximity sensor 155, a temperature sensor 151, etc.). Different temple arms 100 can have the same or distinct sets of electronic components. The different electronic components and/or different positions of the electronic components of the set of electronic components are described below in reference to FIGS. 1B-1F. The cavity 113 can further include an audio channel 121, a deck mount 122, one or more pluralities of ribs 117, and one or more pluralities of alignment points 127, each of which is discussed in detail below.

The audio channel 121 can be a speaker port adjacent to an ear position 125 and at a bottom portion of the temple arm 100 (e.g., a direct port) that allows representations of audio data generated by a speaker 145 (FIG. 1C) to be presented directly to a user. In some embodiments, an additional audio channel 119 is at a side portion of the curved temple arm housing 110 that allows representations of audio data generated by the speaker 145 (FIG. 1C) to be presented outside of the temple arm 100. Alternatively, in some embodiments, an additional audio channel is at a top portion of the curved temple arm housing 110 (not shown). The ear position 125 is a general location of the temple arm 100 at which a user's ear supports the temple arm 100 when the augmented-reality glasses are worn. The audio channel 121 allows representations of audio data generated by the speaker 145 to be presented outside of the temple arm 100 and directed to the user's ear. In some embodiments, the audio channel 121 and the additional audio channel 119 are individually configured to couple to the temple arm 100 via rings of adhesive (e.g., a pressure sensitive adhesive or other glue) as described in detail below.

The one or more pluralities of ribs 117 form planar mounting surfaces for one or more electronic components of the set of electronic components. The planar mounting surfaces formed by the one or more pluralities of ribs 117 provide a substantially uniform flat surface for coupling electronic components to the curved temple arm housing 110. For example, a first plurality of ribs 117a forms a first planar mounting surface for coupling a first power source 170a to the curved temple arm housing 110, a second plurality of ribs 117b forms a second planar mounting surface for coupling a second power source 170b to the curved temple arm housing 110, and a third plurality of ribs 117c forms a third planar mounting surface for coupling additional circuitry (e.g., a rigid flex printed circuit assembly (RFPCA) s and included components) to the curved temple arm housing 110. In some embodiments, the RFPCA 160 (FIG. 1D) is coupled to the one or more pluralities of ribs 117 and other electrical components are coupled to the curved temple arm housing 110 via the RFPCA 160. For example, as shown in FIGS. 1D and 1E, an RFPCA 160 is coupled to the first, second, and third pluralities of ribs 117a, 117*b*, and 117*c*, and the first and second power sources 170*a* and 170*b* are coupled to the RFPCA 160 (e.g., on top of the RFPCA 160). In some embodiments, the one or more pluralities of ribs 117 form planar mounting surfaces for specific electronic components of the set of electronic components, such as power sources 170 and/or the RFPCA 160. The one or more pluralities of ribs 117 can form the same or distinct planar mounting surfaces. For example, the planar mounting surfaces can have the same or distinct shapes, size, surface area, etc. Similarly, the one or more pluralities of ribs 117 can be the same or distinct. For example, the pluralities of ribs 117 can have the same or distinct rib separation, rib height, rib orientation, rib thickness, etc. In some embodiments, the configurations of the one or more pluralities of ribs 117 (e.g., rib height, rib thickness, rib separation, etc.) are based on a curvature of the curved temple arm housing 110 such that planar mounting surfaces can be formed within the cavity 113. In some embodiments, each plurality of ribs 117 have predetermined dimensions. For example, a plurality of ribs 117 can have a predetermined height (e.g., 0.6 mm (+/−0.02 mm)) and a predetermined width (0.8 mm (+/−0.02 mm))

The pluralities of ribs 117 can be used to guide placement of one or more electronic components of the set of electronic components. In particular, the plurality of ribs 117 can form visible regions on which at least one electronic component is placed. For example, the pluralities of ribs 117 can be positioned such that the power sources 170 are positioned at a rear and a front portion of the curved temple arm housing 110. Similarly, the pluralities of ribs 117 can be positioned such that the speaker 145 is positioned between the power sources 170 and the speaker is adjacent to the ear position 125. For example, as described below in reference to FIG. 1E, the first power source 170*a* is positioned over the first plurality of ribs 117*a* at a rear portion of the curved temple arm housing 110, the second power source 170*b* is positioned over the second plurality of ribs 117*b* at a front portion of the curved temple arm housing 110, and the first and second pluralities of ribs 117*a* and 117*b* are spaced at least a width of the speaker 145 (or the ear position 125 distance). In some embodiments, the plurality of ribs 117 are positioned based on a size of the curved temple arm housing 110 and/or configuration of the temple arm 100. Additionally, because of the limited space within the temple arm 100, size of the set of electronic components, and/or cooling requirements of the set of electronic components, the pluralities of ribs 117 allow for accurate and consistent manufacturing of the temple arm 100.

The one or more pluralities of alignment points 127 are associated with one or more of the one or more pluralities of ribs 117. In some embodiments, each alignment point 129 of a plurality of alignment points 127 is positioned at a distinct corner of a respective plurality of ribs 117 (or the planar mounting surface). For example, a first plurality of alignment points 127*a* is associated with the first plurality of ribs 117*a* and each alignment point 129*a* and 129*b* is positioned at respective corners of the first plurality of ribs 117*a*; and a second plurality of alignment points 127*b* is associated with the second plurality of ribs 117*b* and each alignment point 129*c*-129*f* is positioned at respective corners of the second plurality of ribs 117*b*. The plurality of alignment points 127 are used to identify a location for coupling at least one electronic component of the set of electronic components to the curved temple arm housing 110. In particular, the plurality of alignment points 127 operate as markers or identifiers that are used by a computer vision system to identify a location for placing at least one electronic component. In other words, a computer vision system can detect one or more alignment points of the plurality of alignment points 127 and use the alignment points to guide the placement of at least one electronic component, such as a power source 170 (e.g., a battery cell). The plurality of alignment points 127 are used to place and align an electronic component within 50 microns of a predetermined location. In some embodiments, users (e.g., manufacturers, repairmen, etc.) can visually inspect the position of the alignment points to guide their placement of at least one electronic component.

Although the above examples describe use of the pluralities of ribs 117 or the plurality of alignment points 127 to place at least one electronic component, a combination of the pluralities of ribs 117 and the plurality of alignment points 127 can be used to guide placement of the set of electronic components. Similarly, other portions of the curved temple arm housing 110 can be used alone or in combination with the pluralities of ribs 117 and/or the plurality of alignment points 127 to guide placement of the set of electronic components. For example, one or more troughs 120 and/or one or more tab-inserts 115 can be used alone or in conjunction with the pluralities of ribs 117 and/or the plurality of alignment points 127 to guide placement of the set of electronic components.

Figure 3A:
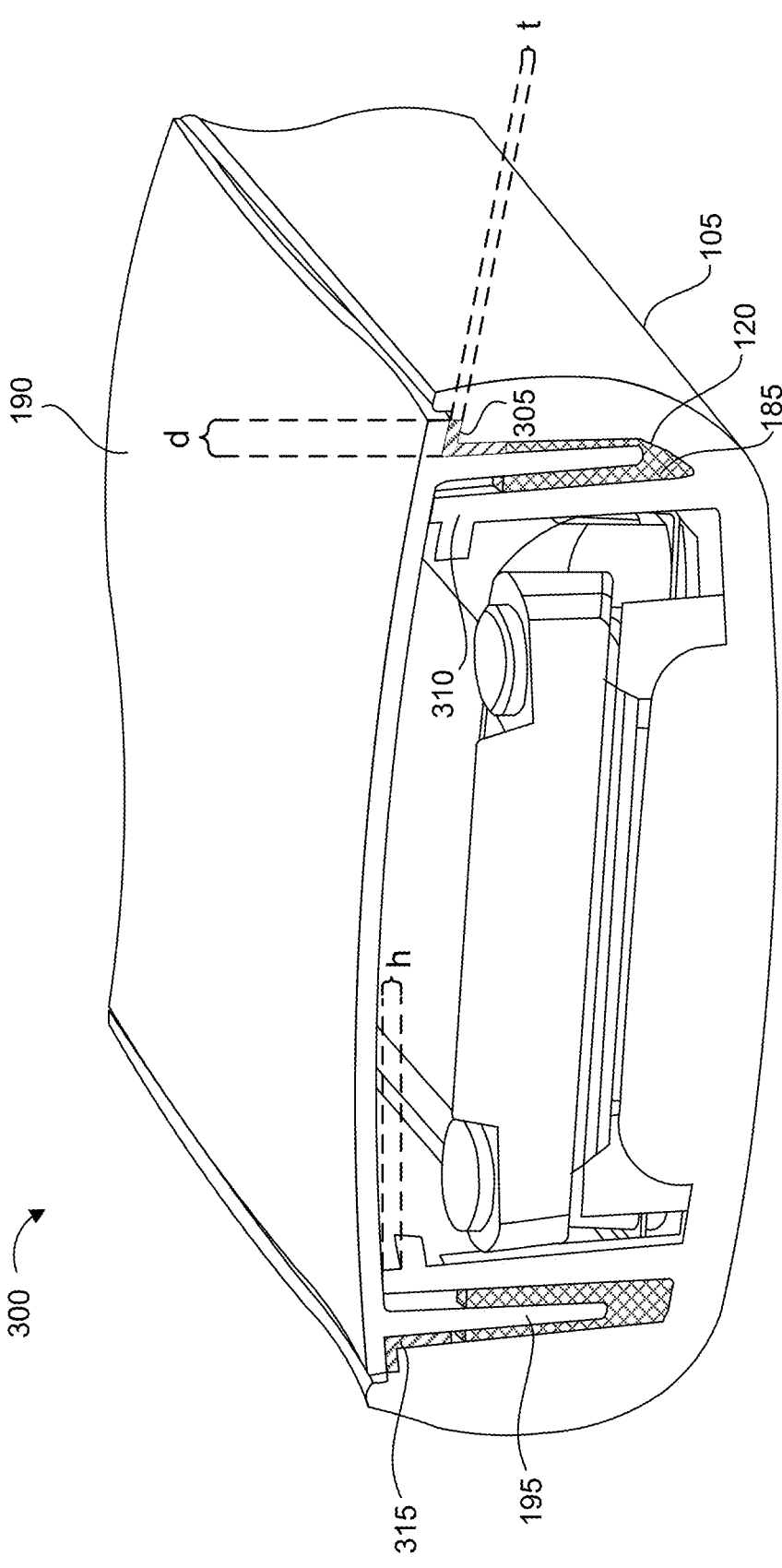
FIGS. 3A and 3B illustrate cross sections of the temple arm, in accordance with some embodiments.
Figure 3B:
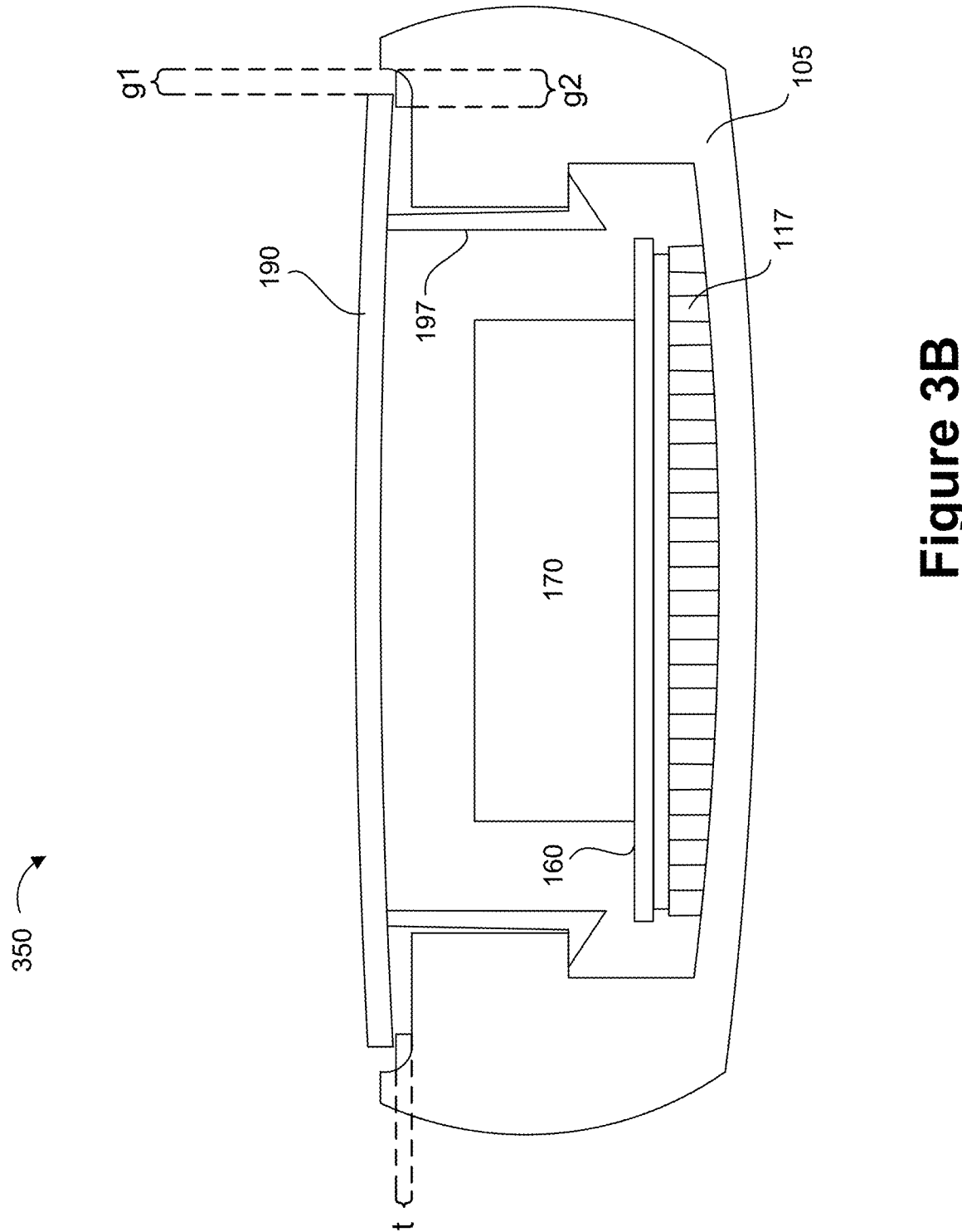

The curved temple arm housing 110 includes one or more troughs 120 that are configured to receive an adhesive 185. The one or more troughs 120, after receiving the adhesive 185, are further configured to receive one or more insert-ribs 195 of a skin-facing temple arm cover 190 (FIG. 1F) such that the adhesive 185 bonds the one or more insert-ribs 195 of the skin-facing temple arm cover 190 to the one or more troughs 120. The adhesive 185, as discussed below in reference to FIGS. 1F, 3A, and 3B, is configured to affix the skin-facing temple arm cover 190 to the external-environment-facing temple arm housing 105. Additionally, the adhesive, when cured, is configured to form a hermetic seal at the junction between the skin-facing temple arm cover 190 and the external-environment-facing temple arm housing 105. In some embodiments, the curved temple arm housing 110 includes a predetermined number of troughs 120 (e.g., at least one trough, at least four troughs, at least seven troughs, etc.). For example, as shown in FIG. 1A, the curved temple arm housing 110 includes at least six troughs 120*a*-120*f*.

The curved temple arm housing 110 includes one or more tab-inserts 115. The one or more tab-inserts 115 are configured to receive one or more snap tabs 197 (e.g., tabs with a hook at an end) of the skin-facing temple arm cover 190 (FIG. 1F). The snap tabs 197, when received by the tab-inserts 115, couple to a portion of the curved temple arm housing 110 mechanically affixing the skin-facing temple arm cover 190 to the external-environment-facing temple arm housing 105. The snap tabs 197 keep the skin-facing temple arm cover 190 coupled to the external-environment-facing temple arm housing 105 while the adhesive 185 cures. Coupling of the one or more snap tabs 197 with the one or more tab-inserts 115 and/or the curved temple arm housing 110 is discussed in detail below in reference to FIGS. 1F, 3A, and 3B. In some embodiments, the curved temple arm housing 110 includes a predetermined number of tab-inserts 115 (e.g., at least one tab-insert, at least three tab-inserts, etc.). For example, as shown in FIG. 1A, the curved temple arm housing 110 includes at least three tab-inserts 115*a*-115*c*.

The curved temple arm housing 110 includes a power device mount 130. The power device mount 130 is configured to couple with one or more components based on the temple arm 100 configuration. Specifically, a power device mount 130 of the first temple arm can be configured to couple with one or more first components (e.g., a power input device 142, such as a power button; FIG. 1H) and a power device mount 130 of the second temple arm can be configured to couple with one or more second components (e.g., a power input connector 144, such as a power charger connector; FIG. 1H). In some embodiments, the first temple arm includes the power input device 142 and the second temple arm includes the power input connector 144. Alternatively, in some embodiments, the first temple arm includes the power input connector 144 and the second temple arm includes the power input device 142. The power input device 142 and/or the power input connector 144 are coupled to tip-end portions of the respective curved temple arm housings 110 (e.g., the tip-end portion of the curved temple arm housing opposite the hinge mount 135 and/or adjacent to a rear power source (e.g., a first power source 170a)). Alternatively, in some embodiments, the power input connector 144 is coupled to a surface (e.g., a side surface) of the respective curved template arm housings 110.

The power input device 142, when coupled with the power device mount 130, is partially exposed (e.g., via the external-environment-facing temple arm housing 105) such that a user can provide a user input via the external-environment-facing temple arm housing 105 (e.g., on a side surface of the temple arm 100 opposite a surface that contacts the user's head). For example, the user can contact or actuate the power input device 142 on an outer surface of the temple arm 100 to power or wake (e.g., transition from a stand-by or sleep mode to an active mode) the augmented-reality glasses. In some embodiments, power input device 142 can be a button, a switch, a slider, a knob, a capacitive touch surface, etc. The power input device 142 can include an actuator, a spring, and/or a button bracket. For example, power input device 142 can be a power button that includes an actuator and a stamped spring against the temple housing such that when the user actuates the power button, the user receives mechanical feedback that the button has been pressed. In some embodiments, the stamped spring can be replaced with a foam (configured to operate as a spring). In some embodiments, when the user actuates the power input device 142, the power input device 142 turns on the power to both temple arms 100 as well as the frame and lenses of the pair of augmented-reality glasses.

The power input connector 144, when coupled with the power device mount 130, is partially exposed such that a power cable, power coupler, data connector, and/or other connector can couple with the power input connector 144. The power input connector 144 is configured to receive usable power for powering one or more electronic components of the temple arm 100 and, when coupled, the frame of the pair of augmented-reality glasses and/or another temple arm. In addition, the power input connector 144 can be configured to transfer data to and/or from the temple arm 100 (and/or other coupled devices, such as the frame of the pair of augmented-reality glasses, the other temple arm, laptops, tablets, smartphones, etc.). For example, the power input connector 144 can be a plurality of pogo pins at least partially exposed on or accessible via the external-environment-facing temple arm housing 105 that are configured to couple with a cable that transfers data and/or provides usable power to the temple arm 100, as well as the frame of the pair of augmented-reality glasses and/or other temple arm when coupled with the temple arm 100. Alternatively, the power input connector 144 can be a USB port (e.g., a USB-C port)

at least partially exposed on or accessible via the external-environment-facing temple arm housing 105 such that a USB cable can be coupled with the temple arm 100 to transfer data and/or provide usable power to the temple arm 100, as well as the frame of the pair of augmented-reality glasses and/or other temple arm when coupled with the temple arm 100. In some embodiments, the power input connector 144 is an electrical receptacle (e.g., type C receptacle).

Each temple arm 100 is configured to couple with the frame of the pair of augmented-reality glasses via a hinge mount 135 and a hinge assembly 137. In particular, the curved temple arm housing 110 receives and couples with the hinge mount 135, the hinge mount 135 couples with the hinge assembly 137, and the hinge assembly 137 couples with the frame of the pair of augmented-reality glasses. The curved temple arm housing 110 includes one or more alignment ribs 133 for receiving the hinge mount 135 and the hinge mount 135 can include a spherical surface for receiving the hinge assembly 137. The one or more alignment ribs 133 are positioned at a front-end portion of the curved temple arm housing 110 and are configured to guide the hinge mount 135 within a portion of the curved temple arm housing 110. Specifically, the hinge mount 135 is configured to slide into the curved temple arm housing 110 via the one or more alignment ribs 133. The one or more alignment ribs 133 align and hold the hinge mount 135 in a predetermined position (e.g., parallel with the curved temple arm housing 110). In some embodiments, the temple arm 100 may include additional mechanisms (e.g., spherical joints) for adjustability. In some embodiments, the interface between the one or more alignment ribs 133 and the hinge mount 135 can include an adhesive (e.g., glue) for increasing the rigidity of the temple arm (e.g., up to a 5% increase overall in torsional rigidity of the temple arm).

The hinge mount 135 and/or the hinge assembly 137 can include one or more channels for routing one or more wires or electrical connectors for communicatively coupling the set of electronic components of the curved temple arm housing 110 with the electronic components within the frame of the pair of AR glasses and/or another temple arm. For example, the one or more channels can route one or more wires that communicatively couple the one or more power sources 170, the one or more speakers 145, the one or more sensors, etc. of the curved temple arm housing 110 with one or more components of the frame of the pair of augmented-reality glasses, such as a display, a projector, an imaging device, and/or other components.

In some embodiments, the hinge mount 135 can be configured to receive an adhesive that bonds the hinge mount 135 to the curved temple arm housing 110. The hinge mount 135 and adhesive can form an airtight seal between the curved temple arm housing 110, the hinge assembly 137, and the frame of the pair of augmented-reality glasses. In other words, the adhesive fills in gaps to reduce and/or prevent liquid and/or dust from entering the temple arm 100, hinge assembly 137, and/or the frame of the pair of augmented-reality glasses. In some embodiments, the one or more alignment ribs 133 keep the hinge mount 135 at the predetermined position while an applied adhesive cures to create an airtight seal.

The hinge assembly 137 couples with the hinge mount 135 and the frame of the pair of augmented-reality glasses. The hinge assembly 137 is configured to allow different adjustments to the augmented-reality glasses. The hinge assembly 137 allows for adjustments to the augmented-reality glasses in the x-axis, y-axis, and/or z-axis. For example, the hinge assembly 137 can be used to adjust a first rotation or first angle of the temple arm 100 with respect to the frame of the pair of augmented-reality glasses, and/or a second rotation or second angle of the temple arm 100 with respect to the frame of the pair of augmented-reality glasses. The hinge assembly 137 allows the user to adjust the temple arms 100 such that the user's ear supports the temple arms 100 via ear position 125. In some embodiments, the hinge assembly 137 is capable of adjusting a length of the temple arm 100. In some embodiments, the hinge assembly 137 allows for adjustments associated with other mechanisms of the pair of augmented-reality glasses to accommodate users' different head sizes, nose bridge positions, and/or interpupillary distances.

Figure 1B:

FIG. 1B shows the curved temple arm housing 110 including an acoustic mesh 143. In some embodiments, a wire or an acoustic mesh 143 is coupled to each of the audio channel 121 and the additional audio channel 119. The acoustic mesh 143 is selected based on its properties to filter exterior particles and/or contaminations. In some embodiments, the acoustic mesh 143 is a hydrophobic mesh configured to repel water, dust, and/or other contaminants. In some embodiment, the acoustic mesh is optional. In some embodiments, the acoustic mesh 143 is coupled to the curved temple arm housing 110 via a speaker adhesive 141 (e.g., a pressure-sensitive adhesive as described below).

The speaker adhesive 141 can be a pressure-sensitive adhesive applied to a portion of the cavity 113. In some embodiments, the speaker adhesive 141 application is based on the size and/or shape of the speaker 145. For example, as shown in FIG. 1B, the speaker adhesive 141 is applied as a square outline, which is the outer perimeter of the speaker 145. In some embodiments, the speaker adhesive 141 is applied to a minimal portion of the cavity 113 (e.g., speaker 145 the perimeter or a speaker housing perimeter) to prevent interference with the speaker 145 and/or to avoid increasing a size (e.g., thickness) and/or weight of the temple arm 100. In some embodiments, the curved temple arm housing 110 includes one or more mounting fixtures 156 (e.g., rises, posts, screw holes, anchor holes, etc.) for coupled the speaker 145 or speaker case thereto. As discussed below in reference to FIG. 1C, the speaker 145 (or speaker case) can be coupled to the curved temple arm housing 110 via the speaker adhesive 141, a fastener (e.g., a screw, anchor, etc.), or both. In some embodiments, the speaker adhesive 141 is replaced by or used in conjunction with a liquid silicone rubber gasket to form a hermetic seal.

The speaker adhesive 141 is applied adjacent to the ear position 125 (FIG. 1A) such that the speaker 145 is near the user's ear. In some embodiment, the speaker adhesive 141 is placed between the first and second pluralities of ribs 117a and 117b such that the speaker 145 is positioned between the two electrical components. For example, the speaker adhesive 141 can be applied to the cavity 113 such that the speaker 145 is between the first power source 170a and the second power source 170b. Although the temple arm 100 shown in FIGS. 1A-1H includes at least two power sources 170, in some embodiments, the temple arm 100 can include one power source or more than two power sources. In some embodiment, the speaker adhesive 141 is used to isolate the audio channel 121 from the additional audio channel 119 and to further protect each speaker port from water, dust, or other external contaminants. Specifically, the speaker adhesive 141 is configured to isolate the two speaker ports and prevent dust/water ingress into the temple arm and/or speaker if water and/or dust enter the temple arm via the membrane or mesh 143 (e.g., a ring of adhesive around the additional audio channel 119 (e.g., a rear port) and another ring of adhesive around the audio channel 121 (e.g., a direct port, which points downward)).

The temple arm 100 can include an input device 140. The input device 140 can be a privacy slider 147 or a capture switch 148, as shown and described below in reference to FIG. 1H. The input device 140 positioned at a front-end portion of the curved temple arm housing 110 adjacent to the hinge mount 135 and the hinge assembly 137. In some embodiments, a first temple arm includes the privacy slider 147 and the second arm includes the capture switch 148. Alternatively, in some embodiments, the second temple arm includes the privacy slider 147 and the first arm includes the capture switch 148. In some embodiments, the input device 140 is positioned at a bottom portion of the curved temple arm housing 110 (e.g., on a portion of the surface including the ear position 125). For example, as shown in FIG. 1B, the input device 140 is positioned at a bottom-front-end portion of the curved temple arm housing 110.

The input device 140 is configured to control one or more electronic components of the augmented-reality glasses. For example, input device 140 can be a privacy slider 147 that, when actuated, is configured to disable or enable (e.g., mechanically or via one or more instructions provided to one or more processors) audio and/or image capturing devices of the two temple arms and/or the frame of the pair of augmented-reality glasses. Alternatively, the input device 140 can be point-of-view (POV) camera capture switch 148 that, when actuated, initiate or terminate operation of an imaging device communicatively coupled with the augmented-reality glasses (e.g., capture a still image, one or more images, video, etc.). In some embodiments, the input device 140, when actuated, provides a user with auditory, visual, and/or haptic feedback. For example, actuating of the privacy slider 147 can include a tactile bump sensation, an audible "click," and/or cause presentation of an associated indicator (e.g., a struck-through camera and/or microphone icon).

As further shown in FIG. 1B, the hinge mount 135 and the hinge assembly 137 are coupled with the curved temple arm housing 110. Specifically, the hinge mount 135 is inserted in the curved temple arm housing 110 and the hinge assembly 137 is coupled to the hinge mount 135 (e.g., ball or spherical surface of the hinge assembly 137 is received via a corresponding spherical surface of the hinge mount 135). As described above, the hinge mount 135 and the hinge assembly 137 form an airtight seal when coupled with the curved temple arm housing 110.

Figure 1C:
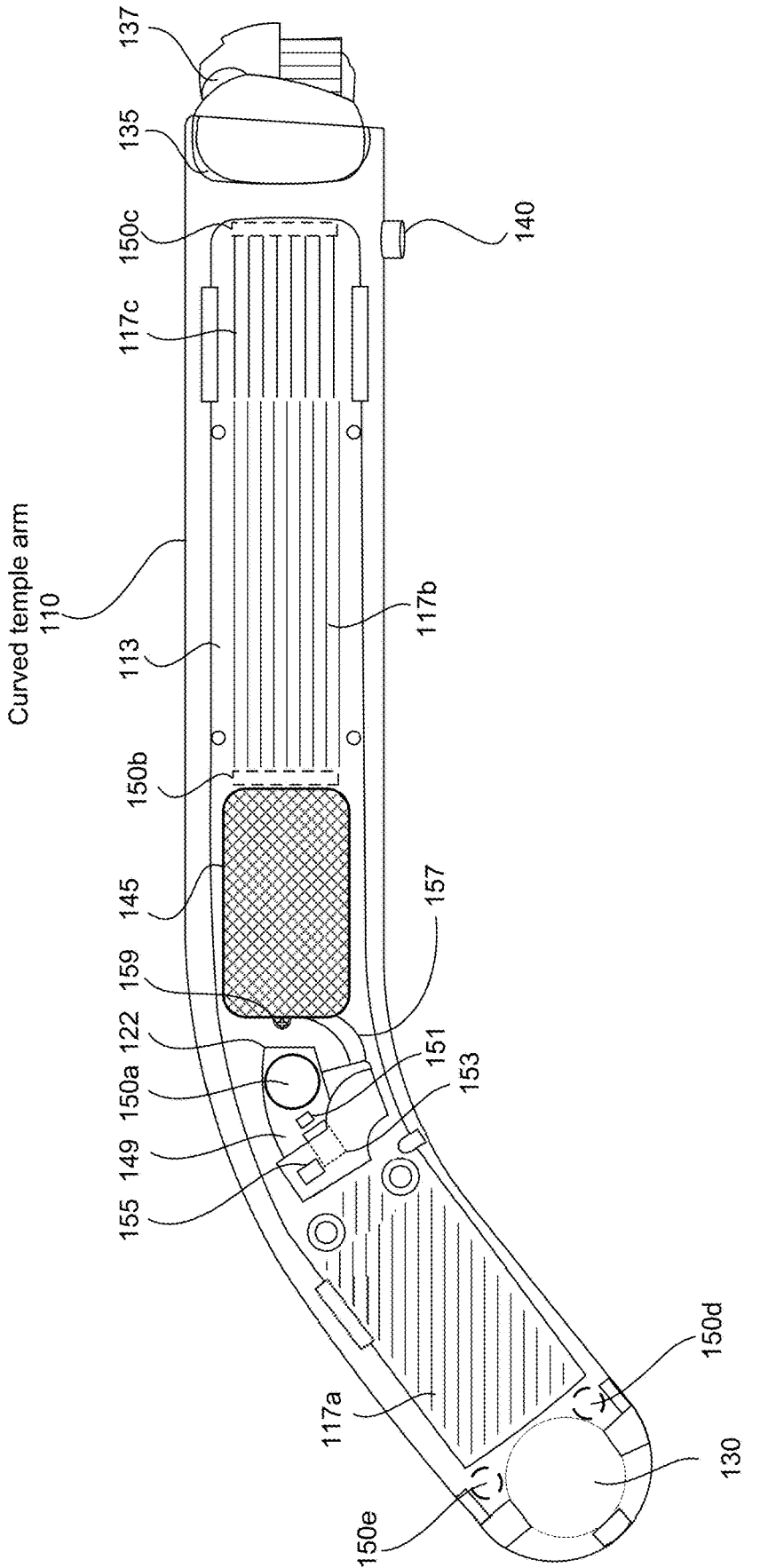
Figure 1D:
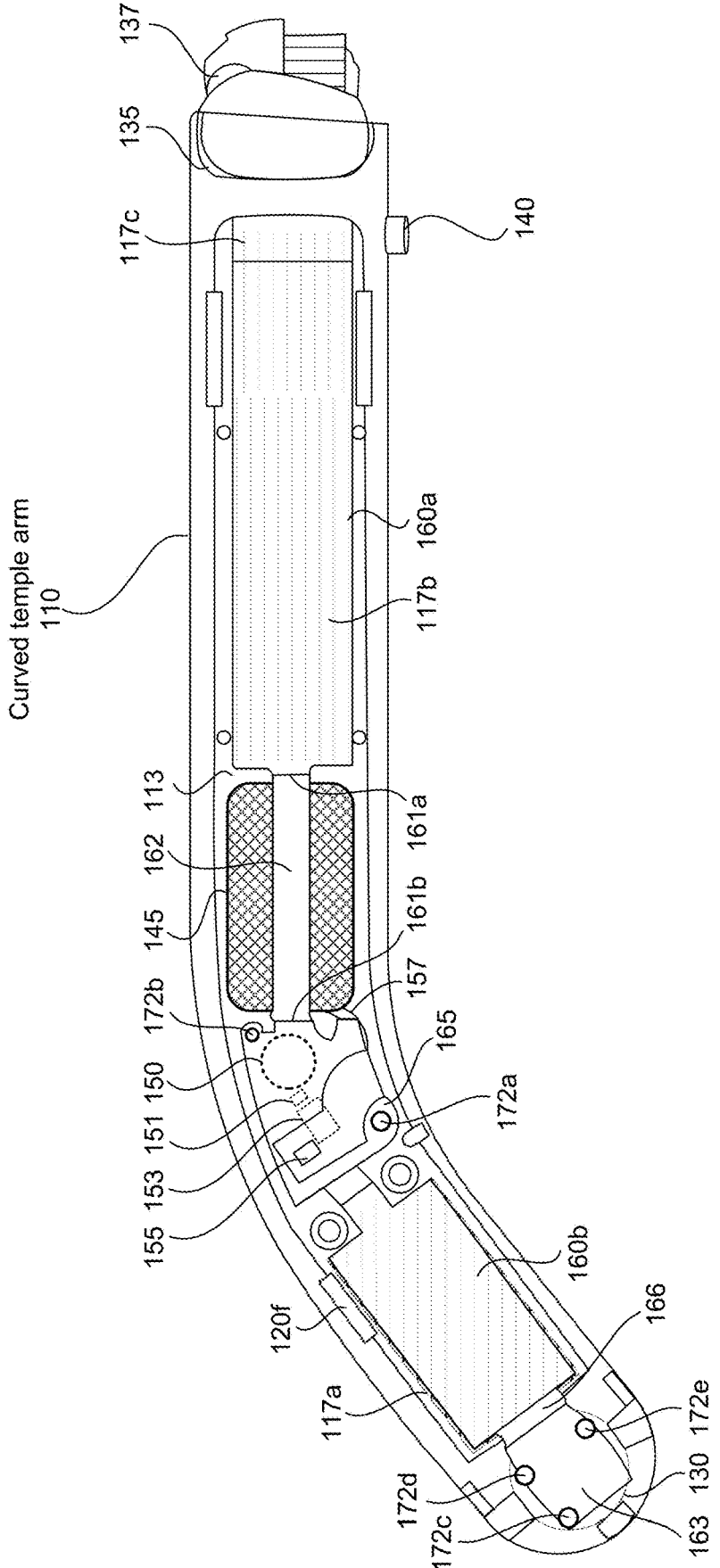
Figure 1E:
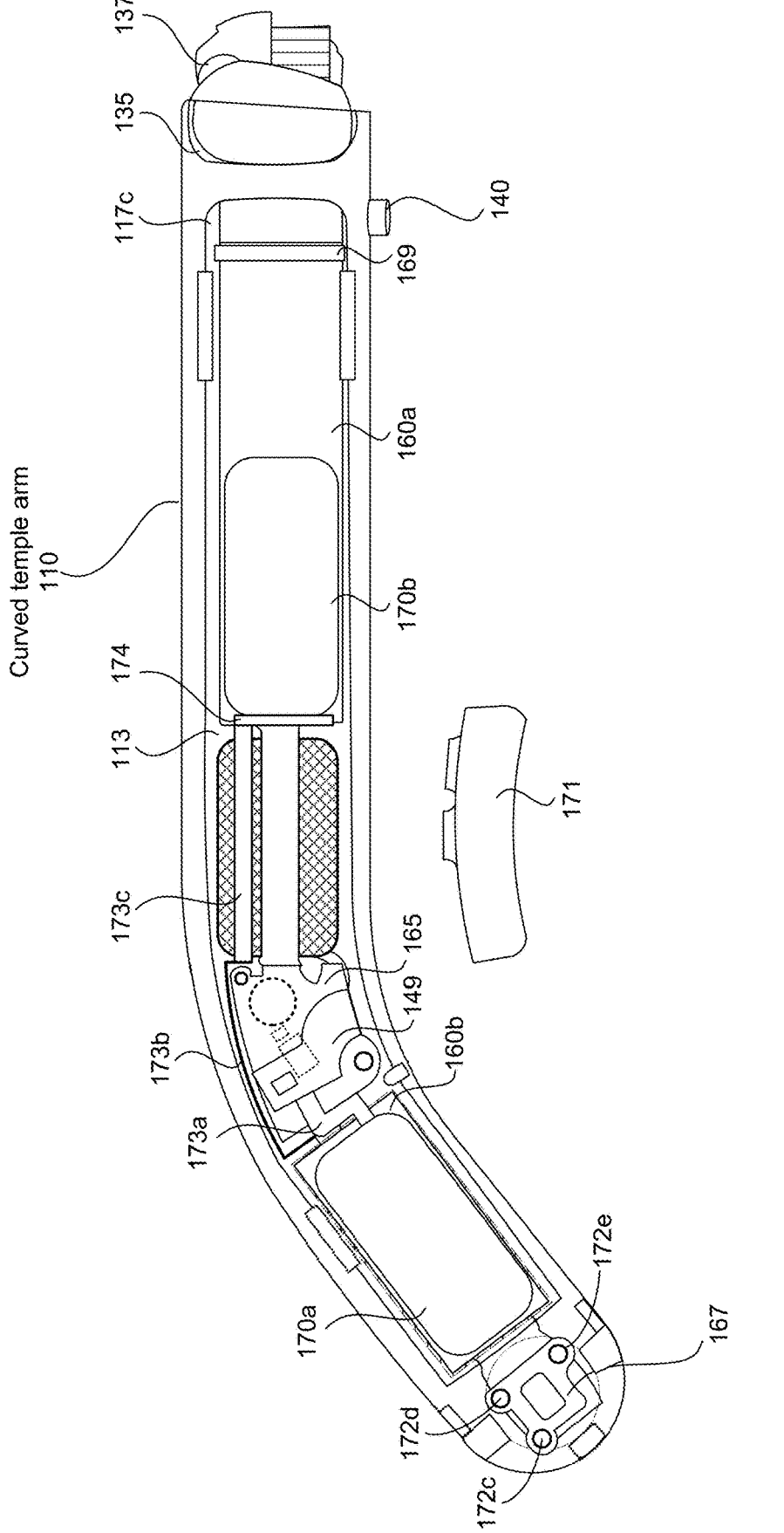
Figure 1F:
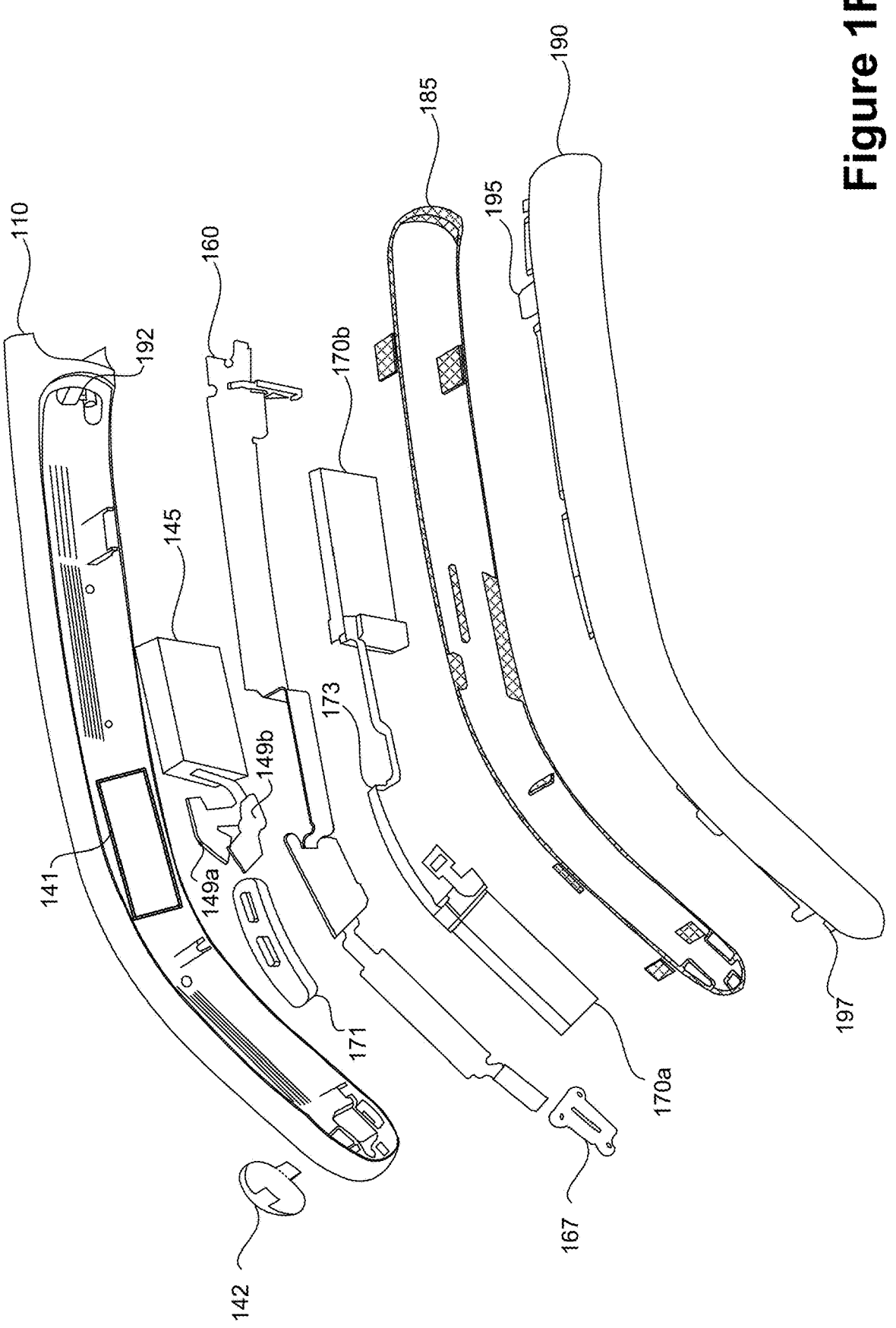

Turning to FIG. 1C, the speaker 145 is coupled to the curved temple arm housing 110. Specifically, the speaker 145 is positioned inside a middle portion of the curved temple arm housing 110, and the middle portion of the curved temple arm housing 110 is positioned is adjacent to the user's ear (e.g., ear position 125). The speaker 145 includes a sound producing element (e.g., a diaphragm) positioned such that the generated sound is directed towards the audio channel 121. The additional audio channel 119 is pointed away from the user's ear is configured to cancel out audio leakage or audio that bystanders are able to hear to increase user privacy. In some embodiments, the sound producing element is a predetermined area. For example, the predetermined area of the sound producing element can be 79 mm$^2$. The example area of the sound producing element is non-limiting.

The speaker 145 can be coupled to a speaker case (represented by the pattern fill) that is affixed to the curved temple arm housing 110 via the speaker adhesive 141 and/or a mounting fixture 156 (e.g., a cross or pin). For example, the speaker case can include a corresponding mounting fixture (e.g., a fastener hole 159 that is coupled to or is part of the speaker case) that is used to hold the speaker case at a predetermined location within the curved temple arm housing 110. In some embodiments, the speaker 145 and speaker case is aligned within the curved temple arm housing 110 using the one or more pluralities of ribs 117 (e.g., between first and second pluralities of ribs 117a and 117b) and/or one additional alignment ribs 158 that control rotation of a speaker housing in the temple arm housing.

In some embodiments, the speaker case has predetermined dimensions such that the speaker case and speaker 145 fit within the curved temple arm housing 110. For example, the speaker case dimensions can be a predetermined width (e.g., 20 mm+/−6 mm), a predetermined height (e.g., 12.6 mm+/−6 mm), and a predetermined thickness (e.g., 4 mm+/−6 mm). The above sample measurements are non-limiting. The speaker 145 (and/or speaker case) can be any dimensions that fit within the temple arm 100. In some embodiments, the speaker 145 and speaker case occupy an entire height of the curved temple arm housing 110.

The speaker case can include a speaker cover that conceals the sound producing element (e.g., a diaphragm) of the speaker 145. Specifically, the speaker cover couples to the speaker 145 via the speaker case adjacent to the skin-facing temple arm cover 190 (FIG. 1F). The speaker cover can include one or more guides for placing an RFPCA 160 or other components over the speaker case. In some embodiments, the speaker 145 is configured to couple with one or more electronics assemblies or electronic components, such as a sensor deck 149 (discussed below).

The sensor deck 149 is a RFPCA including one or more sensors or other electronic components. The sensor deck 149 can include one or more flexible printed circuit (FPC) regions that include respective electronic components. In some embodiments, the sensor deck 149 includes at least two sensor deck FPC regions (e.g., sensor deck FPC regions 149a and 149b; FIG. 1F) that are separated by at least the predetermined thickness of the speaker case. This allows for the sensor deck 149 to isolate or separate one or more components from one another (e.g., prevent or reduce interference) and/or create additional space for one or more components (e.g., the RFPCA 160 and/or a rigid or semi rigid portion 165 of the RFPCA 160) as discussed below in reference to FIG. 1D. The sensor deck 149 includes a connection region 157 (e.g., an extended FPC region) that is configured to couple with the speaker 145. The connection region 157 couples the one or more sensors or other components of the sensor deck 149 with the speaker 145, the one or more power sources 170, and/or other components of the augmented-reality glasses. In some embodiments, the connection region 157 is a stiffened or semi-rigid FPC that has a predetermined shape or that bends, such that the connection region 157 couples to an outer perimeter of the speaker 145 or speaker case. The sensor deck 149 can also include a connector (not shown) for coupling the sensor deck 149 with the RFPCA 160 (FIG. 1D). In some embodiments, the speaker 145 is part of the sensor deck 149. For example, the speaker 145 and the sensor deck 149 can form a unitary device (e.g., an audio output assembly).

The one or more sensors or other electronic components of the sensor deck 149 can include an IMU 153, a proximity sensor 155, a temperature sensor 151. In some embodiments, the sensor deck 149 can include a microphone (e.g., a rear microphone 150). The sensor deck 149 can include more or less components than those described above. For example, the sensor deck 149 can include only the temperature sensor 151 and a microphone 150 (e.g., a rear microphone 150a). In some embodiments, the sensor deck 149 can include temperature sensor 151, the microphone 150, and the IMU 153 or the proximity sensor 155. The one or more components of the augmented-reality glasses are described below in reference to FIGS. 7A-7C.

The sensor deck 149 is coupled to the curved temple arm housing 110 via the deck mount 122. The deck mount 122 can include one or more alignment features (e.g., raised portions) for aligning placement of the sensor deck 149 on the curved temple arm housing 110. The sensor deck 149 can be coupled to the curved temple arm housing 110 via an adhesive and/or one or more fasteners. For example, the one or more alignment features can receive a fastener (e.g., a screw, anchor, etc.) that coupled the sensor deck 149 to the curved temple arm housing 110. In some embodiments, the alignment features can include adhesive (e.g., epoxy, super glue, plastic glue, acrylic glue, thread-locker, etc.) to further stiffen the temple arm. In some embodiments, glue can be used inside the holes for receiving screws to further stiffen the temple arm. In some embodiments, the glue can act as a liquid shim between the one or more alignment ribs 133 and the hinge mount 135. The sensor deck 149 is positioned adjacent to the ear position 125 and/or the speaker 145. In some embodiments, the sensor deck 149 is aligned within the curved temple arm housing 110 using the one or more pluralities of ribs 117 (e.g., between first and second pluralities of ribs 117a and 117b. The curved temple arm housing 110 can include one or more perforations or openings for one or more components of the sensor deck 149. For example, the one or more perforations allow for a microphone 150 to capture audio data (e.g., from a user or an external environment) and/or one or more sensors to detect external conditions.

In some embodiments, the temple arm 100 includes more than one microphone 150. For example, the temple arm 100 can include at least one rear microphone and one front microphone. In some embodiments, a front microphone 150c is positioned adjacent to the hinge mount 135, the hinge assembly 137, and the input device 140 (e.g., between the hinge mount 135 and the third plurality of ribs 117c). The front microphone 150c can be positioned as far forward as possible (e.g., adjacent to the hinge mount 135 and/or the hinge assembly 137) to increase the available space within the curved temple arm housing 110 for the one or more power sources 170. Another front microphone 150b can be positioned between to the second plurality of ribs 117b and the speaker 145. Additional rear microphones 150d and 150e can be positioned adjacent to the power device mount 130 (e.g., rear microphones adjacent to the first and second troughs 120a and 120b).

In FIG. 1D, an RFPCA 160 is coupled to the curved temple arm housing 110. The RFPCA 160 is shaped to fit within the curved temple arm housing 110. In some embodiments, the RFPCA 160 includes one or more portions, such as a first RFPCA portion 160a, a rigid or semi rigid main portion 165, a second RFPCA portion 160b, and a rigid or semi rigid rear portion 166. The RFPCA 160 is disposed over the one or more pluralities of ribs 117a-117c and the speaker 145 (e.g., over the speaker case and cover). For example, the first RFPCA 160a can be disposed over the speaker 145, the second plurality of ribs 117b, and the third plurality of ribs 117c; and the second RFPCA portion 160b can be disposed over the first plurality of ribs 117a. Additionally, or alternatively, in some embodiments, the RFPCA 160 is disposed over or coupled to a portion of the curved temple arm housing 110 (e.g., on a surface of the cavity 113).

For example, as shown in FIG. 1D, the rigid or semi rigid portion 165 of the RFPCA 160 is disposed between two FPC regions of the sensor deck 149 and directly coupled to the curved temple arm housing 110. The RFPCA 160 can be coupled to the curved temple arm housing 110 via an adhesive (e.g., a pressure-sensitive adhesive) and/or one or more fasteners 172. For example, an adhesive can be applied to the pluralities of ribs 117a-117c to couple the first RFPCA portion 160a and the second RFPCA portion 160b to the curved temple arm housing 110 and the rigid or semi rigid portion 165 of the RFPCA 160 can be coupled to the curved temple arm housing 110 via a first fastener 172a and a second fastener 172b.

The RFPCA 160 can include stiffened, rigid, and/or semi-rigid portions. The RFPCA 160 can have a form factor based on a shape, size, and available space of the curved temple arm housing 110, as well as the one or more electronic components to be housed within the curved temple arm housing 110. For example, the first RFPCA portion 160a and the second RFPCA portion 160b can be parallel with the first plurality of ribs 117a and the second plurality of ribs 117b, and a third RFPCA portion 161a and a fourth RFPCA portion 161b can be perpendicular (or substantially perpendicular) with the second plurality of ribs 117b. In some embodiments, parts of the RFPCA 160 are stiffened for one or more components (e.g., the hinge mount 135, the hinge assembly 137, the input device 140) but not fully ridged or flexible. In some embodiments, a middle portion 162 of the RFPCA 160 is a narrow section which travels over the top of the speaker 145 and/or speaker case.

The RFPCA 160 couples the electronic components of the temple arm 100 with the electronic components of the augmented-reality glasses. For example, the RFPCA 160 couples the electronic components of the augmented-reality glasses to allow for data to be conveyed to and from the microphones 150, speakers 145, the displays, the imaging devices, the sensors, and/or other components of the augmented-reality glasses. The RFPCA 160 can include one or more connectors for coupling one or more electronic components of the temple arm 100 and the augmented-reality glasses. For example, the rigid or semi rigid rear portion 166 of the RFPCA 160 includes one or more connectors for coupling with power circuitry 163 (e.g., which includes circuitry for operating the power input device 142 and/or the power input connector 144 mounted via the power device mount 130). The first RFPCA portion 160a can include one or more connectors for coupling with one or more wires or electrical connectors that are routed via the hinge mount 135 and/or the hinge assembly 137. Similarly, the rigid or semi rigid portion 165 of the RFPCA 160 can include one or more connectors for connecting the sensor deck 149, the one or more power sources 170, the speaker 145, and or other electrical components with the RFPCA 160 and other electronic components of the augmented-reality glasses.

The rigid or semi rigid portion 165 of the RFPCA 160 can include one or more processors (e.g., a microcontroller unit (MCU) or other processors 748 described below reference to FIG. 7C) for controlling or providing instructions to the one or more electronic components of a temple arm 100, executing instructions (store in memory (e.g. 750; FIG. 7C) for causing performance of one or more operations and/or functions of the augmented-reality glasses, and/or transferring or sharing data between the electronic components of the augmented-reality glasses. In some embodiments, rigid or semi rigid portion 165 of the RFPCA 160 include an audio amplifier, charging circuitry (e.g., analogous to a power-management integrated circuit 744;

FIG. 1C), and/or other electronic components.

As described above, the power circuitry 163 is configured to allow for operation of the power input device 142 and/or the power input connector 144 mounted via the power device mount 130. The power circuitry 163 can be part of the power system 742 described below reference to FIG. 7C, such that the power circuitry 163 should be understood to have at least some of the features of the power system 742. For example, the power circuitry 163 can be analogous to the charger input 743. In some embodiments, the power circuitry 163 is coupled to the curved temple arm housing 110 via one or more fasteners 172. For example, as shown in FIG. 1D, the power circuitry 163 is coupled to the curved temple arm housing 110 via a third fastener 172c, a fourth fastener 172d, and a fifth fastener 172e. In some embodiments, less than three fasteners are used (e.g., two fasteners or no fasteners). Alternatively, or in addition, in some embodiments, the power circuitry 163 is coupled to the curved temple arm housing 110 via an adhesive, a clip, or a hook. In some embodiments, the power circuitry 163 can include a power light-emitting diode (power LED 194; FIG. 1H), which is visible via a portion of the external-environment-facing temple arm housing.

The power LED 194 can be illuminated to notify a user of the augmented-reality glasses' status. For example, the power LED 194 can be illuminated to notify the user that the augmented-reality glasses are fully charged, charging, active, low power, etc. In some embodiments, the power LED 194 is illuminated to notify the user that an imaging device and/or a microphone is active. Alternatively, or in addition, in some embodiments, the power LED 194 is illuminated to show successful connective or ongoing connectivity with another device. For example, the power LED 194 can illuminate to notify the user that the augmented-reality glasses successfully communicatively coupled with or are communicatively coupled with another device (e.g., a wrist-wearable device 600, a handheld intermediary processing device 800, a mobile device 550 (e.g., smartphones, tablets, etc.), and/or other electronics device). In some embodiments, the power LED 194 is used to debug the power system 742 (e.g., when the power system 742 is not correctly functioning or is not properly powered on).

FIG. 1E shows the one or more power sources 170 coupled with the curved temple arm housing 110. In some embodiments, the first power sources 170a is coupled over the second RFPCA portion 160b (above the first plurality of ribs 117a) and the second power sources 170b is coupled over the first RFPCA portion 160a (above the second plurality of ribs 117b). The first power source 170a can be coupled at a rear portion of the curved temple arm housing 110 (e.g., adjacent to the power device mount 130) and the second power source 170b can be coupled at a front portion of the curved temple arm housing 110 (e.g., adjacent to the speaker 145), and vice versa. Although the example shown in FIG. 1E shows two power sources 170, is some embodiments, a temple arm 100 includes a single power source or more than two power sources.

In some embodiments, the one or more power sources 170 are coupled via a battery FPC 173. The battery FPC 173 can include one or more portions that couple the one or more power sources 170 together and/or with other electronic components of the temple arm 100. For example, a first battery FPC portion 173a can couple the first power source 170a with the sensor deck 149 (e.g., via a board-to-board connector), which couples the first power source 170a and the second power source 170b with the RFPCA 160 and other components of the augmented-reality glasses. A second battery FPC portion 173b and a third battery FPC portion 173c communicatively couple the first power source 170a and the second power source 170b (e.g., via a power source connector 174). The second battery FPC portion 173b and the third battery FPC portion 173c are routed within the curved temple arm housing 110 to increase the amount of available space within the cavity 113. For example, the second battery FPC portion 173b can be positioned such that the second battery FPC portion 173b is perpendicular or substantially perpendicular with the first battery FPC portion 173a and/or the first RFPCA portion 160a, and routed around the sensor deck 149 and the rigid or semi rigid portion 165 of the RFPCA 160; and the third battery FPC portion 173c can be a narrow section which travels over the top of the speaker 145 and/or speaker case. In some embodiments, each portion of the battery FPC 173 (e.g., 173a, 173b, and 173c) is configured to individually couple with the RFPCA 160.

In some embodiments, the temple arm 100 includes a support structure 167 coupled with the power input device 142 and/or the power input connector 144 (FIG. 1A). In some embodiments, the support structure 167 is used in conjunction with one or more fasteners 172 to compress the power circuitry 163 (or RFPCA 160) into the curved temple arm housing 110 and/or compress an adhesive (e.g., a pressure-sensitive adhesive) into the curved temple arm housing 110. For example, the third 172c, the fourth fastener 172d, and the fifth fastener 172e can compress the support structure 167 into the curved temple arm housing 110.

The temple arm 100 includes an ear shim 171 that can be coupled to a bottom surface of the curved temple arm housing 110 (e.g., adjacent to the audio channel 121 and the ear position 125; FIG. 1A). The ear shim 171 can be coupled to the bottom surface of the curved temple arm housing 110 via an adhesive and/or a magnet (e.g., magnets within the ear shim 171 that are configured to couple with opposing magnets in the curved temple arm housing 110). In some embodiments, the ear shim 171 can be used by a user to adjust a position of the temple arm 100 and/or the frame of the pair of augmented-reality glasses on their ears and/or face. For example, if a user's ears are asymmetric (e.g., one ear is higher or lower than the other) or the tops of the user's ears do not align with the user's eyes (e.g., ears are below the eyes), the ear shims 171 cab be used to fill the gap between the temple arm 100 and the user's ear to make the pair of augmented-reality glasses more comfortable for the user to wear. In some embodiments, the ear shim 171 provides additional support to reduce the strain or stress placed on the user's ear when the augmented-reality glasses are worn for extended periods of time. In some embodiments, the ear shim 171 is formed of silicone which offers greater comfort to the users compared with the material of the curved temple arm housing 110. The ear shim 171 can be removed and/or replaced with other ear shims 171 (e.g., of varying size, thickness, material, etc.). In some embodiments, the ear shim 117 is manufactured and glued into the curved temple arm housing 110 at factory.

In some embodiments, the temple arm can include a spring finger or spring clip 169 that is configured to bias a microphone (e.g., a front microphone 150c; FIG. 1C) into an adhesive (e.g., a pressure-sensitive adhesive, or a sandwich structure of pressure-sensitive adhesive/membrane/pressure-sensitive adhesive) and/or the curved temple arm housing 110 as an additional water-proofing risk mitigator.

FIG. 1F shows an exploded view of an example temple arm, in accordance with some embodiments. The exploded view includes the curved temple arm housing 110, the speaker 145 (including the speaker adhesive 141), the sensor deck 149 (including at least two sensor deck FPC regions 149a and 149b), the power input device 142, the RFPCA 160, the support structure 167, the first and second power sources 170a and 170b, the battery FPC 173, the skin-facing temple arm cover 190, and an adhesive 185. The speaker 145, the sensor deck 149, the power input device 142, the RFPCA 160, the support structure 167, the first and second power sources 170a and 170b, and the battery FPC 173 are coupled with the curved temple arm housing 110 as described above in reference to FIGS. 1A-1E.

The adhesive 185 is disposed around a ledge of the curved temple arm housing 110, as well as within the one or more troughs 120 (FIG. 1A) of the curved temple arm housing 110. The adhesive 185 covers the perimeter of the curved temple arm housing 110 such that the adhesive 185 forms a hermetic seal when the skin-facing temple arm cover 190 is coupled with the curved temple arm housing 110. The adhesives are the same or distinct. For example, in some embodiments, the adhesive 185 applied around a perimeter of the curved temple arm housing 110 is a soft adhesive (e.g., a low modulus sealant), while the adhesive 185 within the one or more troughs 120 is a structural adhesive.

Application of the adhesive 185 is discussed in detail below in reference to FIGS. 3A and 3B.

The skin-facing temple arm cover 190 is configured to couple with the curved temple arm housing 110. The skin-facing temple arm cover 190 includes a corresponding head shaped curvature to contour a portion of the user's head when the temple arm 100 is worn. Specifically, the skin-facing temple arm cover 190 is configured to contact the user's skin when the temple arm 100 is worn. The skin-facing temple arm cover 190 includes one or more insert-ribs 195 and/or one or more snap tabs 197. The one or more insert-ribs 195 are configured to be inserted into the one or more troughs 120 and couple the skin-facing temple arm cover 190 with the curved temple arm housing 110 when the adhesive 185 cures. The one or more snap tabs 197 are configured to be inserted into the one or more tab-inserts 115 and couple the skin-facing temple arm cover 190 to the curved temple arm housing 110 while the adhesive 185 cures. The one or more insert-ribs 195 provide additional surface area that strengthens the bonding between the skin-facing temple arm cover 190 and the curved temple arm housing 110 together during assembly. In some embodiments, the one or more insert-ribs 195 provide additional structure to the temple arm 100. Specifically, the one or more insert-ribs 195 engage the one or more troughs 120 and form a mechanical bond with the adhesive 185 within the one or more troughs 120. The skin-facing temple arm cover 190, when coupled with the curved temple arm housing 110, encases the cavity 113 forming a water resistant or substantially waterproof seal. Additional information on the skin-facing temple arm cover 190 is provided below with reference to FIG. 2.

Figure 1G:
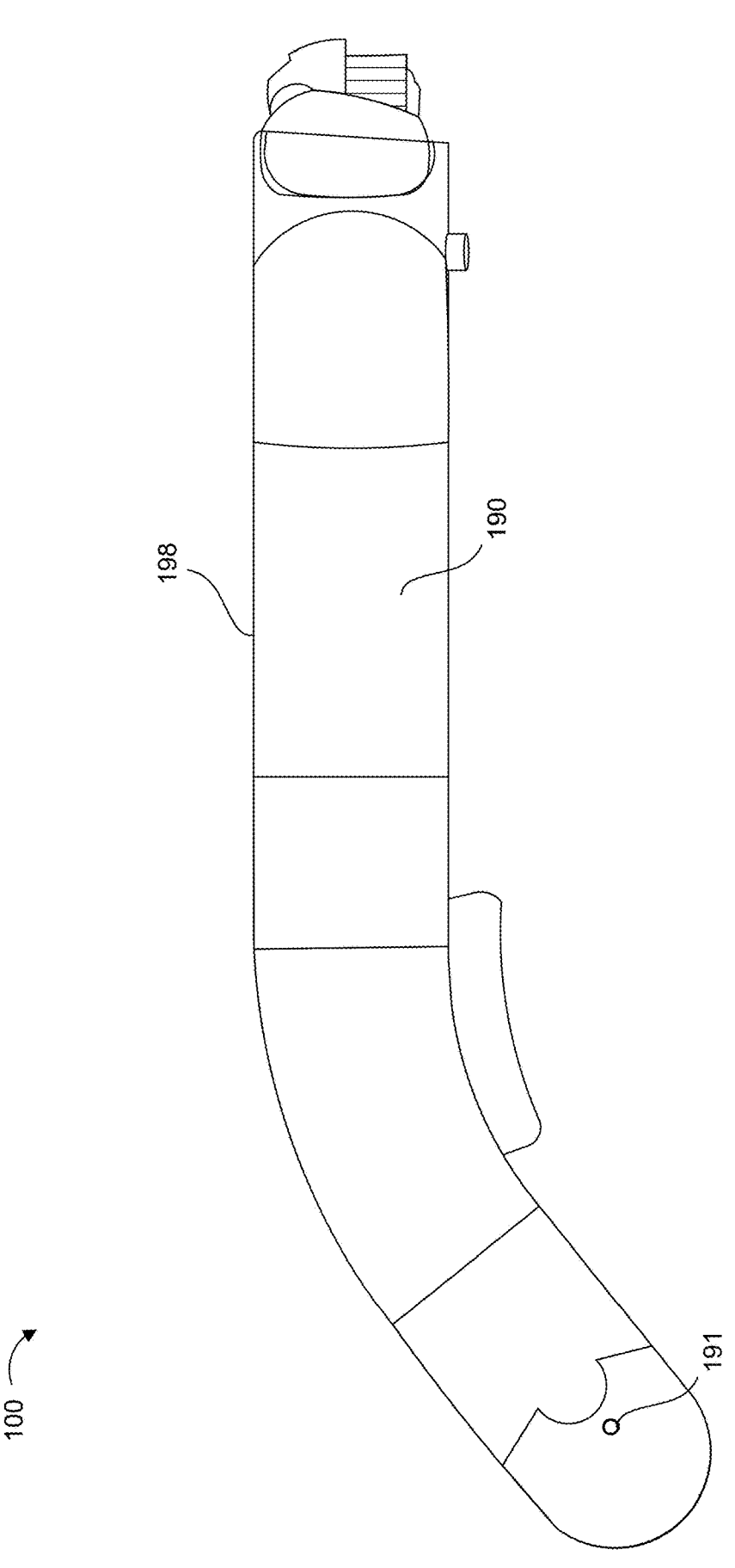
Figure 1H:
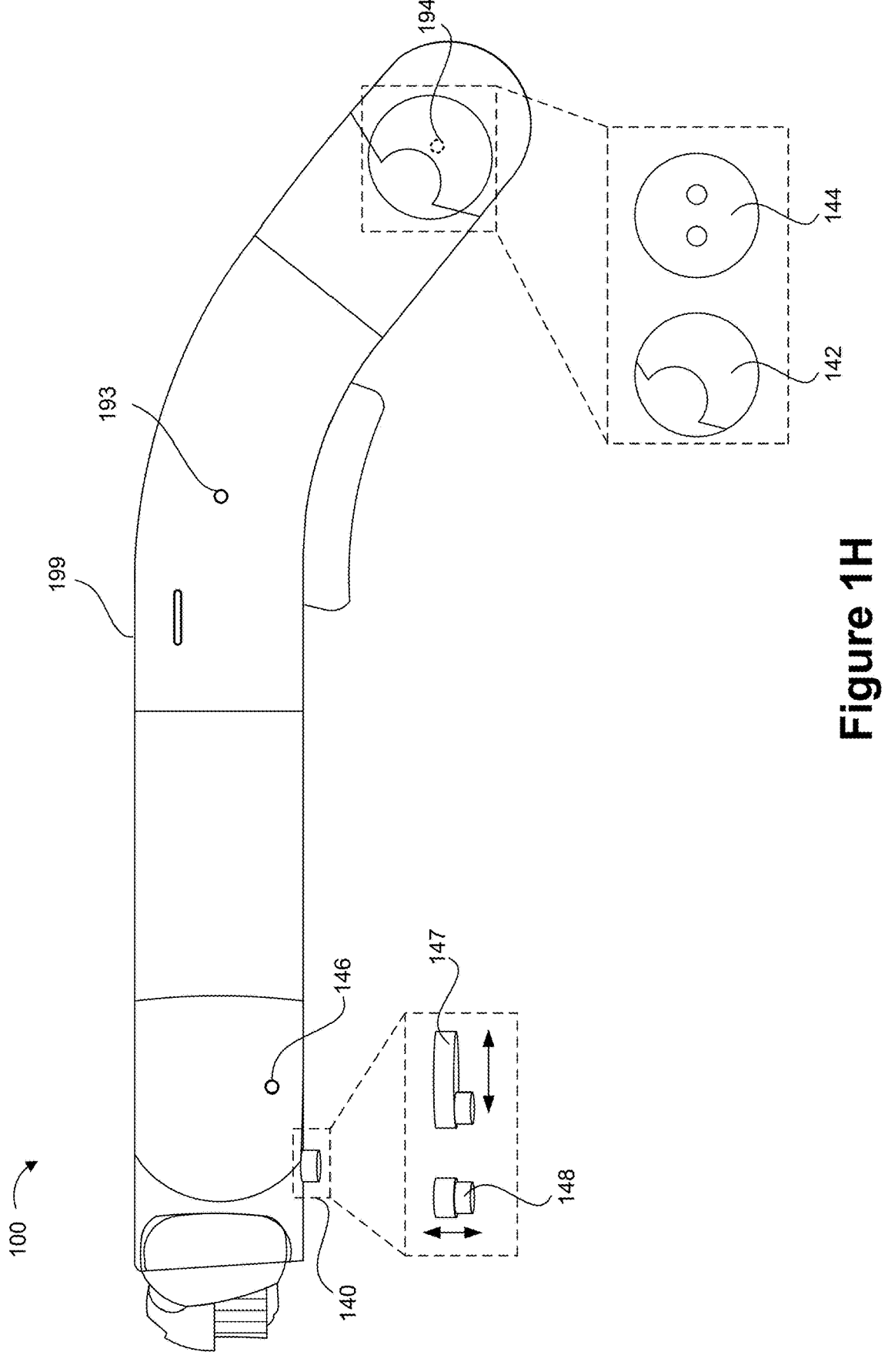

FIG. 1G shows an inner portion 198 (e.g., a skin-facing portion of the temple arm) of the temple arm 100. The inner portion 198 of the temple arm 100, when the pair of augmented-reality glasses are worn by the user, directly contacts a portion of the user's head. As shown by the inner portion 198, the skin-facing temple arm cover 190 encloses the cavity 113 of the curved temple arm housing 110 such that the electronic components within the curved temple arm housing 110 are not directly exposed to water, dust, and/or other external and/or environmental conditions. In some embodiments, the skin-facing temple arm cover 190 includes a first aperture 191 that enables light emission from the power LED 194. In some embodiments, the curved temple arm housing 110 includes holes or apertures covered with membranes to allow the external-environment-facing temple arm housing 105 to gradually dry when moisture infiltrates.

FIG. 1H shows an outer portion 199 (e.g., an external-environment-facing portion of the temple arm) of the temple arm 100. The outer portion 199 of the temple arm 100, when the pair of augmented-reality glasses are worn by a user, is easily accessible by the user. Specifically, the user is able contact the outer portion 199 to provide one or more user inputs (e.g., actuate one or more input devices, such as the power input device 142, provide one or more touch input commands (e.g., capacitive touch input commands), etc.). Additionally, the outer portion 199 is not obstructed such that sound generated by the speaker 145 that is directed to the user's ear can still be heard by the user while donned and while temple arm 100 is being interacted with.

The outer portion 199 of the temple arm 100 further shows a second aperture 193. The second aperture 193 is adjacent to the sensor deck 149 such that one or more electronic components on the sensor deck 149 can obtain data without being obstructed by the external-environment-facing temple arm housing 105. For example, a microphone 150 included on the sensor deck 149 can capture audio data from the external environment. Additionally, or alternatively, in some embodiments, the second aperture 193 is configured to allow for air and/or heat to passively exit the temple arm 100.

The temple arm 100 can further include privacy LED 146. The privacy LED 146 is positioned on the outer portion 199 of the temple arm 100 such that the privacy LED 146 is visible by others (e.g., people looking at the user and/or in the user's direction). The privacy LED 146 can be illuminated based on user input at the input device 140. For example, actuation of the input device 140 can cause the privacy LED 146 to illuminate to notify others that an imaging device and/or a microphone of the augmented-reality glasses are active (e.g., on or currently capturing data), inactive (e.g., off or not currently capturing data), and/or disabled (e.g., imaging device and/or microphone are unavailable or disconnected such that data cannot be captured (e.g., even if user instructions to capture data are provided)).

As described above in reference to FIG. 1B, the input device 140 can be a privacy slider 147 or a capture switch 148. The privacy slider 147 can be actuated in a horizontal direction (e.g., parallel with a longitudinal length of the temple arm 100 (e.g., a length from the hinge mount 135 to the power device mount 130)). The privacy slider 147, when actuated, disables and/or enables imaging devices and/or microphones of the augmented-reality glasses. For example, when the privacy slider 147 is actuated in a first position, the imaging devices and/or microphones of the augmented-reality glasses can be disabled mechanically (e.g., temporarily removing an electrical coupling between the devices and the rest of the electronic components of the augmented-reality glasses) and/or via one or more instructions provided to one or more processors of the augmented-reality glasses. When the privacy slider 147 is actuated in a second position, the imaging devices and/or microphones of the augmented-reality glasses can be enabled mechanically (e.g., electrically coupling the devices and the rest of the electronic components of the augmented-reality glasses) and/or via one or more instructions provided to one or more processors of the augmented-reality glasses. The above positions are non-limiting, and the privacy slider 147 can more than two positions (e.g., a position to disable only the imaging devices, a position to disable only the microphones, a position to mute the augmented-reality glasses, etc.). The privacy slider 147 can be locked in each position such that the user has to intentionally move the privacy slider 147 to a particular position.

The privacy slider 147 can include a switch arm coupled to a plunger, the plunger configured to travel via plunger guide. The plunger includes an O-ring that prevents or reduces an amount of water, dust, or other external contaminants from entering the temple arm 100. The privacy slider 147 when actuated actuates the switch arm such that the plunger is guided through the plunger guide and the O-ring around the plunger creates a seal between the plunger and the plunger guide to keep out water, dust, or other external contaminants.

The capture switch 148 can be actuated in a vertical direction (e.g., perpendicular to a longitudinal length (e.g., from the hinge mount 135 to the power device mount 130) of the temple arm 100). The capture switch 148 can be configured as a POV camera capture switch 148 such that, when actuated, the capture switch 148 captures one or more images of the user's point of view. In some embodiments, the user can hold down the capture switch 148 to capture a plurality of images and/or video data. In some embodiments, actuation of the capture switch 148 might also cause a microphone 150 of the augmented-reality glasses to activate such that audio data associated with the image data is captured. The capture switch 148 can include a seal and spring to prevent or reduce an amount of water, dust, or other external contaminants from entering the temple arm 100.

As described above in reference to FIGS. 1B, the power device mount 130 can be coupled with the power input device 142 or the power input connector 144. The power input device 142 can be actuated to turn on or turn off the augmented-reality glasses. The power input connector 144 can be configured to couple with an opposite connector that is configured to provide usable power and/or transfer data to and/or from the augmented-reality glasses. The outer portion 199 shows the power input connector 144 as two or more pogo pins; however, as described above in reference to FIG. 1A, in some embodiments, the power input connector 144 can be a USB port, a Thunderbolt port, a wireless connector (e.g., an inductive antenna, capacitive antenna, etc.), other type of connector known in the art.

In some embodiments, the power device mount 130 includes a power LED 194. The power LED 194 can be illuminated to notify the user that the augmented-reality glasses are fully charged, charging, active, low power. As described above, in reference to FIG. 1D, the power LED 194 can also be illuminated to notify the user of additional augmented-reality glasses status updates. In some embodiments, the power LED 194 can be a light ring surrounding the power input device 142. Alternatively, ins some embodiments, the power LED 194 is a single light indicator.

As described above in reference to FIGS. 1A and 1B, in some embodiments, privacy slider 147 and the capture switch 148, and the power input device 142 and the power input connector 144 can be placed on opposite temple arms. For example, in some embodiments, the privacy slider 147 and the power input device 142 can be on the right temple arm, and the capture switch 148 and the power input connector 144 can be on the left temple arm.

The above examples are non-limiting; different variations of electronic components can be included in the temple arms. Additional examples of the electronic components included in the augmented-reality glasses are provided below in reference to FIGS. 7A-7C.

Figure 2:
FIG. 2 illustrates the skin-facing temple arm cover, in accordance with some embodiments.

FIG. 2 illustrates the skin-facing temple arm cover, in accordance with some embodiments. Specifically, FIG. 2 shows an inner surface 203 of the skin-facing temple arm cover 190, which is configured to couple with the curved temple arm housing 110 (FIGS. 1A-1H) and enclose the cavity 113 of the curved temple arm housing 110. The skin-facing temple arm cover 190 can be formed of carbon fiber or carbon fiber composite and can include one or more insert-ribs 195, one or more snap tabs 197, one or more ledge ribs 209a-209c, and/or one or more spacers 207 (or standoffs). The skin-facing temple arm cover 190 is configured to be a predetermined thickness and predetermined mass (e.g., 0.35 mm thick and 1.26 g when including the one or more insert-ribs 195, the one or more snap tabs 197, the one or more ledge ribs 209a-209c, and/or the one or more spacers 207). In some embodiments, the skin-facing temple arm cover 190 is 0.25 mm thick and 0.95 g. In other embodiments, the skin-facing temple arm cover 190 can be formed of ultra-high-molecular-weight polyethylene, stamped sheet metal, injection molded plastic, or other composite materials.

The number of insert-ribs 195 is equal to the number of troughs 120 (e.g., seven insert-ribs 195 for seven troughs 120). The one or more ledge ribs 209 can be formed to accommodate one or more components housed within the curved temple arm housing 110 (e.g., a perimeter outlining a shape of a power sources 170). The one or more spacers 207 are configured to maintain and/or control a height of the skin-facing temple arm cover 190 with respect to an edge of the curved temple arm housing 110 as described below in reference to FIGS. 3A and 3B. In some embodiments, the one or more spacers 207 are configured to control the thickness of the adhesive to (nominally) 0.20 mm+/−0.10 mm.

The one or more ledge ribs 209a-209c are predetermined measurements. For example, one or more ledge ribs 209a-209c can be a first predetermined measurement (e.g., a height) and a second predetermined measurement (e.g., a width). The first and second predetermined measurements can be selected such that the one or more ledge ribs 209a-209c fit within the outer edge of the curved temple arm housing 110 (e.g., an adhesive ledge). In some embodiments, the first predetermined measurement is 0.5 mm (+/−0.02 mm), and the second predetermined measurement is 0.1 mm (+/−0.02 mm), and vice versa. The above example measurements are non-limiting and different measurements. In some embodiments, the one or more ledge ribs 209a-209c include one or more lead-in protrusion 211 configured to control a gap around the perimeter of an edge of the curved temple arm housing 110 (e.g., the distance between the walls (e.g., ribs) of the skin-facing temple arm cover 190 and the walls of the curved temple arm housing 110. In some embodiments, the one or more ledge ribs 209a-209c provide stiffness to the external-environment-facing temple arm housing 105 during assembly at manufacturing.

The adhesive 185 is applied to an outer edge (described below in reference to FIGS. 3A and 3B) of the curved temple arm housing 110 and within the one or more troughs 120a-120f. The one or more insert-ribs 195 are configured to be inserted in the one or more troughs 120a-120f and substantially immersed in the adhesive 185. Similarly, the one or more ledge ribs 209a-209c are configured to be inserted within the outer edge of the curved temple arm housing 110 and be substantially immersed in the adhesive 185. The one or more insert-ribs 195, the one or more ledge ribs 209a-209c, and the adhesive 185, when cured, form a hermetic seal when the skin-facing temple arm cover 190 is coupled with the curved temple arm housing 110. FIG. 3A, as described below, provides an example of the hermetic seal.

While the adhesive 185 cures, the one or more snap tabs 197 are configured to couple with a portion of the curved temple arm housing 110. The one or more snap tabs 197 keep the skin-facing temple arm cover 190 coupled with the curved temple arm housing 110 such that the adhesive 185 has time to cure. Specifically, the one or more snap tabs 197 include a hook, a clasp, a lock, a grapple, and/or other similar fixtures that are configured to couple with a portion of the curved temple arm housing 110 such that the skin-facing temple arm cover 190 cannot be unintentionally decoupled from the curved temple arm housing 110 while the adhesive 185 cures. The skin-facing temple arm cover 190 includes a predetermined number of snap tabs 197. In some embodiments, the skin-facing temple arm cover 190 includes a first predetermined number snap tabs 197 at a first portion of the skin-facing temple arm cover 190 and a second predetermined number snap tabs 197 at a second portion of the skin-facing temple arm cover 190. For example, as shown in FIG. 2, three snap tabs 197a-197c are disposed at a rear portion 217 of the skin-facing temple arm cover 190 (e.g., which are inserted in the one or more tab-inserts 115 and couple with the rear portion of the curved temple arm housing 110) and three snap tabs 197d-197f are disposed at a front portion 215 of the skin-facing temple arm cover 190 (e.g., which couples with the front-end portion of the curved temple arm housing 110 (e.g., adjacent to the hinge mount 135)).

The skin-facing temple arm cover 190 is configured to slide, in part, into the curved temple arm housing 110 and pushed down to engage one or more snap tabs 197 with the body of the curved temple arm housing 110. Specifically, the front portion 215 of the skin-facing temple arm cover 190 is configured to slide into a cover opening 192 (FIG. 1F), such that, when the front portion 215 of the skin-facing temple arm cover 190 is inserted, a subset of the snap tabs 197 can engage with the curved temple arm housing 110 (e.g., the three snap tabs 197d-197f). The one or more insert-ribs 195, one or more snap tabs 197, the one or more ledge ribs 209a-209c, and/or other portions of the skin-facing temple arm cover 190 are positioned such that they do not puncture and/or cause damage to the one or more power sources 170 and/or other electronic components within the curved temple arm housing 110 when the skin-facing temple arm cover 190 is coupled thereon.

FIGS. 3A and 3B illustrate cross sections of the temple arm, in accordance with some embodiments. FIG. 3A shows a first example cross section 300 of the temple arm and FIG. 3B shows a second example cross section 350 of the temple arm.

Turning to FIG. 3A, the first example cross section 300 shows a skin-facing temple arm cover 190 coupled with an external-environment-facing temple arm housing 105. The skin-facing temple arm cover 190 includes one or more insert-ribs 195 that are substantially immersed in an adhesive 185 disposed on the external-environment-facing temple arm housing 105. Specifically, the adhesive 185 is disposed on an edge (or ledge 305) of the external-environment-facing temple arm housing 105 and within one or more troughs 120 of the skin-facing temple arm cover 190 such that, when the skin-facing temple arm cover 190 is coupled with the external-environment-facing temple arm housing 105, the one or more insert-ribs 195 are immersed in the adhesive 185. In some embodiments, the adhesive 185 is received via a gap formed between the external-environment-facing temple arm housing 105 and the skin-facing temple arm cover 190 (as shown and described below in reference to FIG. 3B).

When the one or more insert-ribs 195 are immersed in the adhesive 185, the one or more insert-ribs 195 cause the adhesive 185 to overflow (e.g., out of the one or more troughs 120) and coat at least a portion of the ledge 305. In some embodiments, a portion of the adhesive 185 overflow towards the interior of the external-environment-facing temple arm housing 105 (with a small portion of adhesive overflowing into a smaller gap adjacent to the speaker 145) such that, when the adhesive 185 cures, a bond is formed on the vertical wall (e.g., between the external-environment-facing temple arm housing 105 and the skin-facing temple arm cover 190). The adhesive 185 within the troughs 120 increases the overall surface area that can couple with the one or more insert-ribs 195 and increases the strength of the mechanical bond. The adhesive 185 disposed within the one or more troughs 120 and on the ledge 305, when cured, forms a hermetic seal (e.g., represented by edge adhesive 315 and adhesive 185 within the troughs 120).

The hermetic seal is configured to provide water and/or dust resistance to the temple arm. In some embodiments, the hermetic seal is configured to waterproof and/or dust proof the temple arm. Additionally, the adhesive 185 is configured to provide additional vibration and impact resistance to the temple arm. More specifically, the adhesive 185, when cured, is configured to absorb forces experienced by the temple arm. In some embodiments, the adhesive 185 is a soft adhesive (e.g., a low modulus sealant) to provide a hermetic seal preventing water from getting in, but not cracking or becoming too brittle. In some embodiment, the adhesive 185 within the one or more troughs 120 is a structural adhesive.

The external-environment-facing temple arm housing 105 includes one or more standoffs 310 that are configured to control or maintain a predetermined spacing (t) between respective portions of the skin-facing temple arm cover 190 and the external-environment-facing temple arm housing 105. For example, as shown in FIG. 3A, the one or more standoffs 310 separate the skin-facing temple arm cover 190 from the ledge 305 of the external-environment-facing temple arm housing 105 by a predetermined spacing (t). In some embodiments, the predetermined spacing (t) is 0.2 mm (+/−0.10 mm). The predetermined spacing (t) is filled with adhesive 185 such that the hermetic seal is formed. Specifically, the adhesive 185 can have a thickness equal to the predetermined spacing (t) at the ledge 305 such that a hermetic seal around the perimeter of the external-environment-facing temple arm housing 105 is formed. The example predetermined spacing (t) provide above is non-limiting and different parameters can be selected based on the temple arm configuration.

The one or more standoffs 310 can be formed to control or maintain different spacing (t) as required by a particular configuration. Specifically, the one or more standoffs 310 can be a predetermined height (h). For example, a height (e.g., h) of the one or more standoffs 310 can be selected to define the predetermined spacing (t). In some embodiments, the external-environment-facing temple arm housing 105 includes a predetermined number of standoffs 310. For example, in some embodiments, the predetermined number of standoffs 310 is 15, 17, 19, etc.

The adhesive 185 is configured to cover a predetermined distance (d) of the ledge 305. The predetermined distance (d) is a gap generated by the one or more lead-in protrusion 211

(FIG. 2) of the one or more ledge ribs 209a-209c. As described above in reference to FIG. 2, the one or more lead-in protrusions 211 are configured to control a gap around the perimeter of an edge of the curved temple arm housing 110. In some embodiments, the predetermined distance (d) is 0.5 mm (+/−0.02 mm). The example predetermined distance (d) provide above is non-limiting and different parameters can be selected based on the temple arm configuration.

FIG. 3B shows one or more snap tabs 197 of the skin-facing temple arm cover 190 coupling the skin-facing temple arm cover 190 to the external-environment-facing temple arm housing 105. The second example cross section 350 of the temple arm further shows a power source 170 disposed over an RFPCA 160 and the RFPCA 160 disposed over a plurality of ribs 117. The plurality of ribs 117 allow for plastic or metal components to be molded with a uniform wall thickness and provide a way to mount electronic components (e.g., a (rectilinear) battery) in a curved body (e.g., B-spline curved) of the temple arm. Alternatively, a non-uniform wall thickness would result in sink marks in a cosmetic surface (e.g., plastic surface) of a housing that has a curved exterior.

As described above in reference to FIG. 2, the one or more snap tabs 197 are configured to couple the skin-facing temple arm cover 190 with the external-environment-facing temple arm housing 105 through the adhesive 185. For example, as shown in the second example cross section 350, the one or more snap tabs 197 couple with a portion of an interior portion of the external-environment-facing temple arm housing 105. The skin-facing temple arm cover 190 can be coupled with the external-environment-facing temple arm housing 105 without the use of any tools (e.g., only needing a downward pressure to be snapped into position). In some embodiments, the adhesive 185 is applied before the skin-facing temple arm cover 190 is coupled with the external-environment-facing temple arm housing 105. Alternatively, in some embodiments, the adhesive 185 is applied after the skin-facing temple arm cover 190 is coupled with the external-environment-facing temple arm housing 105.

The skin-facing temple arm cover 190 is configured to form a space or gap around the external-environment-facing temple arm housing 105. Specifically, the skin-facing temple arm cover 190 forms a cosmetic gap (g1), an adhesive application gap (g2), and a predetermined spacing (t, e.g., a distance between respective portions of the skin-facing temple arm cover 190 and the external-environment-facing temple arm housing 105). The cosmetic gap (g1) can be a predetermined distance such that the adhesive is not visible. For example, the cosmetic gap (g1) can be 0.1 mm (+/−0.02 mm). In some embodiments, the cosmetic gap prevents interference between the at least two parts when factoring in a spread of tolerances in the manufactured parts. The adhesive application gap (g2) can be a space to allow for flow of the adhesive 185. For example, the adhesive application gap (g2) can be 0.50 mm (+/−0.10 mm). The adhesive application gap (g2) can also have a height equal to the predetermined spacing (t). The example measurements provide above are non-limiting and can be selected based on the temple arm configuration.

Figure 4:
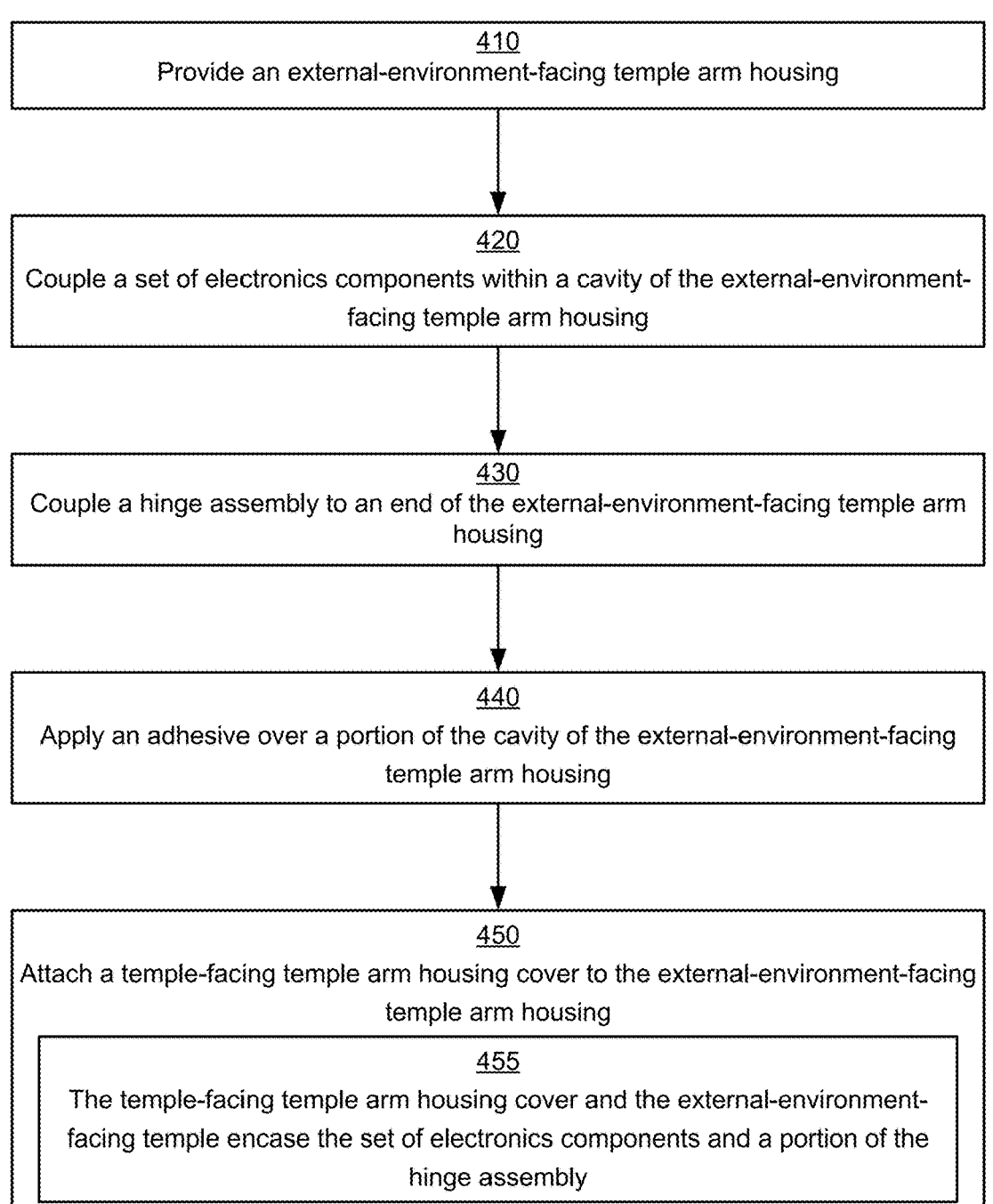
FIG. 4 illustrates a flow diagram of a method of forming a temple arm, in accordance with some embodiments.

FIG. 4 illustrates a flow diagram of a method of forming a temple arm, in accordance with some embodiments. In some embodiments, the various operations of the methods described herein are interchangeable and/or optional, and respective operations of the methods are performed by any of the aforementioned devices, systems, or combination of devices and/or systems.

(A1) FIG. 4 shows a flow chart of a method 400 of manufacturing a temple arm, in accordance with some embodiments. The method 400 includes providing (410) an external-environment-facing temple arm housing (analogous to the curved temple arm housing 110; FIGS. 1A-3B). The method 400 includes coupling (420) a set of electronic components within a cavity of the external-environment-facing temple arm housing and coupling (430) a hinge assembly to an end of the external-environment-facing temple arm housing. The method 400 further includes applying (440) an adhesive over a portion of the cavity of the external-environment-facing temple arm housing and attaching (450) a temple-facing temple arm housing cover (analogous to the skin-facing temple arm cover 190; FIGS. 1A-3B) to the external-environment-facing temple arm housing. The temple-facing temple arm housing cover and the external-environment-facing temple encase the set of electronic components and a portion of the hinge assembly (455). In some embodiments, performing the different steps in a different order provide greater flexibility and/or other advantages. For example, steps 450 and/or 455 can be performed before step 430 to improve repairability (e.g., a hinge can be coupled to a fully assembled and tested temple arm assembly, which allows for the replacement of damaged hinges). As description above in reference to FIGS. 1A-1H, the electronic components are disposed within the external-environment-facing temple arm housing 105 and encased within the temple arm 100 by coupling the skin-facing temple arm cover 190 to the external-environment-facing temple arm housing 105.

(A2) In some embodiments of A1, providing (410) an external-environment-facing temple arm housing includes forming the external-environment-facing temple arm housing, the forming including providing an inner mold formed of water-soluble resin. The inner mold including one or more undercuts defining a cavity of a temple arm housing. The forming further includes forming a portion of the temple arm housing over the inner mold; dissolving the inner mold to form an external-environment-facing temple arm housing portion, which includes one or more troughs; and injection molding a temple-facing temple arm housing cover including one or more fixtures for interfacing with the one or more troughs.

(B1) In accordance with some embodiments, a temple arm includes a curved temple arm housing that is configured to couple to a frame of a pair of augmented-reality (AR) glasses. The curved temple arm housing has a head shaped curvature to contour a portion of the user's head. The curved temple arm housing includes a set of electronic components coupled within the head shaped curvature of the curved temple arm housing, the set of electronics including a speaker, a front battery cell (analogous to a power source 170; FIGS. 1A-3B) and a rear battery cell. The speaker is positioned adjacent to a user's ear and between the front battery cell and the rear battery cell, and an input device configure to control one or more electronic components positioned within the frame of the pair of AR glasses. An example temple arm is shown and described above in reference to FIGS. 1A-1H.

(B2) In some embodiments of B1, the temple arm is formed in accordance with any of A1 and A2.

(B3) In some embodiments of any one of B1-B2, the speaker (or other audio output assembly) is a sealed module configured to prevent (or reduce the ability of) water from entering the temple arm. In some embodiments, the speaker is positioned inside a middle portion of the curved temple arm housing; and the middle portion of the curved temple arm housing is positioned adjacent to the user's ear. In some embodiments, the speaker is fully tested before being integrated into the temple arm.

(B4) In some embodiments of any one of B1-B3, the curved temple arm housing further includes a hinge mount at a front-end portion of the curved temple arm housing, the front-end portion of the curved temple arm housing being adjacent to the front battery cell. The temple arm can further include a hinge assembly coupled to the curved temple arm housing via the hinge mount. The hinge assembly is configured to couple the curved temple arm housing to the frame of the pair of AR glasses, and the hinge assembly includes one or more channels for routing one or more wires for communicatively coupling the set of electronic components with the electronic components positioned within the frame of the pair of AR glasses. Additional information on the AR glasses is provided below in reference to FIGS. 7A-7C.

(B5) In some embodiments of B4, the set of electronic components provides power to the electronics within the frame of the pair of glasses.

(B6) In some embodiments of any one of B4-B5, the hinge assembly includes a plurality of alignment ribs configured to align the coupling of the hinge assembly with the hinge mount; and an adhesive fastens the plurality of alignment ribs of hinge assembly to the hinge mount forming an airtight seal. In other words, the adhesive fills in gaps to reduce/prevent liquid from entering the temple arm. In some embodiments, the hinge assembly includes at least 2 ribs or alignment pins that allow the hinge to couple to the frame of the pair of glasses at a predetermined position to create the best possible seal. Additionally, in some embodiments, adhesive is coupled to the alignment pins such that a watertight seal is created between the hinge and the frame of the pair glasses. In some embodiments, the adhesive is a soft adhesive (e.g., a low modulus sealant) to provide a hermetic seal preventing water from getting in, but not cracking when the template arm is dropped or bent or becoming too brittle when the template arm is exposed to some environmental conditions. Additional information on the hinge assembly is provided above in reference to FIGS. 1A and 1B.

In some embodiments, the pair of glasses is configured to couple with a first curved temple arm housing and a second curved temple arm housing, the first and second curved temple arm housings coupled at opposite ends (or locations) of the frame of the pair glasses. In some embodiments, the second temple arm includes another set of electronic components communicatively coupled with the electronics within the frame of the pair of glasses. The other set of electronic components is distinct from the set of electronic components of the first second temple arm. In some embodiments, the first temple arm and the second temple arm share a number of electronic components that are the same and a number of electronic components that are distinct. In some embodiments, the first temple arm passes over the user's left ear, and the second temple arm passes over the user's right ear. Different examples of the configurations of the temple arms are described above in reference to FIGS. 1A-1H. Additionally, different configurations of head-wearable devices are described below in reference to FIGS. 7A-7C.

(B7) In some embodiments of any one of B1-B6, the set of electronics further includes a first microphone positioned adjacent to the speaker (or adjacent to the rear battery cell), and a second microphone positioned adjacent to a hinge assembly and a front battery cell. Different example locations of the microphone and/or speakers within a temple arm are described above in reference to FIGS. 1A-1H. In some embodiments, the front microphone is pushed as far forward as possible to make room for the battery cell. In some embodiments, distance between microphones is optimized to improve beam forming (e.g., directionality) of for capturing sound.

(B8) In some embodiments of any one of B1-B7, the input device is a power button positioned at a tip-end portion of the curved temple arm housing, the tip-end portion of the curved temple arm housing being adjacent to the rear battery cell. For example, as described above in reference to FIGS. 1A-1H, the power input device 142 can be at an end opposite the front-end of the curved temple arm housing 110. The power button includes an actuator, a button bracket, or a stamped spring on a surface of the temple housing such that when the user actuates the power button, the user receives mechanical feedback that the button has been pressed. In some embodiments, the stamped spring can be replaced with a foam (configured to provide mechanical feedback or produce a similar result as the stamped spring). In some embodiments, the power button is positioned at a side of the curved temple arm housing. In some embodiments, the power button is positioned at the rear of the left temple arm or right temple arm. In some embodiments, when the user actuates the power button, it turns on the power to both temple arms as well as the frame and lenses of the pair of glasses.

(B9) In some embodiments of any one of B1-B8, the input device includes a camera button positioned at a front-end portion of the curved temple arm housing. The front-end portion of the curved temple arm housing is adjacent to the front battery cell. In some embodiments, the camera button is positioned at a bottom portion of the temple arm. In some embodiments, the camera button is positioned adjacent to a hinge assembly of the right temple arm and on the bottom portion of the right temple arm. Alternatively, in some embodiments, the camera button is positioned adjacent to a hinge assembly of the left temple arm and on the bottom portion of the right temple arm. The camera button includes an actuator positioned adjacent of the temple housing such that when the user actuates the camera button, the user receives mechanical feedback that the button has been pressed. In some embodiments, when the user presses the camera button, they can activate or deactivate the camera. Examples of the camera buttons are provided above in reference to FIGS. 1B-1H.

(B10) In some embodiments of any one of B1-B9, the input device includes a privacy slider positioned at a front-end portion of the curved temple arm housing. The front-end portion of the curved temple arm housing is adjacent to the front battery cell. In some embodiments, the privacy slider assembly includes a switch arm coupled to a plunger coupled to a plunger guide. In some embodiments, the privacy slider assembly is adjacent to the hinge assembly on the left temple arm and on the bottom portion of the left temple arm. Alternatively, in some embodiments, the privacy switch assembly is positioned on the right temple arm and on the bottom portion of the left temple arm. The privacy slider includes a switch arm coupled to a plunger coupled to a plunger guide. In some embodiments, the plunger also includes an O-ring such that when the user actuates the switch arm and the plunger is guided through the plunger guide, the O-ring around the plunger creates a seal between the plunger and the plunger guide keeping out any liquid. The privacy slider is described above in reference to FIG. 1H.

(B11) In some embodiments of any one of B1-B10, the curved temple arm housing includes a plurality of ribs forming a planar mounting surface for at least one electronic component of the set of electronic components. In some embodiments, a first plurality of ribs forms a first planar mounting surface for coupling the front battery cell to the curved temple arm housing, and a second plurality of ribs forms a second planar mounting surface for coupling the rear battery cell to the curved temple arm housing. For example, as described above in reference to FIGS. 1A-1H, the temple arm can include one or more pluralities of ribs 117 that provide a mounting surface for coupling the RFPCA 160, one or more power sources 170, and/or other electronic components. In some embodiments the placement of the ribs and the architecture of the curved temple arm housing are configured to accommodate battery swelling. In some embodiments, one or more pluralities of ribs 117 enhance stiffness of the external-environment-facing temple arm housing 105 in axes that it is beneficial to assembly at manufacturing. As described above, in some embodiments, the front battery cell assembly is positioned adjacent to a hinge assembly and the rear battery cell assembly is positioned adjacent to a tip-end portion of the curved temple arm housing.

(B12) In some embodiments of B11, the curved temple arm housing includes a plurality of alignment points, each alignment point of the plurality of alignment points positioned at a distinct corner of the planar mounting surface. The plurality of alignment points identifies a location for coupling the at least one electronic component of the set of electronic components to the curved temple arm housing. In some embodiments, the alignment points are used to align a component (e.g., a front battery cell, a rear battery cell, etc.) within 50 microns of a desired location (e.g., within a 50-micron accuracy of a predetermined location). In some embodiments, the plurality of alignment points operates as a marker that is used by a computer vision system for the placement of the at least one electronic component. For example, a computer vision system can detect the alignment points and uses the alignment points to guide the placement of the at least one electronic component (e.g., a battery cell). The plurality of alignment points 127 are described above in reference to FIGS. 1A-1H.

(B13) In some embodiments of any one of B1-B12, the temple arm further includes one or more ear pads. The one or more ear pads are configured to couple with the curved temple arm housing adjacent to the speaker. For example, as described above in reference to FIG. 1A-1H, the temple arm can include one or more ear shims 171. In some embodiments, the ear pads are coupled to the curved temple arm using magnets such they can be easily attached and removed from the temple arm. In some embodiments, the ear pads are coupled using adhesive. In some embodiments, if the user's ears are asymmetric (e.g., one ear is higher or lower than the other) or the tops of the user's ears do not align with the user's eyes (e.g., ears are below the eyes), the ear pads are used to fill the gap between the temple arm and the user's ear to make the pair of glasses more comfortable for the user to wear. In some embodiments, the ear pads are made out of silicon. The ear pads can be adjusted and/or selected to improve the user's overall comfort when wearing the temple arms and AR glasses.

(B14) In some embodiments of any one of B1-B13, the set of electronic components further include a flexible printed circuit (FPC) or rigid flexible printed circuit (RFPC) for conveying data to and from the microphone and/or and speakers. The FPC or RFPC is shaped to fit to the within the head shaped curvature of the curved temple arm housing. The PCB can have a first surface configured to couple with a first plurality of ribs, a second surface, perpendicular to the first surface, configured to bypass the speaker, and a third surface configured to couple with a second plurality of ribs. In some embodiments, one large RFPCA ties together all the electronics in the temple arm. In some embodiments, one or more of the RFPCA sections are rigid such as a first rigid part which is coupled to the MCU, charging circuitry, audio amp, Bluetooth device, etc. In some embodiments, a second portion of the RFPCA is rigid for the power button, LED and the connector. In some embodiments, parts of the RFPCA are stiffened for certain components (e.g., hinge and switch) but are not fully ridged or flexible. In some embodiments, a middle portion of the RFPCA is a narrow section which travels over the top of the audio output assembly (e.g., including the speaker). Example configurations of the RFPCA 160 are provided above in reference to FIGS. 1A-1H.

(B15) In some embodiments of any one of B1-B14, the set of electronic components further includes one or more of a proximity sensor; a temperature sensor; and an inertial measurement unit (IMU). In some embodiments, the speaker is part of an assembly (e.g., an audio output assembly) that includes a proximity sensor, a temperature sensor, the rear microphone, and an inertial measurement unit (IMU). The audio output assembly can have predetermined dimensions, such as 20 mm by 12.6 mm by 4.6 mm (+/−2%). In some embodiments, the audio output assembly occupies the entire height of the curved temple arm housing. In some embodiments, the curved temple arm housing includes a plurality of holes or apertures to accommodate the sounds from the speaker and allow sound to come into the microphone. The sensor deck 149 and other communicatively coupled devices described above in reference to FIGS. 1A-1H are an example of the audio output assembly. Additional examples of sensors included in the temple arms and/or head-wearable device are described below in reference to FIGS. 7A-7C.

(C1) In accordance with some embodiments, a temple arm includes one or more batteries (e.g., power sources 170; FIGS. 1A-1H), a speaker 145, one or more sensors, an external-environment-facing temple arm housing, and a skin-facing temple arm cover configured to couple with the external-environment-facing temple arm housing. The external-environment-facing temple arm housing includes a head shaped curvature to contour a portion of the user's head when the temple arm is worn, a cavity opposite an external-environment-facing surface of the external-environment-facing temple arm housing, and one or more troughs for receiving an adhesive. The cavity is configured to hold the one or more batteries, the speaker, and the one or more sensors. The skin-facing temple arm cover includes a corresponding head shaped curvature to contour the portion of the user's head when the temple arm is worn, and one of more tabs (e.g., one or more insert-ribs 195). When the skin-facing temple arm cover couples with the external-environment-facing temple arm housing, the skin-facing temple arm cover (i) encases the cavity and (ii) the one of more tabs engage the one or more troughs forming a mechanical bond with an adhesive received within the one or more troughs. FIGS. 1A-3B provide examples of coupling the skin-facing temple arm cover 190 to the curved temple arm housing 110.

(C2) In some embodiments of C1, the skin-facing temple arm cover further includes one or more snap tabs that are configured to mechanically coupled with the external-environment-facing temple arm housing such that the skin-facing temple arm cover remains coupled to the external-environment-facing temple arm housing while the adhesive cures. In some embodiments, the skin-facing temple arm cover includes 3 front snaps and 3 rear snaps. In some embodiments, the number of front snaps and/or the number of rear snaps within the skin-facing temple arm may vary (e.g., more or less than three front snaps and/or more or less than 3 rear snaps). Each snap is configured to couple to an internal surface of the external-environment-facing temple arm housing. For examples, as shown and described above in reference to FIGS. 1A-2, the one or more snap tabs 197 the skin-facing temple arm cover are received via the one or more tab-inserts 115 of the curved temple arm housing 110 and couple the skin-facing temple arm cover 190 with the curved temple arm housing 110. In some embodiments, the one or more snaps tabs provide additional structure to the temple arm.

(C3) In some embodiments of any one of C1-C2, the external-environment-facing temple arm housing includes one or more spacers (e.g., standoffs 310) such that when the skin-facing temple arm cover is coupled with the external-environment-facing temple arm housing a predetermined gap between the external-environment-facing temple arm housing and the skin-facing temple arm cover is formed. In some embodiments, the predetermined gap is configured to be 0.2 mm. This allows for an adhesive thickness of 0.2 mm to form between an edge of the cover and the housing. For example, as shown and described above in reference to FIGS. 3A and 3B, the standoffs 310 are configured to control or maintain a predetermined spacing (t) between respective portions of the skin-facing temple arm cover 190 and the external-environment-facing temple arm housing 105. In some embodiments, the adhesive thickness is a nominal thickness of 0.2 mm.

(C3.5) In some embodiments of C3, a first set of spacers of the one or more spacers is configured to control a visible cosmetic gap between the skin-facing temple arm cover and the external-environment-facing temple arm housing and a second set of spacers of the one or more spacers define a predetermine adhesive thickness.

(C4) In some embodiments of any one of C1-C3, the external-environment-facing temple arm housing includes a ledge configured to receive the adhesive, and the skin-facing temple arm cover includes one or more corresponding ledge structures. When the skin-facing temple arm cover couples with the external-environment-facing temple arm housing, the one or more corresponding ledge structures of the skin-facing temple arm cover contact the ledge of the external-environment-facing temple arm housing and form a mechanical bond with the adhesive received at the ledge. For examples, as described above in reference to FIG. 2, the one or more ledge ribs 209a-209c are configured to be received by an edge portion of the curved temple arm housing 110. The one or more ledge ribs 209a-209c can have different dimensions. For example, a ledge has a predetermined width that allows for one or more ledge ribs to be bonded by the adhesive.

(C5) In some embodiments of any one of C1-C4, the adhesive forms a hermetic seal. Specifically, the adhesive when cured creates a seal between the cover and the housing such that water cannot enter the hosing.

(C5.5) In some embodiments of any one of C1-C5, further including a gasket forming a hermetic seal between the skin-facing temple arm cover and the external-environment-facing temple arm housing when coupled. In some embodiments, the gasket is an LRS (silicone) gasket.

(C6) In some embodiments of any one of C1-C5.5, the skin-facing temple arm cover is formed of carbon fiber.

(C7) In some embodiments of any one of C1-C6, the skin-facing temple arm cover does not contact the one or more batteries, the speaker, and the one or more sensors. In some embodiments, the one or more batteries, the speaker, and the one or more sensors are mounted to an inner side of the skin-facing temple arm cover.

(C8) In some embodiments of any one of C1-C7, the temple arm is formed in accordance with any of A1, A2, and B1-B15.

(D1) In accordance with some embodiments, a temple arm housing includes a curved temple arm housing having a head shaped curvature to contour a portion of the user's head, a plurality of ribs, and a set of electronic components coupled within the head shaped curvature of the curved temple arm housing. The plurality of ribs forms a planar surface for coupling one or more electronic components and includes one or more identifiable marking for guiding placement of the one or more electronic components. The set of electronics includes a speaker, a front battery cell and a rear battery cell. The plurality of ribs defines an area for placement of at least the front battery cell or the rear battery cell such that a position of the set of electronic components is predetermined.

(D2) In some embodiments of D1, further including a pin for guiding placement of the speaker adjacent to a user's ear and between the front battery cell and the rear battery cell. For example, a temple arm housing can include a cross-shaped mounting fixture (e.g., mounting fixture 156) for guiding placement of the speaker.

(D3) In some embodiments of any one of D1-D2, the one or more identifiable markings are detectable using computer vision such that an autonomous manufacturing system can detect and place a subset of the electronic components. For example, as described above in reference to FIGS. 1A-1H, a curved temple arm housing 110 can include plurality of alignment points 127 for placing one or more electronic components.

(D4) In some embodiments of any one of D1-D3, the temple arm housing further includes a flexible printed circuit (FPC), or rigid flexible printed circuit (RFPC) configured to couple with the plurality of ribs, the FPC or RFPC positioned between the set of electronic components. For examples, as described above in reference to FIGS. 1A-1H, a curved temple arm housing 110 can include an RFPCA 160.

(D5) In some embodiments of any one of D1-D4, the temple arm is formed in accordance with any of A1, A2, B1-B15, and C1-C8.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU), microcontroller unit (MCU), etc.), is an electronic component that is responsible for executing instructions and controlling the operation of an electronic device (e.g., a wrist-wearable device 600, a head-wearable device, an HIPD 800, a smart textile-based garment (not shown), or other computer system). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs.

As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include: (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware, and/or boot loaders); (iii) flash memory, magnetic disk storage devices, optical disk storage devices, other non-volatile solid state storage devices, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, JSON data, etc.). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) bluetooth interfaces configured to allow devices to communicate with each other, including bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) WiFi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) light sensors (e.g., time-of-flight sensors, infrared light sensors, visible light sensors, etc.), and/or sensor for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogra (ECG or EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; (iii) messaging applications; (iv) media-streaming applications; (v) financial applications; (vi) calendars; (vii) clocks; (viii) web-browsers; (ix) social media applications, (x) camera applications, (xi) web-based applications; (xii) health applications; (xiii) artificial reality applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified.

Example AR Systems

Figure 5A:
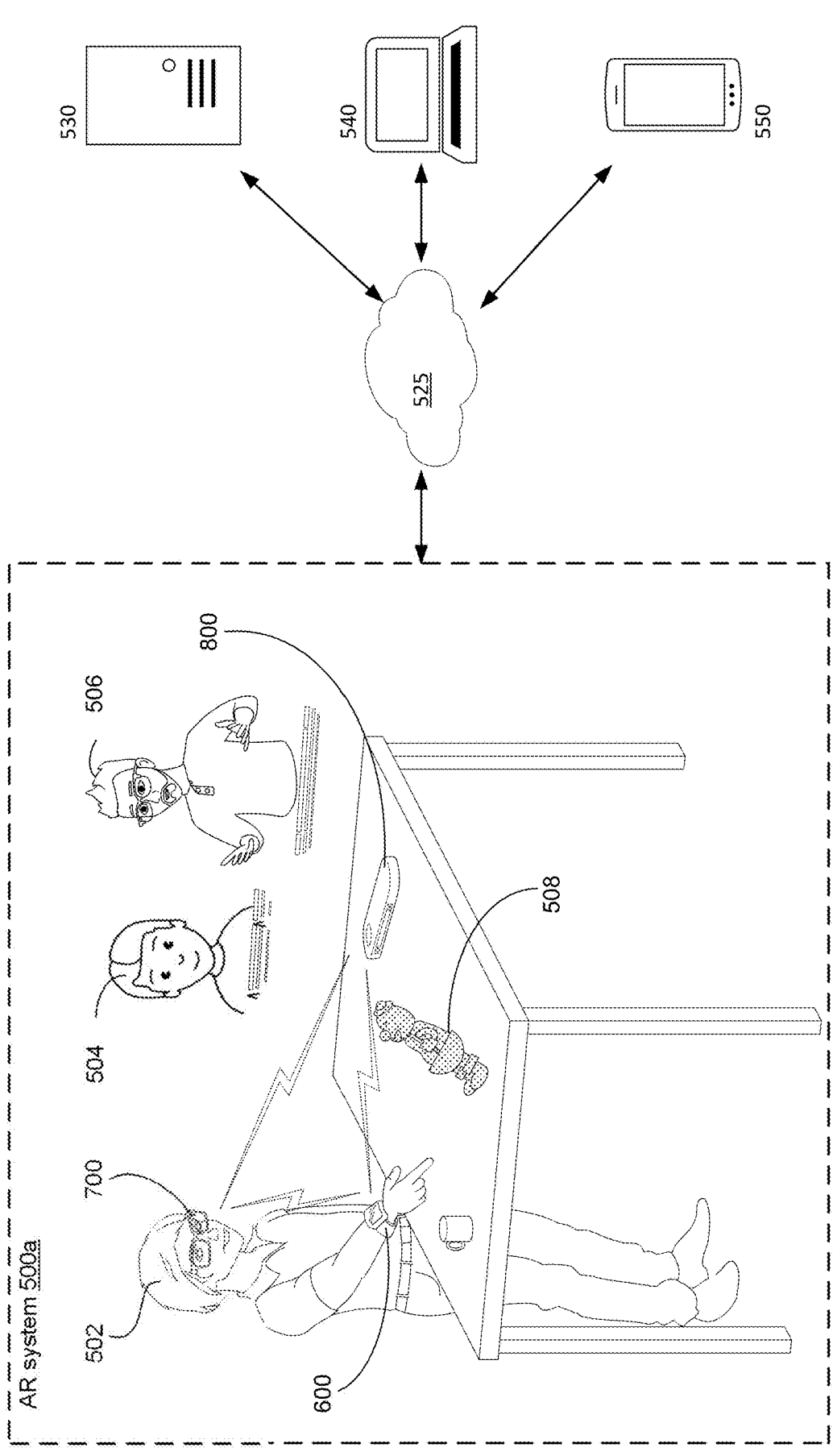
FIGS. 5A and 5B illustrate example artificial-reality systems, in accordance with some embodiments.
Figure 5B:
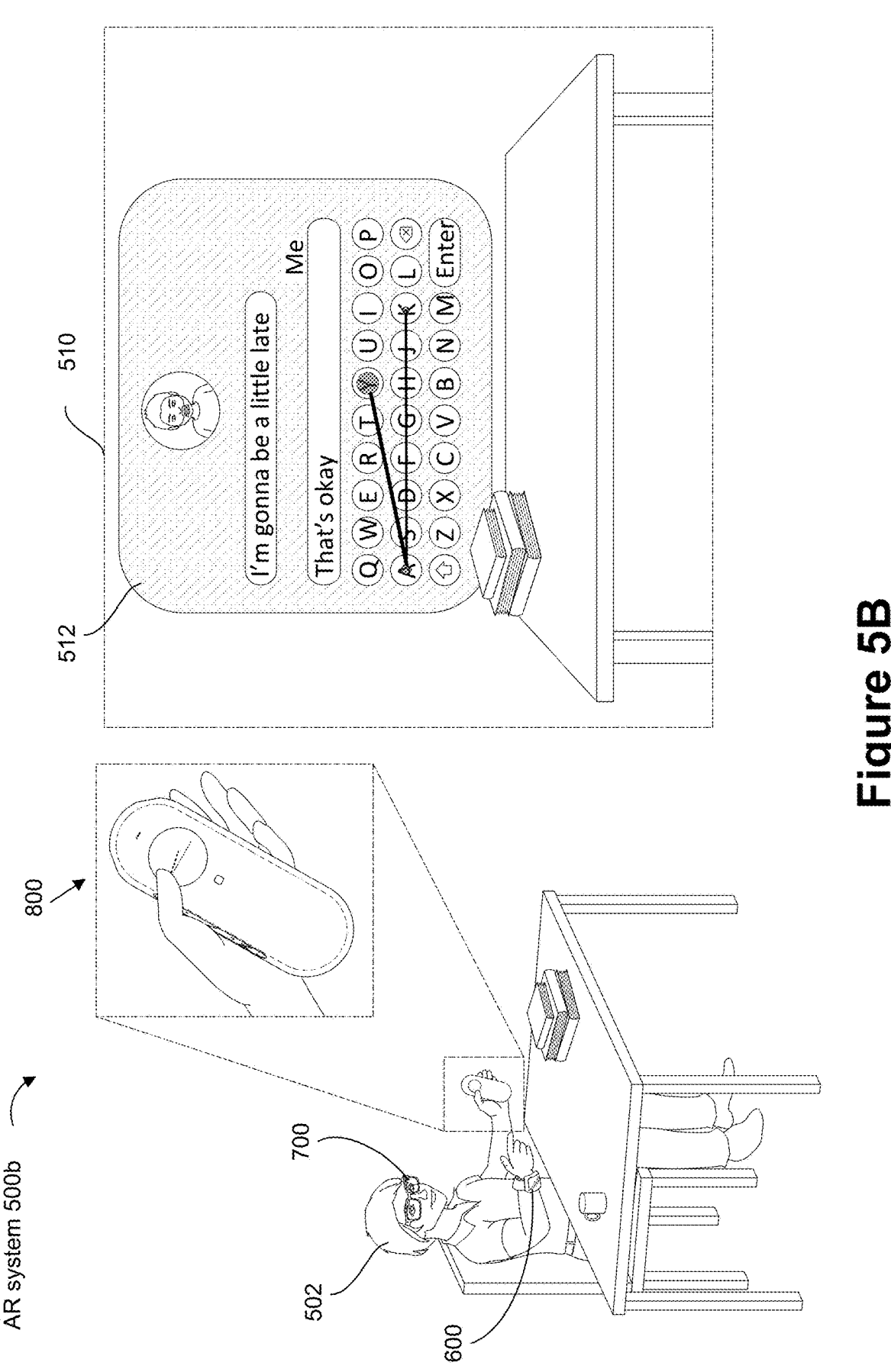

FIGS. 5A-5B illustrate example artificial-reality systems, in accordance with some embodiments. FIG. 5A shows a first AR system 500*a* and first example user interactions using a wrist-wearable device 600, a head-wearable device (e.g., AR device 700), and/or a handheld intermediary processing device (HIPD) 800. FIG. 5B shows a second AR system 500*b* and second example user interactions using a wrist-wearable device 600, AR device 700, and/or an HIPD 800. As the skilled artisan will appreciate upon reading the descriptions provided herein, the above-example AR systems (described in detail below) can operate using a head-wearable device (e.g., an AR device 700 and/or VR device 710) including a temple arm described above in reference to FIGS. 1A-4.

The wrist-wearable device 600 and one or more of its components are described below in reference to FIGS. 6A-6B; the head-wearable devices and their one or more components are described below in reference to FIGS. 7A-7D; and the HIPD 800 and its one or more components are described below in reference to FIGS. 8A-8B. The wrist-wearable device 600, the head-wearable devices, and/or the HIPD 800 can communicatively couple via a network 525 (e.g., cellular, near field, Wi-Fi, personal area network, wireless LAN, etc.). Additionally, the wrist-wearable device 600, the head-wearable devices, and/or the HIPD 800 can also communicatively couple with one or more servers 530, computers 540 (e.g., laptops, computers, etc.), mobile devices 550 (e.g., smartphones, tablets, etc.), and/or other electronic devices via the network 525 (e.g., cellular, near field, Wi-Fi, personal area network, wireless LAN, etc.)

Turning to FIG. 5A, a user 502 is shown wearing the wrist-wearable device 600 and the AR device 700, and having the HIPD 800 on their desk. The wrist-wearable device 600, the AR device 700, and the HIPD 800 facilitate user interaction with an AR environment. In particular, as shown by the first AR system 500*a*, the wrist-wearable device 600, the AR device 700, and/or the HIPD 800 cause presentation of one or more avatars 504, digital representations of contacts 506, and virtual objects 508. As discussed below, the user 502 can interact with the one or more avatars 504, digital representations of the contacts 506, and virtual objects 508 via the wrist-wearable device 600, the AR device 700, and/or the HIPD 800.

The user 502 can use any of the wrist-wearable device 600, the AR device 700, and/or the HIPD 800 to provide user inputs. For example, the user 502 can perform one or more hand gestures that are detected by the wrist-wearable device 600 (e.g., using one or more EMG sensors and/or IMUs, described below in reference to FIGS. 6A-6B) and/or AR device 700 (e.g. using one or more image sensor or camera, described below in reference to FIGS. 7A-7B) to provide a user input. Alternatively, or additionally, the user 502 can provide a user input via one or more touch surfaces of the wrist-wearable device 600, the AR device 700, and/or the HIPD 800, and/or voice commands captured by a microphone of the wrist-wearable device 600, the AR device 700, and/or the HIPD 800. In some embodiments, the wrist-wearable device 600, the AR device 700, and/or the HIPD 800 include a digital assistant to help the user in providing a user input (e.g., completing a sequence of operations, suggesting different operations or commands, providing reminders, confirming a command, etc.). In some embodiments, the user 502 can provide a user input via one or more facial gestures and/or facial expressions. For example, cameras of the wrist-wearable device 600, the AR device 700, and/or the HIPD 800 can track the user 502's eyes for navigating a user interface.

The wrist-wearable device 600, the AR device 700, and/or the HIPD 800 can operate alone or in conjunction to allow the user 502 to interact with the AR environment. In some embodiments, the HIPD 800 is configured to operate as a central hub or control center for the wrist-wearable device 600, the AR device 700, and/or another communicatively coupled device. For example, the user 502 can provide an input to interact with the AR environment at any of the wrist-wearable device 600, the AR device 700, and/or the HIPD 800, and the HIPD 800 can identify one or more back-end and front-end tasks to cause the performance of the requested interaction and distribute instructions to cause the performance of the one or more back-end and front-end tasks at the wrist-wearable device 600, the AR device 700, and/or the HIPD 800. In some embodiments, a back-end task is background processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 8A-8B, the HIPD 800 can perform the back-end tasks and provide the wrist-wearable device 600 and/or the AR device 700 operational data corresponding to the performed back-end tasks such that the wrist-wearable device 600 and/or the AR device 700 can perform the front-end tasks. In this way, the HIPD 800, which has more computational resources and greater thermal headroom than the wrist-wearable device 600 and/or the AR device 700, performs computationally intensive tasks and reduces the computer resource utilization and/or power usage of the wrist-wearable device 600 and/or the AR device 700.

In the example shown by the first AR system 500*a*, the HIPD 800 identifies one or more back-end tasks and front-end tasks associated with a user request to initiate an AR video call with one or more other users (represented by the avatar 504 and the digital representation of the contact 506) and distributes instructions to cause the performance of the one or more back-end tasks and front-end tasks. In particular, the HIPD 800 performs back-end tasks for processing and/or rendering image data (and other data) associated with the AR video call and provides operational data associated with the performed back-end tasks to the AR device 700 such that the AR device 700 perform front-end tasks for presenting the AR video call (e.g., presenting the avatar 504 and the digital representation of the contact 506).

In some embodiments, the HIPD 800 can operate as a focal or anchor point for causing the presentation of information. This allows the user 502 to be generally aware of where information is presented. For example, as shown in the first AR system 500*a*, the avatar 504 and the digital representation of the contact 506 are presented above the HIPD 800. In particular, the HIPD 800 and the AR device 700 operate in conjunction to determine a location for presenting the avatar 504 and the digital representation of the contact 506. In some embodiments, information can be presented a predetermined distance from the HIPD 800 (e.g., within 5 meters). For example, as shown in the first AR system 500*a*, virtual object 508 is presented on the desk some distance from the HIPD 800. Similar to the above example, the HIPD 800 and the AR device 700 can operate in conjunction to determine a location for presenting the virtual object 508. Alternatively, in some embodiments, presentation of information is not bound by the HIPD 800. More specifically, the avatar 504, the digital representation of the contact 506, and the virtual object 508 do not have to be presented within a predetermined distance of the HIPD 800.

User inputs provided at the wrist-wearable device 600, the AR device 700, and/or the HIPD 800 are coordinated such that the user can use any device to initiate, continue, and/or complete an operation. For example, the user 502 can provide a user input to the AR device 700 to cause the AR device 700 to present the virtual object 508 and, while the virtual object 508 is presented by the AR device 700, the user 502 can provide one or more hand gestures via the wrist-wearable device 600 to interact and/or manipulate the virtual object 508.

FIG. 5B shows the user 502 wearing the wrist-wearable device 600 and the AR device 700, and holding the HIPD 800. In the second AR system 500*b*, the wrist-wearable device 600, the AR device 700, and/or the HIPD 800 are used to receive and/or provide one or more messages to a contact of the user 502. In particular, the wrist-wearable device 600, the AR device 700, and/or the HIPD 800 detect and coordinate one or more user inputs to initiate a messaging application and prepare a response to a received message via the messaging application.

In some embodiments, the user 502 initiates, via a user input, an application on the wrist-wearable device 600, the AR device 700, and/or the HIPD 800 that causes the application to initiate on at least one device. For example, in the second AR system 500*b* the user 502 performs a hand gesture associated with a command for initiating a messaging application (represented by messaging user interface 512); the wrist-wearable device 600 detects the hand gesture; and, based on a determination that the user 502 is wearing AR device 700, causes the AR device 700 to present a messaging user interface 512 of the messaging application. The AR device 700 can present the messaging user interface 512 to the user 502 via its display (e.g., as shown by user 502's field of view 510). In some embodiments, the application is initiated and ran on the device (e.g., the wrist-wearable device 600, the AR device 700, and/or the HIPD 800) that detects the user input to initiate the application, and the device provides another device operational data to cause the presentation of the messaging application. For example, the wrist-wearable device 600 can detect the user input to initiate a messaging application; initiate and run the messaging application; and provide operational data to the AR device 700 and/or the HIPD 800 to cause presentation of the messaging application. Alternatively, the application can be initiated and ran at a device other than the device that detected the user input. For example, the wrist-wearable device 600 can detect the hand gesture associated with initiating the messaging application and cause the HIPD 800 to run the messaging application and coordinate the presentation of the messaging application.

Further, the user 502 can provide a user input provided at the wrist-wearable device 600, the AR device 700, and/or the HIPD 800 to continue and/or complete an operation initiated are at another device. For example, after initiating the messaging application via the wrist-wearable device 600 and while the AR device 700 present the messaging user interface 512, the user 502 can provide an input at the HIPD 800 to prepare a response (e.g., shown by the swipe gesture performed on the HIPD 800). The user 502's gestures performed on the HIPD 800 can be provided and/or displayed on another device. For example, the user 502's swipe gestured performed on the HIPD 800 are displayed on a virtual keyboard of the messaging user interface 512 displayed by the AR device 700.

In some embodiments, the wrist-wearable device 600, the AR device 700, the HIPD 800, and/or other communicatively couple device can present one or more notifications to the user 502. The notification can be an indication of a new message, an incoming call, an application update, a status update, etc. The user 502 can select the notification via the wrist-wearable device 600, the AR device 700, the HIPD 800, and cause presentation of an application or operation associated with the notification on at least one device. For example, the user 502 can receive a notification that a message was received at the wrist-wearable device 600, the AR device 700, the HIPD 800, and/or other communicatively couple device and provide a user input at the wrist-wearable device 600, the AR device 700, and/or the HIPD 800 to review the notification, and the device detecting the user input can cause an application associated with the notification to be initiated and/or presented at the wrist-wearable device 600, the AR device 700, and/or the HIPD 800.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 700 can present to the user 502 game application data and the HIPD 800 can use a controller to provide inputs to the game. Similarly, the user 502 can use the wrist-wearable device 600 to initiate a camera of the AR device 700, and the user can use the wrist-wearable device 600, the AR device 700, and/or the HIPD 800 to manipulate the image capture (e.g., zoom in or out, apply filters, etc.) and capture image data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Example Wrist-Wearable Devices

Figure 6A:
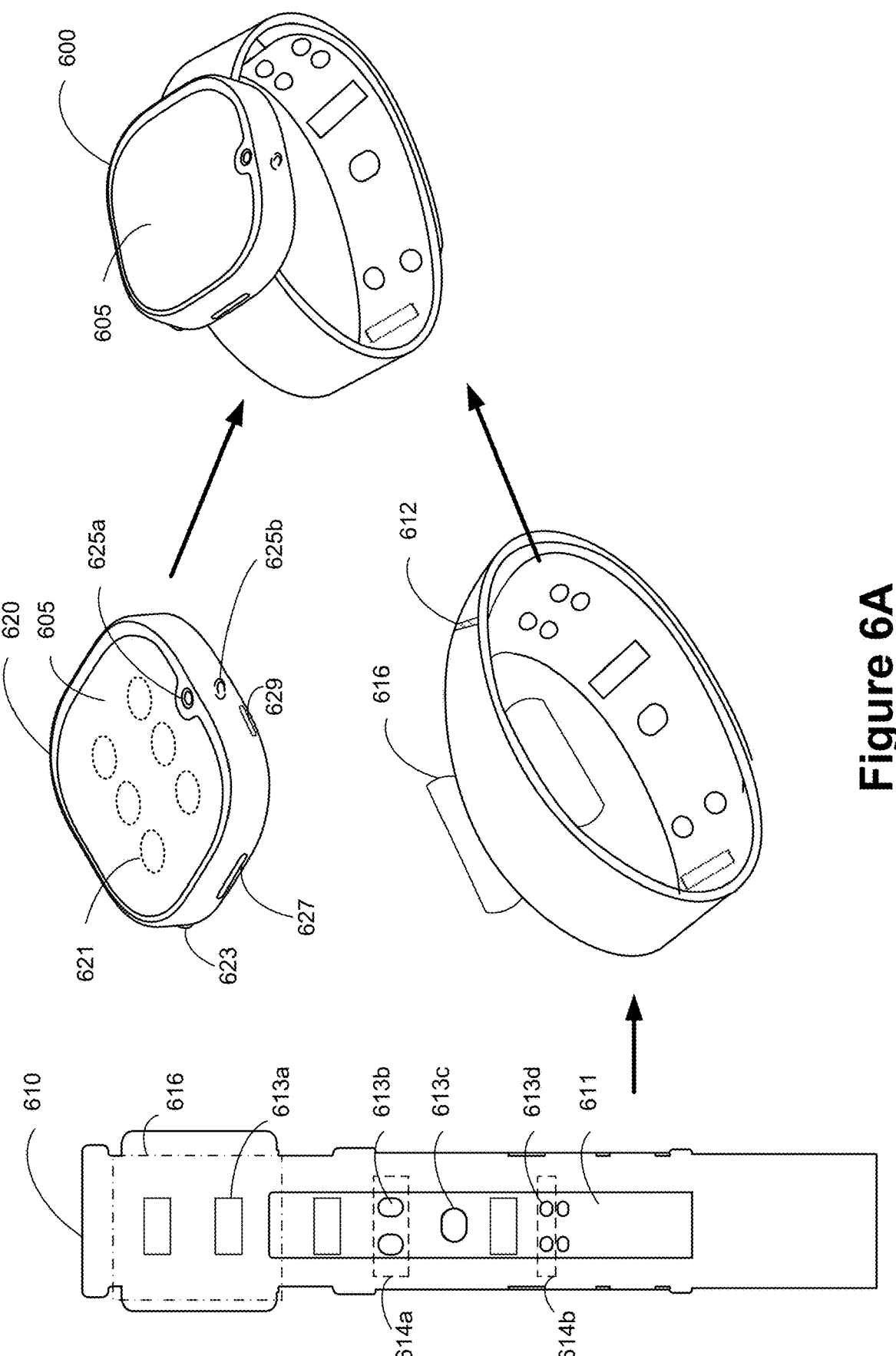
FIGS. 6A-6B illustrate an example wrist-wearable device, in accordance with some embodiments.
Figure 6B:
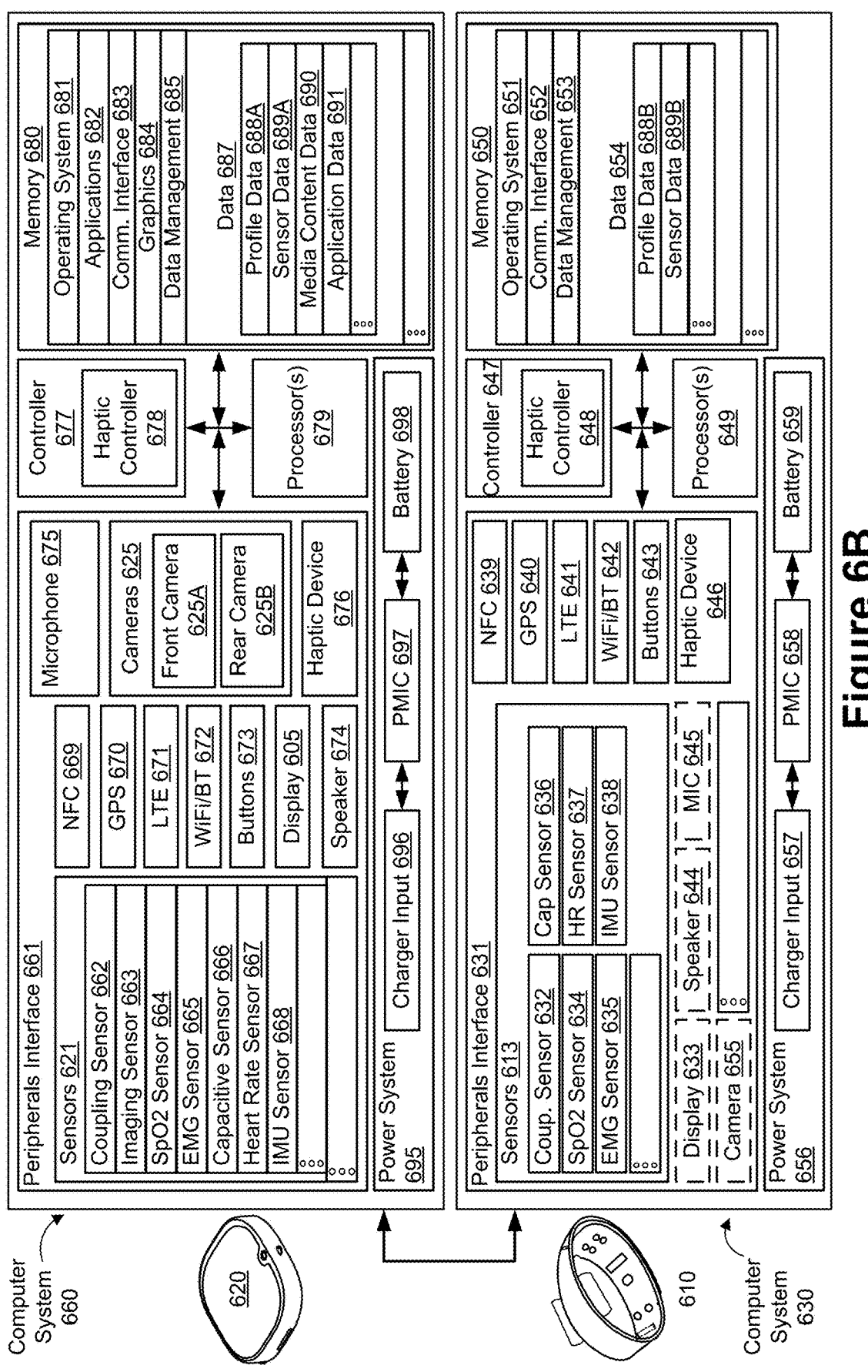

FIGS. 6A and 6B illustrate an example wrist-wearable device 600, in accordance with some embodiments. The wrist-wearable device 600 is an instance of the wearable device described in reference to FIGS. 5A and 5B herein, such that the wrist-wearable devices should be understood to have the features of the wrist-wearable device 600. FIG. 6A illustrates components of the wrist-wearable device 600, which can be used individually or in combination, including combinations that include other electronic devices and/or electronic components.

FIG. 6A shows a wearable band 610 and a watch body 620 (or capsule) being coupled, as discussed below, to form the wrist-wearable device 600. The wrist-wearable device 600 can perform various functions and/or operations associated with navigating through user interfaces and selectively opening applications.

As will be described in more detail below, operations executed by the wrist-wearable device 600 can include: (i) presenting content to a user (e.g., displaying visual content via a display 605); (ii) detecting (e.g., sensing) user input (e.g., sensing a touch on peripheral button 623 and/or at a touch screen of the display 605, a hand gesture detected by sensors (e.g., biopotential sensors)); (iii) sensing biometric data via one or more sensors 613 (e.g., neuromuscular signals, heart rate, temperature, sleep, etc.); messaging (e.g., text, speech, video, etc.); image capture via one or more imaging devices or cameras 625; wireless communications (e.g., cellular, near field, Wi-Fi, personal area network, etc.); location determination; financial transactions; providing haptic feedback; alarms; notifications; biometric authentication; health monitoring; sleep monitoring; etc.

The above-example functions can be executed independently in the watch body 620, independently in the wearable band 610, and/or via an electronic communication between the watch body 620 and the wearable band 610. In some embodiments, functions can be executed on the wrist-wearable device 600 while an AR environment is being presented (e.g., via one of the AR systems 500*a* and 500*b*). As the skilled artisan will appreciate upon reading the descriptions provided herein, the novel wearable devices described herein can be used with other types of AR environments.

The wearable band 610 can be configured to be worn by a user such that an inner (or inside) surface of the wearable structure 611 of the wearable band 610 is in contact with the user's skin. When worn by a user, sensors 613 contact the user's skin. The sensors 613 can sense biometric data such as a user's heart rate, saturated oxygen level, temperature, sweat level, neuromuscular signal sensors, or a combination thereof. The sensors 613 can also sense data about a user's environment including a user's motion, altitude, location, orientation, gait, acceleration, position, or a combination thereof. In some embodiment, the sensors 613 are configured to track a position and/or motion of the wearable band 610. The one or more sensors 613 can include any of the sensors defined above and/or discussed below with respect to FIG. 6B.

The one or more sensors 613 can be distributed on an inside and/or an outside surface of the wearable band 610. In some embodiments, the one or more sensors 613 are uniformly spaced along the wearable band 610. Alternatively, in some embodiments, the one or more sensors 613 are positioned at distinct points along the wearable band 610. As shown in FIG. 6A, the one or more sensors 613 can be the same or distinct. For example, in some embodiments, the one or more sensors 613 can be shaped as a pill (e.g., sensor 613*a*), an oval, a circle a square, an oblong (e.g., sensor 613*c*) and/or any other shape that maintains contact with the user's skin (e.g., such that neuromuscular signal and/or other biometric data can be accurately measured at the user's skin). In some embodiments, the one or more sensors 613 are aligned to form pairs of sensors (e.g., for sensing neuromuscular signals based on differential sensing within each respective sensor). For example, sensor 613*b* is aligned with an adjacent sensor to form sensor pair 614*a* and sensor 613*d* aligned with an adjacent sensor to form sensor pair 614*b*. In some embodiments, the wearable band 610 does not have a sensor pair. Alternatively, in some embodiments, the wearable band 610 has a predetermined number of sensor pairs (one pair of sensors, three pairs of sensors, four pairs of sensors, six pairs of sensors, sixteen pairs of sensors, etc.).

The wearable band 610 can include any suitable number of sensors 613. In some embodiments, the number and arrangement of sensors 613 depends on the particular application for which the wearable band 610 is used. For instance, a wearable band 610 configured as an armband, wristband, or chest-band may include a plurality of sensors 613 with different number of sensors 613 and different arrangement for each use case, such as medical use cases as compared to gaming or general day-to-day use cases.

In accordance with some embodiments, the wearable band 610 further includes an electrical ground electrode and a shielding electrode. The electrical ground and shielding electrodes, like the sensors 613, can be distributed on the inside surface of the wearable band 610 such that they contact a portion of the user's skin. For example, the electrical ground and shielding electrodes can be at an inside surface of coupling mechanism 616 or an inside surface of a wearable structure 611. The electrical ground and shielding electrodes can be formed and/or use the same components as the sensors 613. In some embodiments, the wearable band 610 includes more than one electrical ground electrode and more than one shielding electrode.

The sensors 613 can be formed as part of the wearable structure 611 of the wearable band 610. In some embodiments, the sensors 613 are flush or substantially flush with the wearable structure 611 such that they do not extend beyond the surface of the wearable structure 611. While flush with the wearable structure 611, the sensors 613 are still configured to contact the user's skin (e.g., via a skin-contacting surface). Alternatively, in some embodiments, the sensors 613 extend beyond the wearable structure 611 a predetermined distance (e.g., 0.1-2 mm) to make contact and depress into the user's skin. In some embodiment, the sensors 613 are coupled to an actuator (not shown) configured to adjust an extension height (e.g., a distance from the surface of the wearable structure 611) of the sensors 613 such that the sensors 613 make contact and depress into the user's skin. In some embodiments, the actuators adjust the extension height between 0.01 mm-1.2 mm. This allows the user to customize the positioning of the sensors 613 to improve the overall comfort of the wearable band 610 when worn while still allowing the sensors 613 to contact the user's skin. In some embodiments, the sensors 613 are indistinguishable from the wearable structure 611 when worn by the user.

The wearable structure 611 can be formed of an elastic material, elastomers, etc. configured to be stretched and fitted to be worn by the user. In some embodiments, the wearable structure 611 is a textile or woven fabric. As described above, the sensors 613 can be formed as part of a wearable structure 611. For example, the sensors 613 can be molded into the wearable structure 611 or be integrated into a woven fabric (e.g., the sensors 613 can be sewn into the fabric and mimic the pliability of fabric (e.g., the sensors 613 can be constructed from a series woven strands of fabric)).

The wearable structure 611 can include flexible electronic connectors that interconnect the sensors 613, the electronic circuitry, and/or other electronic components (described below in reference to FIG. 6B) that are enclosed in the wearable band 610. In some embodiments, the flexible electronic connectors are configured to interconnect the sensors 613, the electronic circuitry, and/or other electronic components of the wearable band 610 with respective sensors and/or other electronic components of another electronic device (e.g., watch body 620). The flexible electronic connectors are configured to move with the wearable structure 611 such that the user adjustment to the wearable structure 611 (e.g., resizing, pulling, folding, etc.) does not stress or strain the electrical coupling of components of the wearable band 610.

As described above, the wearable band 610 is configured to be worn by a user. In particular, the wearable band 610 can be shaped or otherwise manipulated to be worn by a user. For example, the wearable band 610 can be shaped to have a substantially circular shape such that it can be configured to be worn on the user's lower arm or wrist. Alternatively, the wearable band 610 can be shaped to be worn on another body part of the user, such as the user's upper arm (e.g., around a bicep), forearm, chest, legs, etc. The wearable band 610 can include a retaining mechanism 612 (e.g., a buckle, a hook and loop fastener, etc.) for securing the wearable band 610 to the user's wrist or other body part. While the wearable band 610 is worn by the user, the sensors 613 sense data (referred to as sensor data) from the user's skin. In particular, the sensors 613 of the wearable band 610 obtain (e.g., sense and record) neuromuscular signals.

The sensed data (e.g., sensed neuromuscular signals) can be used to detect and/or determine the user's intention to perform certain motor actions. In particular, the sensors 613 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 605 of the wrist-wearable device 600 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table;

dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 613 can be used to provide a user with an enhanced interaction with a physical object (e.g., devices communicatively coupled with the wearable band 610) and/or a virtual object in an artificial-reality application generated by an artificial-reality system (e.g., user interface objects presented on the display 605, or another computing device (e.g., a smartphone)).

In some embodiments, the wearable band 610 includes one or more haptic devices 646 (FIG. 6B, e.g., a vibratory haptic actuator) that are configured to provide haptic feedback (e.g., a cutaneous and/or kinesthetic sensation, etc.) to the user's skin. The sensors 613, and/or the haptic devices 646 can be configured to operate in conjunction with multiple applications including, without limitation, health monitoring, social media, games, and artificial reality (e.g., the applications associated with artificial reality).

The wearable band 610 can also include coupling mechanism 616 (e.g., a cradle or a shape of the coupling mechanism can correspond to shape of the watch body 620 of the wrist-wearable device 600) for detachably coupling a capsule (e.g., a computing unit) or watch body 620 (via a coupling surface of the watch body 620) to the wearable band 610. In particular, the coupling mechanism 616 can be configured to receive a coupling surface proximate to the bottom side of the watch body 620 (e.g., a side opposite to a front side of the watch body 620 where the display 605 is located), such that a user can push the watch body 620 downward into the coupling mechanism 616 to attach the watch body 620 to the coupling mechanism 616. In some embodiments, the coupling mechanism 616 can be configured to receive a top side of the watch body 620 (e.g., a side proximate to the front side of the watch body 620 where the display 605 is located) that is pushed upward into the cradle, as opposed to being pushed downward into the coupling mechanism 616. In some embodiments, the coupling mechanism 616 is an integrated component of the wearable band 610 such that the wearable band 610 and the coupling mechanism 616 are a single unitary structure. In some embodiments, the coupling mechanism 616 is a type of frame or shell that allows the watch body 620 coupling surface to be retained within or on the wearable band 610 coupling mechanism 616 (e.g., a cradle, a tracker band, a support base, a clasp, etc.).

The coupling mechanism 616 can allow for the watch body 620 to be detachably coupled to the wearable band 610 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 620 to the wearable band 610 and to decouple the watch body 620 from the wearable band 610. For example, a user can twist, slide, turn, push, pull, or rotate the watch body 620 relative to the wearable band 610, or a combination thereof, to attach the watch body 620 to the wearable band 610 and to detach the watch body 620 from the wearable band 610. Alternatively, as discussed below, in some embodiments, the watch body 620 can be decoupled from the wearable band 610 by actuation of the release mechanism 629.

The wearable band 610 can be coupled with a watch body 620 to increase the functionality of the wearable band 610 (e.g., converting the wearable band 610 into a wrist-wearable device 600, adding an additional computing unit and/or battery to increase computational resources and/or a battery life of the wearable band 610, adding additional sensors to improve sensed data, etc.). As described above, the wearable band 610 (and the coupling mechanism 616) is configured to operate independently (e.g., execute functions independently) from watch body 620. For example, the coupling mechanism 616 can include one or more sensors 613 that contact a user's skin when the wearable band 610 is worn by the user and provide sensor data for determining control commands.

A user can detach the watch body 620 (or capsule) from the wearable band 610 in order to reduce the encumbrance of the wrist-wearable device 600 to the user. For embodiments in which the watch body 620 is removable, the watch body 620 can be referred to as a removable structure, such that in these embodiments the wrist-wearable device 600 includes a wearable portion (e.g., the wearable band 610) and a removable structure (the watch body 620).

Turning to the watch body 620, the watch body 620 can have a substantially rectangular or circular shape. The watch body 620 is configured to be worn by the user on their wrist or on another body part. More specifically, the watch body 620 is sized to be easily carried by the user, attached on a portion of the user's clothing, and/or coupled to the wearable band 610 (forming the wrist-wearable device 600). As described above, the watch body 620 can have a shape corresponding to the coupling mechanism 616 of the wearable band 610. In some embodiments, the watch body 620 includes a single release mechanism 629 or multiple release mechanisms (e.g., two release mechanisms 629 positioned on opposing sides of the watch body 620, such as spring-loaded buttons) for decoupling the watch body 620 and the wearable band 610. The release mechanism 629 can include, without limitation, a button, a knob, a plunger, a handle, a lever, a fastener, a clasp, a dial, a latch, or a combination thereof.

A user can actuate the release mechanism 629 by pushing, turning, lifting, depressing, shifting, or performing other actions on the release mechanism 629. Actuation of the release mechanism 629 can release (e.g., decouple) the watch body 620 from the coupling mechanism 616 of the wearable band 610, allowing the user to use the watch body 620 independently from wearable band 610, and vice versa. For example, decoupling the watch body 620 from the wearable band 610 can allow the user to capture images using rear-facing camera 625B. Although the is shown positioned at a corner of watch body 620, the release mechanism 629 can be positioned anywhere on watch body 620 that is convenient for the user to actuate. In addition, in some embodiments, the wearable band 610 can also include a respective release mechanism for decoupling the watch body 620 from the coupling mechanism 616. In some embodiments, the release mechanism 629 is optional and the watch body 620 can be decoupled from the coupling mechanism 616 as described above (e.g., via twisting, rotating, etc.).

The watch body 620 can include one or more peripheral buttons 623 and 627 for performing various operations at the watch body 620. For example, the peripheral buttons 623 and 627 can be used to turn on or wake (e.g., transition from a sleep state to an active state) the display 605, unlock the watch body 620, increase or decrease a volume, increase or decrease a brightness, interact with one or more applications, interact with one or more user interfaces, etc. Additionally, or alternatively, in some embodiments, the display 605 operates as a touch screen and allows the user to provide one or more inputs for interacting with the watch body 620.

In some embodiments, the watch body 620 includes one or more sensors 621. The sensors 621 of the watch body 620 can be the same or distinct from the sensors 613 of the wearable band 610. The sensors 621 of the watch body 620 can be distributed on an inside and/or an outside surface of the watch body 620. In some embodiments, the sensors 621 are configured to contact a user's skin when the watch body 620 is worn by the user. For example, the sensors 621 can be placed on the bottom side of the watch body 620 and the coupling mechanism 616 can be a cradle with an opening that allows the bottom side of the watch body 620 to directly contact the user's skin. Alternatively, in some embodiments, the watch body 620 does not include sensors that are configured to contact the user's skin (e.g., including sensors internal and/or external to the watch body 620 that configured to sense data of the watch body 620 and the watch body 620's surrounding environment). In some embodiment, the sensors 613 are configured to track a position and/or motion of the watch body 620.

The watch body 620 and the wearable band 610 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 620 and the wearable band 610 can share data sensed by the sensors 613 and 621, as well as application and device specific information (e.g., active and/or available applications, output devices (e.g., display, speakers, etc.), input devices (e.g., touch screen, microphone, imaging sensors, etc.).

In some embodiments, the watch body 620 can include, without limitation, a front-facing camera 625A and/or a rear-facing camera 625B, sensors 621 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 663; FIG. 6B), a touch sensor, a sweat sensor, etc.). In some embodiments, the watch body 620 can include one or more haptic devices 676 (FIG. 6B; a vibratory haptic actuator) that is configured to provide haptic feedback (e.g., a cutaneous and/or kinesthetic sensation, etc.) to the user. The sensors 621 and/or the haptic device 676 can also be configured to operate in conjunction with multiple applications including, without limitation, health monitoring applications, social media applications, game applications, and artificial reality applications (e.g., the applications associated with artificial reality).

As described above, the watch body 620 and the wearable band 610, when coupled, can form the wrist-wearable device 600. When coupled, the watch body 620 and wearable band 610 operate as a single device to execute functions (operations, detections, communications, etc.) described herein. In some embodiments, each device is provided with particular instructions for performing the one or more operations of the wrist-wearable device 600. For example, in accordance with a determination that the watch body 620 does not include neuromuscular signal sensors, the wearable band 610 can include alternative instructions for performing associated instructions (e.g., providing sensed neuromuscular signal data to the watch body 620 via a different electronic device). Operations of the wrist-wearable device 600 can be performed by the watch body 620 alone or in conjunction with the wearable band 610 (e.g., via respective processors and/or hardware components) and vice versa. In some embodiments, operations of the wrist-wearable device 600, the watch body 620, and/or the wearable band 610 can be performed in conjunction with one or more processors and/or hardware components of another communicatively coupled device (e.g., the HIPD 800; FIGS. 8A-8B).

As described below with reference to the block diagram of FIG. 6B, the wearable band 610 and/or the watch body 620 can each include independent resources required to independently execute functions. For example, the wearable band 610 and/or the watch body 620 can each include a power source (e.g., a battery), a memory, data storage, a processor (e.g., a central processing unit (CPU)), communications, a light source, and/or input/output devices.

FIG. 6B shows block diagrams of a computing system 630 corresponding to the wearable band 610, and a computing system 660 corresponding to the watch body 620, according to some embodiments. A computing system of the wrist-wearable device 600 includes a combination of components of the wearable band computing system 630 and the watch body computing system 660, in accordance with some embodiments.

The watch body 620 and/or the wearable band 610 can include one or more components shown in watch body computing system 660. In some embodiments, a single integrated circuit includes all or a substantial portion of the components of the watch body computing system 660 are included in a single integrated circuit. Alternatively, in some embodiments, components of the watch body computing system 660 are included in a plurality of integrated circuits that are communicatively coupled. In some embodiments, the watch body computing system 660 is configured to couple (e.g., via a wired or wireless connection) with the wearable band computing system 630, which allows the computing systems to share components, distribute tasks, and/or perform other operations described herein (individually or as a single device).

The watch body computing system 660 can include one or more processors 679, a controller 677, a peripherals interface 661, a power system 695, and memory (e.g., a memory 680), each of which are defined above and described in more detail below.

The power system 695 can include a charger input 696, a power-management integrated circuit (PMIC) 697, and a battery 698, each are which are defined above. In some embodiments, a watch body 620 and a wearable band 610 can have respective charger inputs (e.g., charger input 696 and 657), respective batteries (e.g., battery 698 and 659), and can share power with each other (e.g., the watch body 620 can power and/or charge the wearable band 610, and vice versa). Although watch body 620 and/or the wearable band 610 can include respective charger inputs, a single charger input can charge both devices when coupled. The watch body 620 and the wearable band 610 can receive a charge using a variety of techniques. In some embodiments, the watch body 620 and the wearable band 610 can use a wired charging assembly (e.g., power cords) to receive the charge. Alternatively, or in addition, the watch body 620 and/or the wearable band 610 can be configured for wireless charging. For example, a portable charging device can be designed to mate with a portion of watch body 620 and/or wearable band 610 and wirelessly deliver usable power to a battery of watch body 620 and/or wearable band 610. The watch body 620 and the wearable band 610 can have independent power systems (e.g., power system 695 and 656) to enable each to operate independently. The watch body 620 and wearable band 610 can also share power (e.g., one can charge the other) via respective PMICs (e.g., PMICs 697 and 658) that can share power over power and ground conductors and/or over wireless charging antennas.

In some embodiments, the peripherals interface 661 can include one or more sensors 621, many of which listed below are defined above. The sensors 621 can include one or more coupling sensor 662 for detecting when the watch body 620 is coupled with another electronic device (e.g., a wearable band 610). The sensors 621 can include imaging sensors 663 (one or more of the cameras 625, and/or separate imaging sensors 663 (e.g., thermal-imaging sensors)). In some embodiments, the sensors 621 include one or more SpO2 sensors 664. In some embodiments, the sensors 621 include one or more biopotential-signal sensors (e.g., EMG sensors 665, which may be disposed on a user-facing portion of the watch body 620 and/or the wearable band 610). In some embodiments, the sensors 621 include one or more capacitive sensors 666. In some embodiments, the sensors 621 include one or more heart rate sensors 667. In some embodiments, the sensors 621 include one or more IMUs 668. In some embodiments, one or more IMUs 668 can be configured to detect movement of a user's hand or other location that the watch body 620 is placed or held).

In some embodiments, the peripherals interface 661 includes a near-field communication (NFC) component 669, a global-position system (GPS) component 670, a long-term evolution (LTE) component 671, and/or a Wi-Fi and/or Bluetooth communication component 672. In some embodiments, the peripherals interface 661 includes one or more buttons 673 (e.g., the peripheral buttons 623 and 627 in FIG. 6A), which, when selected by a user, cause operation to be performed at the watch body 620. In some embodiments, the peripherals interface 661 includes one or more indicators, such as a light emitting diode (LED), to provide a user with visual indicators (e.g., message received, low battery, active microphone and/or camera, etc.).

The watch body 620 can include at least one display 605, for displaying visual representations of information or data to the user, including user-interface elements and/or three-dimensional virtual objects. The display can also include a touch screen for inputting user inputs, such as touch gestures, swipe gestures, and the like. The watch body 620 can include at least one speaker 674 and at least one microphone 675 for providing audio signals to the user and receiving audio input from the user. The user can provide user inputs through the microphone 675 and can also receive audio output from the speaker 674 as part of a haptic event provided by the haptic controller 678. The watch body 620 can include at least one camera 625, including a front-facing camera 625A and a rear-facing camera 625B. The cameras 625 can include ultra-wide-angle cameras, wide angle cameras, fish-eye cameras, spherical cameras, telephoto cameras, a depth-sensing cameras, or other types of cameras.

The watch body computing system 660 can include one or more haptic controllers 678 and associated componentry (e.g., haptic devices 676) for providing haptic events at the watch body 620 (e.g., a vibrating sensation or audio output in response to an event at the watch body 620). The haptic controllers 678 can communicate with one or more haptic devices 676, such as electroacoustic devices, including a speaker of the one or more speakers 674 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 678 can provide haptic events to that are capable of being sensed by a user of the watch body 620. In some embodiments, the one or more haptic controllers 678 can receive input signals from an application of the applications 682.

In some embodiments, the computer system 630 and/or the computer system 660 can include memory 680, which can be controlled by a memory controller of the one or more controllers 677 and/or one or more processors 679. In some embodiments, software components stored in the memory 680 include one or more applications 682 configured to perform operations at the watch body 620. In some embodiments, the one or more applications 682 include games, word processors, messaging applications, calling applications, web browsers, social media applications, media streaming applications, financial applications, calendars, clocks, etc. In some embodiments, software components stored in the memory 680 include one or more communication interface modules 683 as defined above. In some embodiments, software components stored in the memory 680 include one or more graphics modules 684 for rendering, encoding, and/or decoding audio and/or visual data; and one or more data management modules 685 for collecting, organizing, and/or providing access to the data 687 stored in memory 680. In some embodiments, one or more of applications 682 and/or one or more modules can work in conjunction with one another to perform various tasks at the watch body 620.

In some embodiments, software components stored in the memory 680 can include one or more operating systems 681 (e.g., a Linux-based operating system, an Android operating system, etc.). The memory 680 can also include data 687. The data 687 can include profile data 688A, sensor data 689A, media content data 690, and application data 691.

It should be appreciated that the watch body computing system 660 is an example of a computing system within the watch body 620, and that the watch body 620 can have more or fewer components than shown in the watch body computing system 660, combine two or more components, and/or have a different configuration and/or arrangement of the components. The various components shown in watch body computing system 660 are implemented in hardware, software, firmware, or a combination thereof, including one or more signal processing and/or application-specific integrated circuits.

Turning to the wearable band computing system 630, one or more components that can be included in the wearable band 610 are shown. The wearable band computing system 630 can include more or fewer components than shown in the watch body computing system 660, combine two or more components, and/or have a different configuration and/or arrangement of some or all of the components. In some embodiments, all, or a substantial portion of the components of the wearable band computing system 630 are included in a single integrated circuit. Alternatively, in some embodiments, components of the wearable band computing system 630 are included in a plurality of integrated circuits that are communicatively coupled. As described above, in some embodiments, the wearable band computing system 630 is configured to couple (e.g., via a wired or wireless connection) with the watch body computing system 660, which allows the computing systems to share components, distribute tasks, and/or perform other operations described herein (individually or as a single device).

The wearable band computing system 630, similar to the watch body computing system 660, can include one or more processors 649, one or more controllers 647 (including one or more haptics controller 648), a peripherals interface 631 that can includes one or more sensors 613 and other peripheral devices, power source (e.g., a power system 656), and memory (e.g., a memory 650) that includes an operating system (e.g., an operating system 651), data (e.g., data 654 including profile data 688B, sensor data 689B, etc.), and one or more modules (e.g., a communications interface module 652, a data management module 653, etc.).

The one or more sensors 613 can be analogous to sensors 621 of the computer system 660 and in light of the definitions above. For example, sensors 613 can include one or more coupling sensors 632, one or more SpO2 sensor 634, one or more EMG sensors 635, one or more capacitive sensor 636, one or more heart rate sensor 637, and one or more IMU 638.

The peripherals interface 631 can also include other components analogous to those included in the peripheral interface 661 of the computer system 660, including an NFC component 639, a GPS component 640, an LTE component 641, a Wi-Fi and/or Bluetooth communication component 642, and/or one or more haptic devices 676 as described above in reference to peripherals interface 661. In some embodiments, the peripherals interface 631 includes one or more buttons 643, a display 633, a speaker 644, a microphone 645, and a camera 655. In some embodiments, the peripherals interface 631 includes one or more indicators, such as an LED.

It should be appreciated that the wearable band computing system 630 is an example of a computing system within the wearable band 610, and that the wearable band 610 can have more or fewer components than shown in the wearable band computing system 630, combine two or more components, and/or have a different configuration and/or arrangement of the components. The various components shown in wearable band computing system 630 can be implemented in one or a combination of hardware, software, firmware, including one or more signal processing and/or application-specific integrated circuits.

The wrist-wearable device 600 with respect to FIG. 6A is an example of the wearable band 610 and the watch body 620 coupled, so the wrist-wearable device 600 will be understood to include the components shown and described for the wearable band computing system 630 and the watch body computing system 660. In some embodiments, wrist-wearable device 600 has a split architecture (e.g., a split mechanical architecture, a split electrical architecture) between the watch body 620 and the wearable band 610. In other words, all of the components shown in the wearable band computing system 630 and the watch body computing system 660 can be housed or otherwise disposed in a combined watch device 600, or within individual components of the watch body 620, wearable band 610, and/or portions thereof (e.g., a coupling mechanism 616 of the wearable band 610).

The techniques described above can be used with any device for sensing neuromuscular signals, including the arm-wearable devices of FIG. 6A-6B, but could also be used with other types of wearable devices for sensing neuromuscular signals (such as body-wearable or head-wearable devices that might have neuromuscular sensors closer to the brain or spinal column).

In some embodiments, a wrist-wearable device 600 can be used in conjunction with a head-wearable device described below (e.g., AR device 700 and VR device 710)

and/or an HIPD 800; and the wrist-wearable device 600 can also be configured to be used to allow a user to control aspect of the artificial reality (e.g., by using EMG-based gestures to control user interface objects in the artificial reality and/or by allowing a user to interact with the touchscreen on the wrist-wearable device to also control aspects of the artificial reality). Having thus described example wrist-wearable device, attention will now be turned to example head-wearable devices, such AR device 700 and VR device 710.

Example Head-Wearable Devices

Figure 7A:
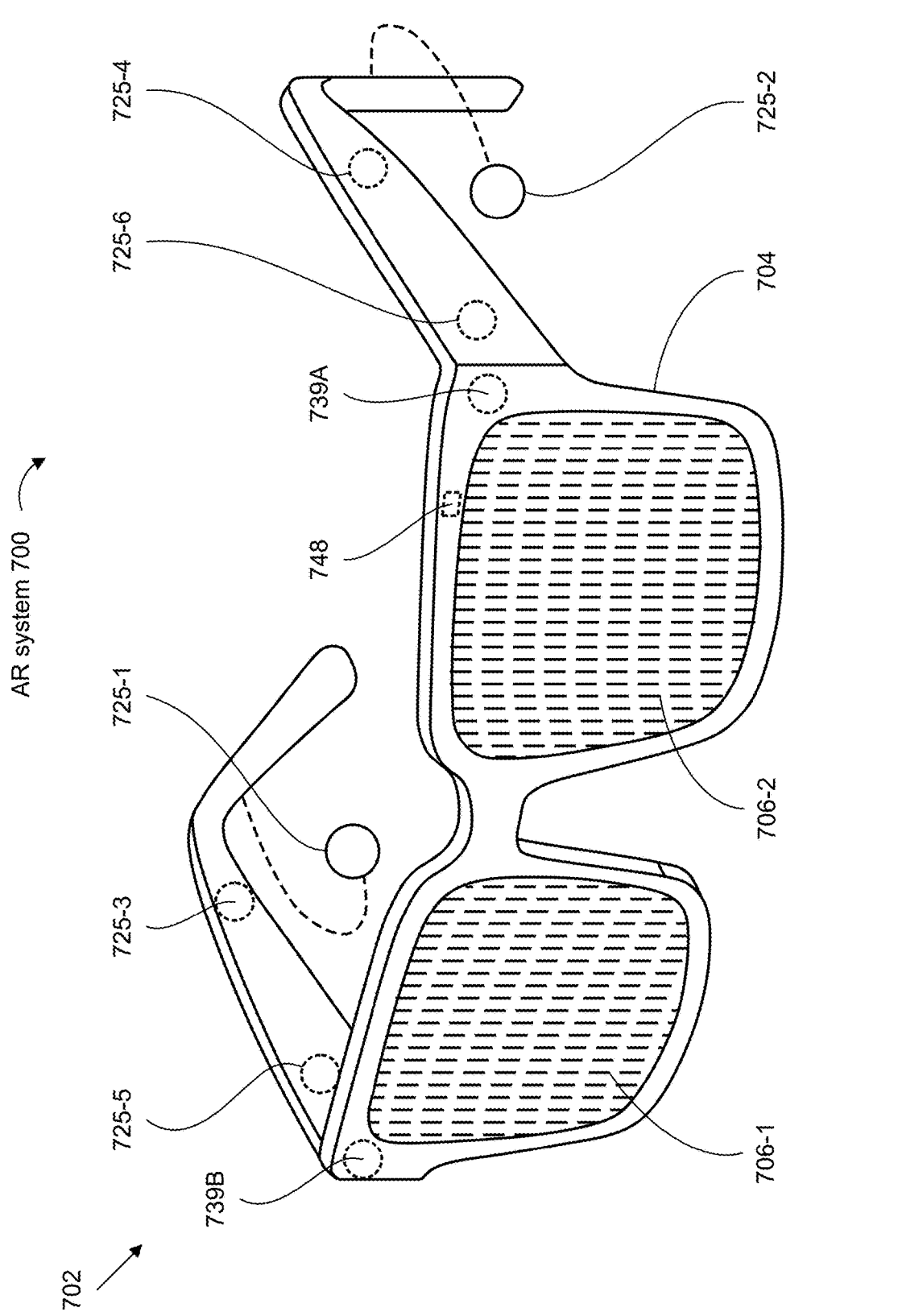
FIGS. 7A-7C illustrate example head-wearable devices, in accordance with some embodiments.
Figures 1, 7B:
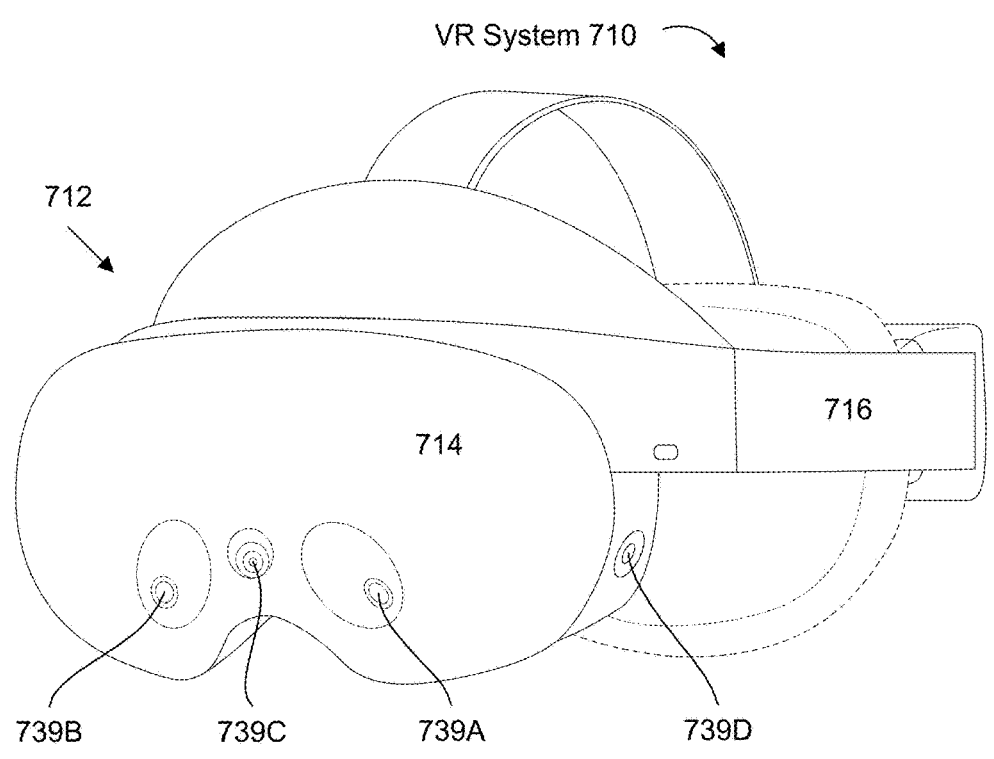
Figures 2, 7B:
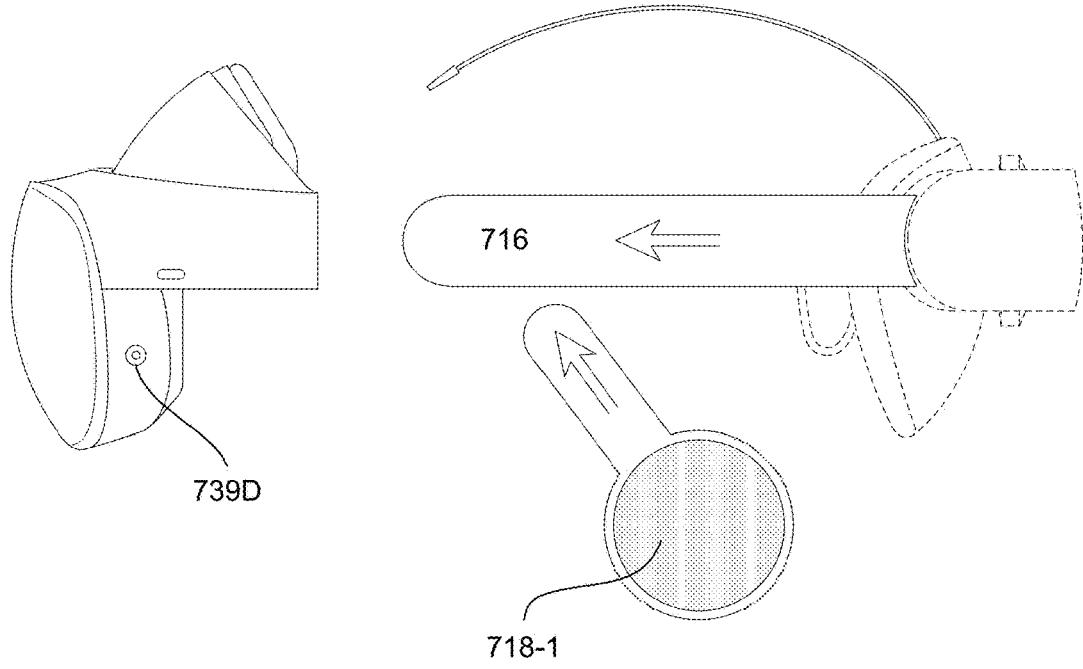
Figure 7C:
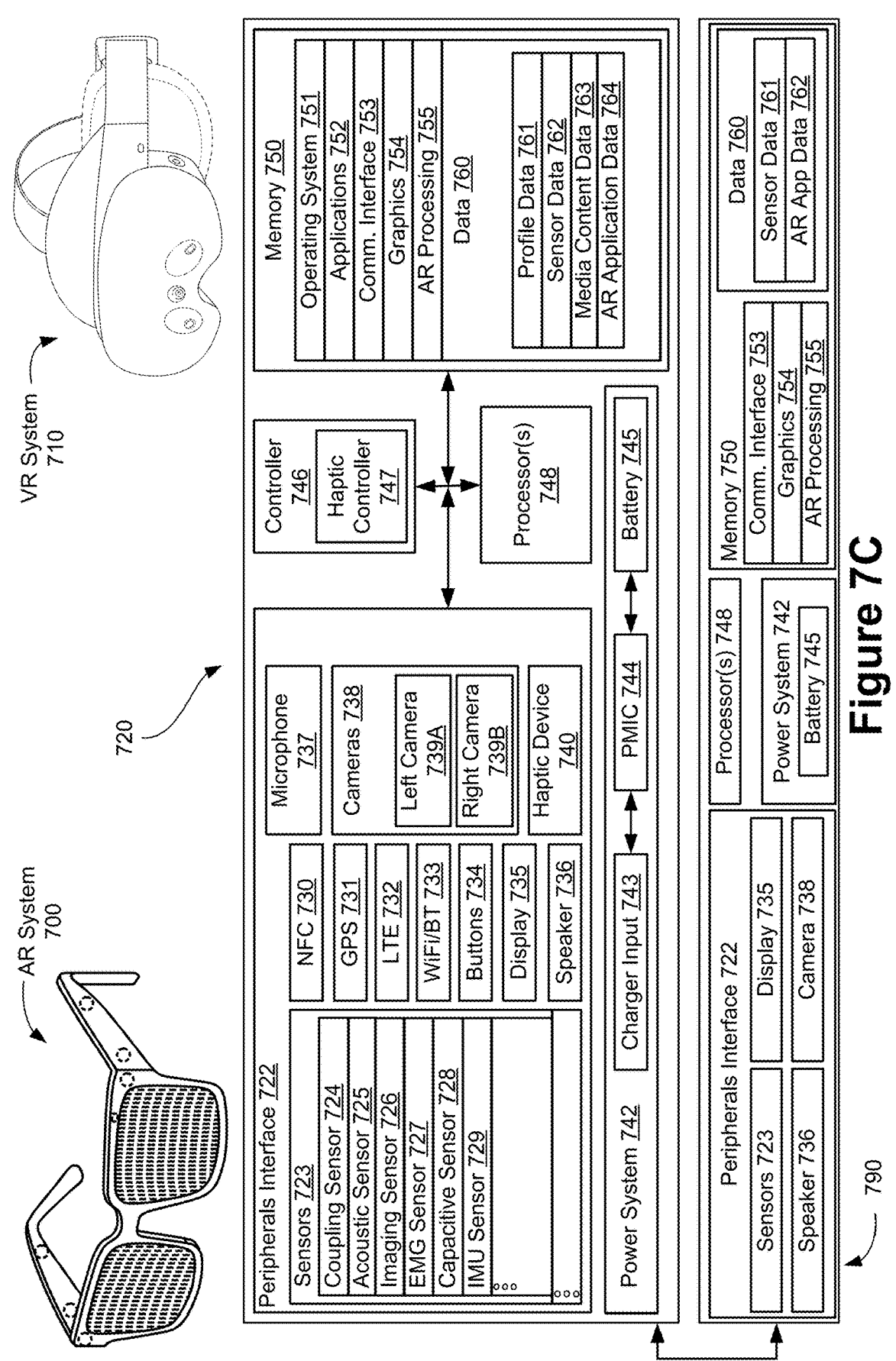

FIGS. 7A-7C show example head-wearable devices, in accordance with some embodiments. Head-wearable devices can include, but are not limited to, AR devices 710 (e.g., AR or smart eyewear devices, such as smart glasses, smart monocles, smart contacts, etc.), VR devices 710 (e.g., VR headsets, head-mounted displays (HMD) s, etc.), or other ocularly coupled devices. The AR devices 700 and the VR devices 710 are instances of the head-wearable devices described in reference to FIGS. 5A and 5B herein, such that the head-wearable device should be understood to have the features of the AR devices 700 and/or the VR devices 710. The AR devices 700 and the VR devices 710 can perform various functions and/or operations associated with navigating through user interfaces and selectively opening applications. The AR devices 700 and the VR devices 710 can include temple arms in accordance with FIGS. 1A-4.

In some embodiments, an AR system (e.g., AR systems 500*a* and 500*b*; FIGS. 5A and 5B) includes an AR device 700 (as shown in FIG. 7A) and/or VR device 710 (as shown in FIGS. 7B-1-B-2). In some embodiments, the AR device 700 and the VR device 710 can include one or more analogous components (e.g., components for presenting interactive artificial-reality environments, such as processors, memory, and/or presentation devices, including one or more displays and/or one or more waveguides), some of which are described in more detail with respect to FIG. 7C. The head-wearable devices can use display projectors (e.g., display projector assemblies 707A and 707B) and/or waveguides for projecting representations of data to a user. Some embodiments of head-wearable devices do not include displays.

FIG. 7A shows an example visual depiction of the AR device 700 (e.g., which may also be described herein as augmented-reality glasses, and/or smart glasses). The AR device 700 can work in conjunction with additional electronic components that are not shown in FIGS. 7A, such as a wearable accessory device and/or an intermediary processing device, in electronic communication or otherwise configured to be used in conjunction with the AR device 700. In some embodiments, the wearable accessory device and/or the intermediary processing device may be configured to couple with the AR device 700 via a coupling mechanism in electronic communication with a coupling sensor 724, where the coupling sensor 724 can detect when an electronic device becomes physically or electronically coupled with the AR device 700. In some embodiments, the AR device 700 can be configured to couple to a housing (e.g., a portion of frame 704 or temple arms 705), which may include one or more additional coupling mechanisms configured to couple with additional accessory devices. The components shown in FIG. 7A can be implemented in hardware, software, firmware, or a combination thereof, including one or more signal-processing components and/or application-specific integrated circuits (ASICs).

The AR device 700 includes mechanical glasses components, including a frame 704 configured to hold one or more lenses (e.g., one or both lenses 706-1 and 706-2). One of ordinary skill in the art will appreciate that the AR device 700 can include additional mechanical components, such as hinges configured to allow portions of the frame 704 of the AR device 700 to be folded and unfolded, a bridge configured to span the gap between the lenses 706-1 and 706-2 and rest on the user's nose, nose pads configured to rest on the bridge of the nose and provide support for the AR device 700, earpieces configured to rest on the user's ears and provide additional support for the AR device 700, temple arms 705 configured to extend from the hinges to the earpieces of the AR device 700, and the like. One of ordinary skill in the art will further appreciate that some examples of the AR device 700 can include none of the mechanical components described herein. For example, smart contact lenses configured to present artificial-reality representations to users may not include any components of the AR device 700.

The lenses 706-1 and 706-2 can be individual displays or display devices (e.g., a waveguide for projected representations). The lenses 706-1 and 706-2 may act together or independently to present an image or series of images to a user. In some embodiments, the lenses 706-1 and 706-2 can operate in conjunction with one or more display projector assemblies 707A and 707B to present image data to a user. While the AR device 700 includes two displays, embodiments of this disclosure may be implemented in AR devices with a single near-eye display (NED) or more than two NEDs.

The AR device 700 includes electronic components, many of which will be described in more detail below with respect to FIG. 7C. Some example electronic components are illustrated in FIG. 7A, including sensors 723-1, 723-2, 723-3, 723-4, 723-5, and 723-6, which can be distributed along a substantial portion of the frame 704 of the AR device 700. The different types of sensors are described below in reference to FIG. 7C. The AR device 700 also includes a left camera 739A and a right camera 739B, which are located on different sides of the frame 704. And the eyewear device includes one or more processors 748A and 748B (e.g., an integral microprocessor, such as an ASIC) that is embedded into a portion of the frame 704.

FIGS. 7B-1 and 7B-2 show an example visual depiction of the VR device 710 (e.g., a head-mounted display (HMD) 712, also referred to herein as an artificial-reality headset, a head-wearable device, a VR headset, etc.). The HMD 712 includes a front body 714 and a frame 716 (e.g., a strap or band) shaped to fit around a user's head. In some embodiments, the front body 714 and/or the frame 716 includes one or more electronic elements for facilitating presentation of and/or interactions with an AR and/or VR system (e.g., displays, processors (e.g., processor 748A-1), IMUs, tracking emitter or detectors, sensors, etc.). In some embodiments, the HMD 712 includes output audio transducers (e.g., an audio transducer 718-1), as shown in FIG. 7B-2. In some embodiments, one or more components, such as the output audio transducer(s) 718 and the frame 716, can be configured to attach and detach (e.g., are detachably attachable) to the HMD 712 (e.g., a portion or all of the frame 716, and/or the output audio transducer 718), as shown in FIG. 7B-2. In some embodiments, coupling a detachable component to the HMD 712 causes the detachable component to come into electronic communication with the HMD 712. The VR device 710 includes electronic components, many of which will be described in more detail below with respect to FIG. 7C.

FIG. 7B-1 to 7B-2 also show that the VR device 710 one or more cameras, such as the left camera 739A and the right camera 739B, which can be analogous to the left and right cameras on the frame 704 of the AR device 700. In some embodiments, the VR device 710 includes one or more additional cameras (e.g., cameras 739C and 739D), which can be configured to augment image data obtained by the cameras 739A and 739B by providing more information. For example, the camera 739C can be used to supply color information that is not discerned by cameras 739A and 739B. In some embodiments, one or more of the cameras 739A to 739D can include an optional IR cut filter config-ured to remove IR light from being received at the respective camera sensors.

The VR device 710 can include a housing 790 storing one or more components of the VR device 710 and/or additional components of the VR device 710. The housing 790 can be a modular electronic device configured to couple with the VR device 710 (or an AR device 700) and supplement and/or extend the capabilities of the VR device 710 (or an AR device 700). For example, the housing 790 can include additional sensors, cameras, power sources, processors (e.g., processor 748A-2), etc. to improve and/or increase the functionality of the VR device 710. Examples of the differ-ent components included in the housing 790 are described below in reference to FIG. 7C.

Alternatively or in addition, in some embodiments, the head-wearable device, such as the VR device 710 and/or the AR device 700), includes, or is communicatively coupled to, another external device (e.g., a paired device), such as an HIPD 8 (discussed below in reference to FIGS. 8A-8B) and/or an optional neckband. The optional neckband can couple to the head-wearable device via one or more con-nectors (e.g., wired or wireless connectors). The head-wearable device and the neckband can operate indepen-dently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD device 800, an optional neckband, and/or wearable accessory device) with the head-wearable devices (e.g., an AR device 700 and/or VR device 710) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 800) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary pro-cessing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodi-ments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 800, can process information generated by one or more sensors of its sensors and/or information provided by other communicatively coupled devices. For example, a head-wearable device can include an IMU, and the intermediary processing device (neckband and/or an HIPD 800) can compute all inertial and spatial calculations from the IMUs located on the head-wearable device. Additional examples of processing performed by a communicatively coupled device, such as the HIPD 800, are provided below in reference to FIGS. 8A and 8B.

Artificial-reality systems may include a variety of types of visual feedback mechanisms. For example, display devices in the AR devices 700 and/or the VR devices 710 may include one or more liquid-crystal displays (LCDs), light emitting diode (LED) displays, organic LED (OLED) dis-plays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 700 and/or the VR device 710 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 700 and the VR device 710, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 700 and/or the VR device 710 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 600, an HIPD 800, and/or other devices described herein.

FIG. 7C illustrates a computing system 720 and an optional housing 790, each of which show components that can be included in a head-wearable device (e.g., the AR device 700 and/or the VR device 710). In some embodiments, more or less components can be included in the optional housing 790 depending on practical restraints of the respective head-wearable device being described. Additionally, or alternatively, the optional housing 790 can include additional components to expand and/or augment the functionality of a head-wearable device.

In some embodiments, the computing system 720 and/or the optional housing 790 can include one or more peripheral interfaces 722A and 722B, one or more power systems 742A and 742B (including charger input 743, PMIC 744, and battery 745), one or more controllers 746A and 746B (including one or more haptic controllers 747), one or more processors 748A and 748B (as defined above, including any of the examples provided), and memory 750A and 750B, which can all be in electronic communication with each other. For example, the one or more processors 748A and/or 748B can be configured to execute instructions stored in the memory 750A and/or 750B, which can cause a controller of the one or more controllers 746A and/or 746B to cause operations to be performed at one or more peripheral devices of the peripherals interfaces 722A and/or 722B. In some embodiments, each operation described can occur based on electrical power provided by the power system 742A and/or 742B.

In some embodiments, the peripherals interface 722A can include one or more devices configured to be part of the computing system 720, many of which have been defined above and/or described with respect to wrist-wearable devices shown in FIGS. 6A and 6B. For example, the peripherals interface can include one or more sensors 723A. Some example sensors include: one or more coupling sensors 724, one or more acoustic sensors 725, one or more imaging sensors 726, one or more EMG sensors 727, one or more capacitive sensors 728, and/or one or more IMUs 729.

In some embodiments, the sensors 723A further include depth sensors 767, light sensors 768 and/or any other types of sensors defined above or described with respect to any other embodiments discussed herein.

In some embodiments, the peripherals interface can include one or more additional peripheral devices, including one or more NFC devices 730, one or more GPS devices 731, one or more LTE devices 732, one or more WiFi and/or Bluetooth devices 733, one or more buttons 734 (e.g., including buttons that are slidable or otherwise adjustable), one or more displays 735A, one or more speakers 736A, one or more microphones 737A, one or more cameras 738A (e.g., including the a first camera 739-1 through nth camera 739-n, which are analogous to the left camera 739A and/or the right camera 739B), one or more haptic devices 740; and/or any other types of peripheral devices defined above or described with respect to any other embodiments discussed herein.

The head-wearable devices can include a variety of types of visual feedback mechanisms (e.g., presentation devices). For example, display devices in the AR device 700 and/or the VR device 710 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 735A can be coupled to each of the lenses 706-1 and 706-2 of the AR device 700. The displays 735A coupled to each of the lenses 706-1 and 706-2 can act together or independently to present an image or series of images to a user. In some embodiments, the AR device 700 and/or the VR device 710 includes a single display 735A (e.g., a near-eye display) or more than two displays 735A.

In some embodiments, a first set of one or more displays 735A can be used to present an augmented-reality environment, and a second set of one or more display devices 735A can be used to present a virtual-reality environment. In some embodiments, one or more waveguides are used in conjunction with presenting artificial-reality content to the user of the AR device 700 and/or the VR device 710 (e.g., as a means of delivering light from a display projector assembly and/or one or more displays 735A to the user's eyes). In some embodiments, one or more waveguides are fully or partially integrated into the AR device 700 and/or the VR device 710. Additionally, or alternatively to display screens, some artificial-reality systems include one or more projection systems. For example, display devices in the AR device 700 and/or the VR device 710 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 735A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 735A for presenting information to users. For example, an external display 735A can be used to show a current battery level, network activity (e.g., connected, disconnected, etc.), current activity (e.g., playing a game, in a call, in a meeting, watching a movie, etc.), and/or other relevant information. In some embodiments, the external displays 735A can be used to communicate with others. For example, a user of the head-wearable device can cause the external displays 735A to present a do not disturb notification. The external displays 735A can also be used by the user to share any information captured by the one or more components of the peripherals interface 722A and/or generated by head-wearable device (e.g., during operation and/or performance of one or more applications).

The memory 750A can include instructions and/or data executable by one or more processors 748A (and/or processors 748B of the housing 790) and/or a memory controller of the one or more controllers 746A (and/or controller 746B of the housing 790). The memory 750A can include one or more operating systems 751; one or more applications 752; one or more communication interface modules 753A; one or more graphics modules 754A; one or more AR processing modules 755A; and/or any other types of modules or components defined above or described with respect to any other embodiments discussed herein.

The data 760 stored in memory 750A can be used in conjunction with one or more of the applications and/or programs discussed above. The data 760 can include profile data 761; sensor data 762; media content data 763; AR application data 764; and/or any other types of data defined above or described with respect to any other embodiments discussed herein.

In some embodiments, the controller 746A of the head-wearable devices processes information generated by the sensors 723A on the head-wearable devices and/or another component of the head-wearable devices and/or communicatively coupled with the head-wearable devices (e.g., components of the housing 790, such as components of peripherals interface 722B). For example, the controller 746A can process information from the acoustic sensors 725 and/or image sensors 726. For each detected sound, the controller 746A can perform a direction of arrival (DOA) estimation to estimate a direction from which the detected sound arrived at a head-wearable device. As one or more of the acoustic sensors 725 detects sounds, the controller 746A can populate an audio data set with the information (e.g., represented by sensor data 762).

In some embodiments, a physical electronic connector can convey information between the head-wearable devices and another electronic device, and/or between one or more processors 748A of the head-wearable devices and the controller 746A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional accessory device (e.g., an electronic neckband or an HIPD 800) is coupled to the head-wearable devices via one or more connectors. The connectors can be wired or wireless connectors and can include electrical and/or non-electrical (e.g., structural) components. In some embodiments, the head-wearable devices and the accessory device can operate independently without any wired or wireless connection between them.

The head-wearable devices can include various types of computer vision components and subsystems. For example, the AR device 700 and/or the VR device 710 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 7B-1 and 7B-2 show the VR device 710 having cameras 739A-739D, which can be used to provide depth information for creating a voxel field and a two-dimensional mesh to provide object information to the user to avoid collisions.

The optional housing 790 can include analogous components to those describe above with respect to the computing system 720. For example, the optional housing 790 can include a respective peripherals interface 722B including more or less components to those described above with respect to the peripherals interface 722A. As described above, the components of the optional housing 790 can be used augment and/or expand on the functionality of the head-wearable devices. For example, the optional housing 790 can include respective sensors 723B, speakers 736B, displays 735B, microphones 737B, cameras 738B, and/or other components to capture and/or present data. Similarly, the optional housing 790 can include one or more processors 748B, controllers 746B, and/or memory 750B (including respective communication interface modules 753B; one or more graphics modules 754B; one or more AR processing modules 755B, etc.) that can be used individually and/or in conjunction with the components of the computing system 720.

The techniques described above in FIGS. 7A-7C can be used with different head-wearable devices. In some embodiments, the head-wearable devices (e.g., the AR device 700 and/or the VR device 710) can be used in conjunction with one or more wearable device such as a wrist-wearable device 600 (or components thereof). Having thus described example the head-wearable devices, attention will now be turned to example handheld intermediary processing devices, such as HIPD 800.

Example Handheld Intermediary Processing Devices

Figure 8A:
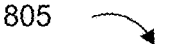
FIGS. 8A and 8B illustrate an example handheld intermediary processing device, in accordance with some embodiments.
Figure 8A:
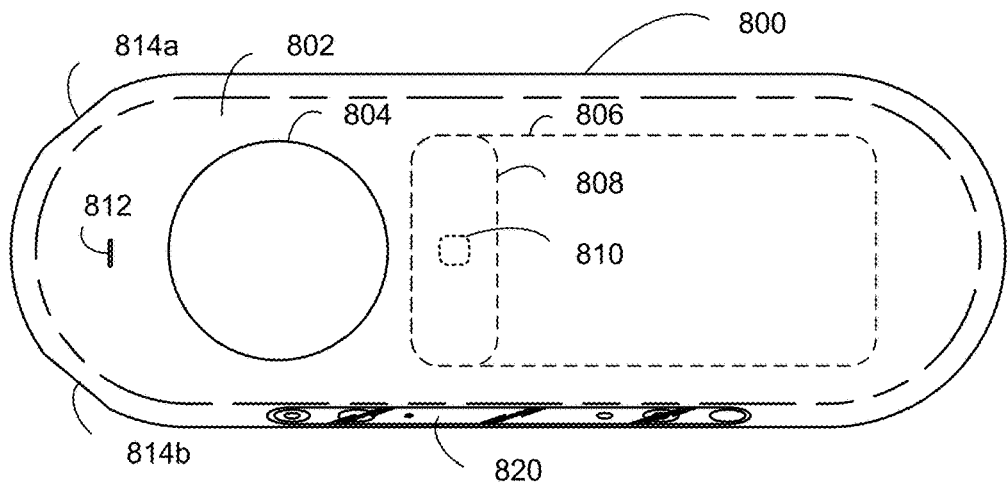
Figure 8A:
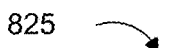
Figure 8A:
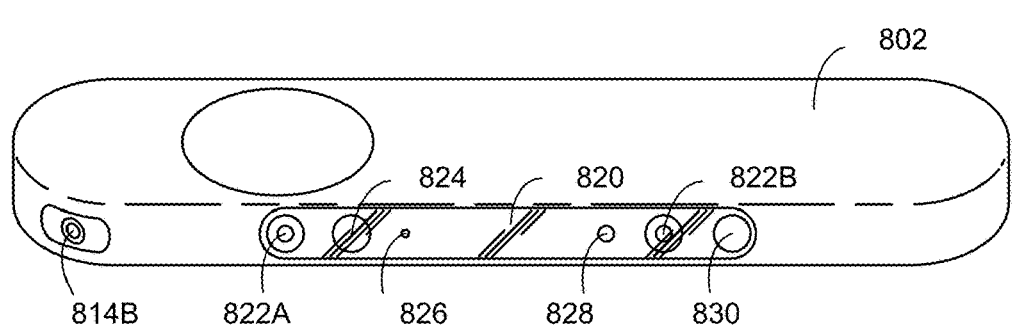
Figure 8B:
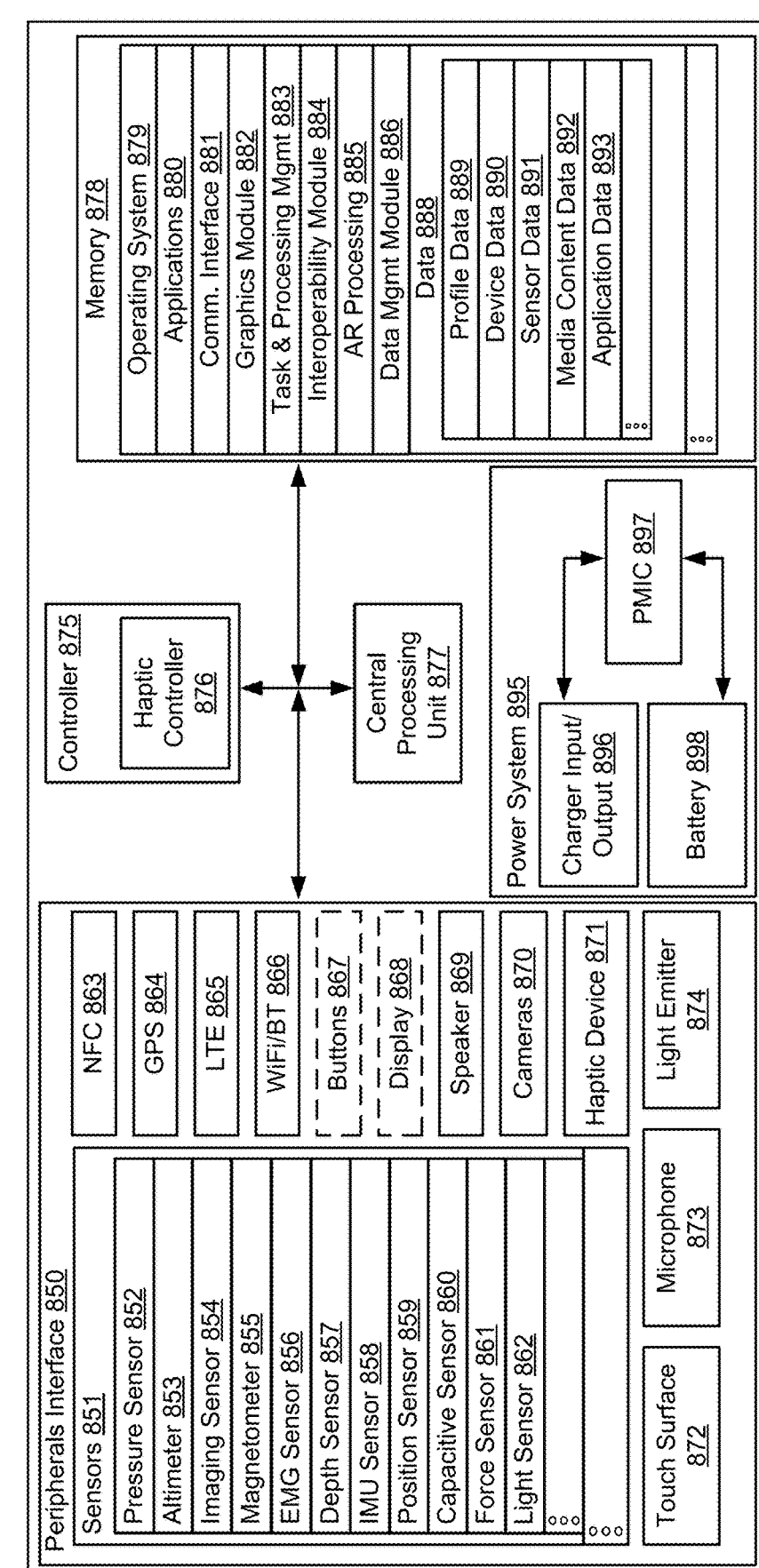

FIGS. 8A and 8B illustrate an example handheld intermediary processing device (HIPD) 800, in accordance with some embodiments. The HIPD 800 is an instance of the intermediary device described in reference to FIGS. 5A and 5B herein, such that the HIPD 800 should be understood to have the features described with respect to any intermediary device defined above or otherwise described herein, and vice versa. The HIPD 800 can perform various functions and/or operations associated with navigating through user interfaces and selectively opening applications.

FIG. 8A shows a top view 805 and a side view 825 of the HIPD 800. The HIPD 800 is configured to communicatively couple with one or more wearable devices (or other electronic devices) associated with a user. For example, the HIPD 800 is configured to communicatively couple with a user's wrist-wearable device 600 (or components thereof, such as the watch body 620 and the wearable band 610), AR device 700, and/or VR device 710. The HIPD 800 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 800 can successfully be communicatively coupled with an electronic device, such as a wearable device).

The HIPD 800 can perform various functions independently and/or in conjunction with one or more wearable devices (e.g., wrist-wearable device 600, AR device 700, VR device 710, etc.). The HIPD 800 is configured to increase and/or improve the functionality of communicatively coupled devices, such as the wearable devices. The HIPD 800 is configured to perform one or more functions or operations associated with interacting with user interfaces and applications of communicatively coupled devices, interacting with an AR environment, interacting with VR environment, and/or operating as a human-machine interface controller. Additionally, as will be described in more detail below, functionality and/or operations of the HIPD 800 can include, without limitation, task offloading and/or handoffs; thermals offloading and/or handoffs; 6 degrees of freedom (6DoF) raycasting and/or gaming (e.g., using imaging devices or cameras 814A and 814B, which can be used for simultaneous localization and mapping (SLAM) and/or with other image processing techniques); portable charging; messaging; image capturing via one or more imaging devices or cameras (e.g., cameras 822A and 822B); sensing user input (e.g., sensing a touch on a multi-touch input surface 802); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 800 and/or in communication between the HIPD 800 and another wearable device described herein. In some embodiments, functions can be executed on the HIPD 800 in conjunction with an AR environment. As the skilled artisan will appreciate upon reading the descriptions provided herein, the novel the HIPD 800 described herein can be used with any type of suitable AR environment.

While the HIPD 800 is communicatively coupled with a wearable device and/or other electronic device, the HIPD 800 is configured to perform one or more operations initiated at the wearable device and/or the other electronic device. In particular, one or more operations of the wearable device and/or the other electronic device can be offloaded to the HIPD 800 to be performed. The HIPD 800 performs the one or more operations of the wearable device and/or the other electronic device and provides to data corresponded to the completed operations to the wearable device and/or the other electronic device. For example, a user can initiate a video stream using AR device 700 and back-end tasks associated with performing the video stream (e.g., video rendering) can be offloaded to the HIPD 800, which the HIPD 800 performs and provides corresponding data to the AR device 700 to perform remaining front-end tasks associated with the video stream (e.g., presenting the rendered video data via a display of the AR device 700). In this way, the HIPD 800, which has more computational resources and greater thermal headroom than a wearable device, can perform computationally intensive tasks for the wearable device improving performance of an operation performed by the wearable device.

The HIPD 800 includes a multi-touch input surface 802 on a first side (e.g., a front surface) that is configured to detect one or more user inputs. In particular, the multi-touch input surface 802 can detect single tap inputs, multi-tap inputs, swipe gestures and/or inputs, force-based and/or pressure-based touch inputs, held taps, and the like. The multi-touch input surface 802 is configured to detect capacitive touch inputs and/or force (and/or pressure) touch inputs. The multi-touch input surface 802 includes a first touch-input surface 804 defined by a surface depression, and a second touch-input surface 806 defined by a substantially planar portion. The first touch-input surface 804 can be disposed adjacent to the second touch-input surface 806. In some embodiments, the first touch-input surface 804 and the second touch-input surface 806 can be different dimensions, shapes, and/or cover different portions of the multi-touch input surface 802. For example, the first touch-input surface 804 can be substantially circular and the second touch-input surface 806 is substantially rectangular. In some embodiments, the surface depression of the multi-touch input surface 802 is configured to guide user handling of the HIPD 800. In particular, the surface depression is configured such that the user holds the HIPD 800 upright when held in a single hand (e.g., such that the using imaging devices or cameras 814A and 814B are pointed toward a ceiling or the sky). Additionally, the surface depression is configured such that the user's thumb rests within the first touch-input surface 804.

In some embodiments, the different touch-input surfaces include a plurality of touch-input zones. For example, the second touch-input surface 806 includes at least a first touch-input zone 808 within a second touch-input zone 806 and a third touch-input zone 810 within the first touch-input zone 808. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 808 causes the HIPD 800 to perform a first command and a user input detected within the second touch-input zone 806 causes the HIPD 800 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 808 can be configured to detect force touch inputs (e.g., a magnitude at which the user presses down) and capacitive touch inputs, and the second touch-input zone 806 can be configured to detect capacitive touch inputs.

The HIPD 800 includes one or more sensors 851 for sensing data used in the performance of one or more operations and/or functions. For example, the HIPD 800 can include an IMU that is used in conjunction with cameras 814 for 3-dimensional object manipulation (e.g., enlarging, moving, destroying, etc. an object) in an AR or VR environment. Non-limiting examples of the sensors 851 included in the HIPD 800 include a light sensor, a magnetometer, a depth sensor, a pressure sensor, and a force sensor. Additional examples of the sensors 851 are provided below in reference to FIG. 8B.

The HIPD 800 can include one or more light indicators 812 to provide one or more notifications to the user. In some embodiments, the light indicators are LEDs or other types of illumination devices. The light indicators 812 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 804. The light indicators can be illuminated in different colors and/or patterns to provide the user with one or more notifications and/or information about the device. For example, a light indicator positioned around the first touch-input surface 804 can flash when the user receives a notification (e.g., a message), change red when the HIPD 800 is out of power, operate as a progress bar (e.g., a light ring that is closed when a task is completed (e.g., 0% to 100%)), operates as a volume indicator, etc.).

In some embodiments, the HIPD 800 includes one or more additional sensors on another surface. For example, as shown FIG. 8A, HIPD 800 includes a set of one or more sensors (e.g., sensor set 820) on an edge of the HIPD 800. The sensor set 820, when positioned on an edge of the of the HIPD 800, can be pe positioned at a predetermined tilt angle (e.g., 26 degrees), which allows the sensor set 820 to be angled toward the user when placed on a desk or other flat surface. Alternatively, in some embodiments, the sensor set 820 is positioned on a surface opposite the multi-touch input surface 802 (e.g., a back surface). The one or more sensors of the sensor set 820 are discussed in detail below.

The side view 825 of the of the HIPD 800 shows the sensor set 820 and camera 814B. The sensor set 820 includes one or more cameras 822A and 822B, a depth projector 824, an ambient light sensor 828, and a depth receiver 830. In some embodiments, the sensor set 820 includes a light indicator 826. The light indicator 826 can operate as a privacy indicator to let the user and/or those around them know that a camera and/or microphone is active. The sensor set 820 is configured to capture a user's facial expression such that the user can puppet a custom avatar (e.g., showing emotions, such as smiles, laughter, etc., on the avatar or a digital representation of the user). The sensor set 820 can be configured as a side stereo RGB system, a rear indirect Time-of-Flight (iToF) system, or a rear stereo RGB system.

As the skilled artisan will appreciate upon reading the descriptions provided herein, the novel HIPD 800 described herein can use different sensor set 820 configurations and/or sensor set 820 placement.

In some embodiments, the HIPD 800 includes one or more haptic devices 871 (FIG. 8B, e.g., a vibratory haptic actuator) that are configured to provide haptic feedback (e.g., kinesthetic sensation). The sensors 851, and/or the haptic devices 871 can be configured to operate in conjunction with multiple applications and/or communicatively coupled devices including, without limitation, a wearable device, health monitoring applications, social media applications, game applications, and artificial reality applications (e.g., the applications associated with artificial reality).

The HIPD 800 is configured to operate without a display. However, in optional embodiments, the HIPD 800 can include a display 868 (FIG. 8B). The HIPD 800 can also income one or more optional peripheral buttons 867 (FIG. 8B). For example, the peripheral buttons 867 can be used to turn on or turn off the HIPD 800. Further, the HIPD 800 housing can be formed of polymers and/or elastomer elastomers. The HIPD 800 can be configured to have a non-slip surface to allow the HIPD 800 to be placed on a surface without requiring a user to watch over the HIPD 800. In other words, the HIPD 800 is designed such that it would not easily slide off a surface. In some embodiments, the HIPD 800 include one or magnets to couple the HIPD 800 to another surface. This allows the user to mount the HIPD 800 to different surfaces and provide the user with greater flexibility in use of the HIPD 800.

As described above, the HIPD 800 can distribute and/or provide instructions for performing the one or more tasks at the HIPD 800 and/or a communicatively coupled device. For example, the HIPD 800 can identify one or more back-end tasks to be performed by the HIPD 800 and one or more front-end tasks to be performed by a communicatively coupled device. While the HIPD 800 is configured to offload and/or handoff tasks of a communicatively coupled device, the HIPD 800 can perform both back-end and front-end tasks (e.g., via one or more processors, such as CPU 877; FIG. 8B). The HIPD 800 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 800 can perform the above operations alone or in conjunction with a wearable device (or other communicatively coupled electronic device).

FIG. 8B shows block diagrams of a computing system 840 of the HIPD 800, in accordance with some embodiments. The HIPD 800, described in detail above, can include one or more components shown in HIPD computing system 840. The HIPD 800 will be understood to include the components shown and described below for the HIPD computing system 840. In some embodiments, all, or a substantial portion of the components of the HIPD computing system 840 are included in a single integrated circuit. Alternatively, in some embodiments, components of the HIPD computing system 840 are included in a plurality of integrated circuits that are communicatively coupled.

The HIPD computing system 840 can include a processor (e.g., a CPU 877, a GPU, and/or a CPU with integrated graphics), a controller 875, a peripherals interface 850 that includes one or more sensors 851 and other peripheral devices, a power source (e.g., a power system 895), and memory (e.g., a memory 878) that includes an operating system (e.g., an operating system 879), data (e.g., data 888), one or more applications (e.g., applications 880), and one or more modules (e.g., a communications interface module 881, a graphics module 882, a task and processing management module 883, an interoperability module 884, an AR processing module 885, a data management module 886, etc.). The HIPD computing system 840 further includes a power system 895 that includes a charger input and output 896, a PMIC 897, and a battery 898, all of which are defined above.

In some embodiments, the peripherals interface 850 can include one or more sensors 851. The sensors 851 can include analogous sensors to those described above in reference to FIG. 6B. For example, the sensors 851 can include imaging sensors 854, (optional) EMG sensors 856, IMUs 858, and capacitive sensors 860. In some embodiments, the sensors 851 can include one or more pressure sensor 852 for sensing pressure data, an altimeter 853 for sensing an altitude of the HIPD 800, a magnetometer 855 for sensing a magnetic field, a depth sensor 857 (or a time—of flight sensor) for determining a difference between the camera and the subject of an image, a position sensor 859 (e.g., a flexible position sensor) for sensing a relative displacement or position change of a portion of the HIPD 800, a force sensor 861 for sensing a force applied to a portion of the HIPD 800, and a light sensor 862 (e.g., an ambient light sensor) for detecting an amount of lighting. The sensors 851 can include one or more sensors not shown in FIG. 8B.

Analogous to the peripherals described above in reference to FIGS. 6B, the peripherals interface 850 can also include an NFC component 863, a GPS component 864, an LTE component 865, a Wi-Fi and/or Bluetooth communication component 866, a speaker 869, a haptic device 871, and a microphone 873. As described above in reference to FIG. 8A, the HIPD 800 can optionally include a display 868 and/or one or more buttons 867. The peripherals interface 850 can further include one or more cameras 870, touch surfaces 872, and/or one or more light emitters 874. The multi-touch input surface 802 described above in reference to FIG. 8A is an example of touch surface 872. The light emitters 874 can be one or more LEDs, lasers, etc. and can be used to project or present information to a user. For example, the light emitters 874 can include light indicators 812 and 826 described above in reference to FIG. 8A. The cameras 870 (e.g., cameras 814A, 814B, and 822 described above in FIG. 8A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 870 can be used for SLAM; 6 DoF ray casting, gaming, object manipulation, and/or other rendering; facial recognition and facial expression recognition, etc.

Similar to the watch body computing system 660 and the watch band computing system 630 described above in reference to FIG. 6B, the HIPD computing system 840 can include one or more haptic controllers 876 and associated componentry (e.g., haptic devices 871) for providing haptic events at the HIPD 800.

Memory 878 can include high-speed random-access memory and/or non-volatile memory, such as one or more magnetic disk storage devices, flash memory devices, or other non-volatile solid-state memory devices. Access to the memory 878 by other components of the HIPD 800, such as the one or more processors and the peripherals interface 850, can be controlled by a memory controller of the controllers 875.

In some embodiments, software components stored in the memory 878 include one or more operating systems 879, one or more applications 880, one or more communication interface modules 881, one or more graphics modules 882, one or more data management modules 885, which are analogous to the software components described above in reference to FIG. 6B.

In some embodiments, software components stored in the memory 878 include a task and processing management module 883 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 883 uses data 888 (e.g., device data 890) to distribute the one or more front-end and/or back-end tasks based on communicatively coupled devices' computing resources, available power, thermal headroom, ongoing operations, and/or other factors. For example, the task and processing management module 883 can cause the performance of one or more back-end tasks (of an operation performed at communicatively coupled AR device 700) at the HIPD 800 in accordance with a determination that the operation is utilizing a predetermined amount (e.g., at least 70%) of computing resources available at the AR device 700.

In some embodiments, software components stored in the memory 878 include an interoperability module 884 for exchanging and utilizing information received and/or provided to distinct communicatively coupled devices. The interoperability module 884 allows for different systems, devices, and/or applications to connect and communicate in a coordinated way without user input. In some embodiments, software components stored in the memory 878 include an AR module 885 that is configured to process signals based at least on sensor data for use in an AR and/or VR environment. For example, the AR processing module 885 can be used for 3D object manipulation, gesture recognition, facial and facial expression, recognition, etc.

The memory 878 can also include data 887, including structured data. In some embodiments, the data 887 can include profile data 889, device data 889 (including device data of one or more devices communicatively coupled with the HIPD 800, such as device type, hardware, software, configurations, etc.), sensor data 891, media content data 892, and application data 893.

It should be appreciated that the HIPD computing system 840 is an example of a computing system within the HIPD 800, and that the HIPD 800 can have more or fewer components than shown in the HIPD computing system 840, combine two or more components, and/or have a different configuration and/or arrangement of the components. The various components shown in HIPD computing system 840 are implemented in hardware, software, firmware, or a combination thereof, including one or more signal processing and/or application-specific integrated circuits.

The techniques described above in FIG. 8A-8B can be used with any device used as a human-machine interface controller. In some embodiments, an HIPD 800 can be used in conjunction with one or more wearable device such as a head-wearable device (e.g., AR device 700 and VR device 710) and/or a wrist-wearable device 600 (or components thereof).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A temple arm, comprising:
a curved temple arm housing configured to couple to a frame of a pair of augmented-reality (AR) glasses, the curved temple arm housing having a head shaped curvature to contour a portion of a user's head;
a set of electronic components, wherein each of the set of electronic components are coupled within the head shaped curvature of the curved temple arm housing, the set of electronics including:
a speaker, wherein the speaker is internal to the curved temple arm housing;
only one front battery cell; and
only one rear battery cell, wherein the speaker is positioned adjacent to a user's ear and between the only one front battery cell and the only one rear battery cell; and
an input device configured to control one or more electronic components positioned within the frame of the pair of AR glasses.

2. The temple arm of claim 1, further comprising:
a hinge mount disposed at a front-end portion of the curved temple arm housing, wherein the front-end portion of the curved temple arm housing is adjacent to the only one front battery cell; and
a hinge assembly coupled to the curved temple arm housing via the hinge mount, wherein the hinge assembly is configured to couple the curved temple arm housing to the frame of the pair of AR glasses, and the hinge assembly includes:
one or more channels for routing one or more wires for communicatively coupling the set of electronic components with the electronic components positioned within the frame of the pair of AR glasses.

3. The temple arm of claim 2, wherein the set of electronic components includes at least one electronic component configured to provide power to the electronics within the frame of the pair of glasses.

4. The temple arm of claim 2, wherein:
the hinge assembly includes a plurality of alignment ribs configured to align the coupling of the hinge assembly with the hinge mount; and
the plurality of alignment ribs defines a predetermined gap for an adhesive to be received.

5. The temple arm of claim 1, wherein the set of electronics further includes a microphone positioned adjacent to a hinge assembly and the only one front battery cell.

6. The temple arm of claim 1, wherein the input device is a power button positioned at a tip-end portion of the curved temple arm housing, the tip-end portion of the curved temple arm housing being adjacent to the only one rear battery cell.

7. The temple arm of claim 1, wherein the input device includes a camera button positioned at a front-end portion of the curved temple arm housing, the front-end portion of the curved temple arm housing being adjacent to the only one front battery cell.

8. The temple arm of claim 1, wherein the input device includes a privacy slider positioned at a front-end portion of the curved temple arm housing, the front-end portion of the curved temple arm housing being adjacent to the only one front battery cell.

9. The temple arm of claim 1, wherein the curved temple arm housing includes a plurality of ribs, wherein:
a first end of the plurality of ribs is coupled to the curved temple arm housing and a second end of the plurality of ribs collectively forms a planar mounting surface for at least one electronic component of the set of electronic components.

10. The temple arm of claim 9, wherein the curved temple arm housing includes a plurality of alignment points, each alignment point of the plurality of alignment points positioned at a distinct corner of the planar mounting surface, wherein the plurality of alignment points identify a location for coupling the at least one electronic component of the set of electronic components to the curved temple arm housing.

11. The temple arm of claim 1, further comprising:
one or more ear pads, wherein the one or more ear pads are configured to couple with the curved temple arm housing adjacent to the speaker.

12. The temple arm of claim 1, wherein the set of electronic components further includes:

a printed circuit board (PCB) for receiving data from a microphone or providing data to the speaker, wherein the PCB is shaped to fit to within the head shaped curvature of the curved temple arm housing.

13. The temple arm of claim 1, wherein the set of electronic components further includes:

a proximity sensor;

a temperature sensor; or an inertial measurement unit (IMU).

14. A pair of augmented-reality glasses, comprising:

a temple arm, wherein the temple arm includes:

a curved temple arm housing configured to couple to a frame of a pair of augmented-reality (AR) glasses, the curved temple arm housing having a head shaped curvature to contour a portion of a user's head;

a set of electronic components, wherein each of the set of electronic components are coupled within the head shaped curvature of the curved temple arm housing, the set of electronics including:

a speaker, wherein the speaker is internal to the curved temple arm housing;

only one front battery cell; and only one rear battery cell, wherein the speaker is positioned adjacent to a user's ear and between the only one front battery cell and the only one rear battery cell; and an input device configured to control one or more electronic components positioned within the frame of the pair of AR glasses.

15. The pair of augmented-reality glasses of claim 14, further comprising:

a hinge mount disposed at a front-end portion of the curved temple arm housing, wherein the front-end portion of the curved temple arm housing is adjacent to the only one front battery cell; and a hinge assembly coupled to the curved temple arm housing via the hinge mount, wherein, the hinge assembly is configured to couple the curved temple arm housing to the frame of the pair of AR glasses, and the hinge assembly includes:

one or more channels for routing one or more wires for communicatively coupling the set of electronic components with the electronic components positioned within the frame of the pair of AR glasses.

16. The pair of augmented-reality glasses of claim 15, wherein the set of electronic components includes at least one electronic component configured to provide power to the electronics within the frame of the pair of glasses.

17. The pair of augmented-reality glasses of claim 15, wherein:

the hinge assembly includes a plurality of alignment ribs configured to align the coupling of the hinge assembly with the hinge mount; and the plurality of alignment ribs define a predetermined gap for an adhesive to be received.

18. A method of manufacture, comprising:

providing a temple arm, wherein the temple arm includes:

a curved temple arm housing having a head shaped curvature to contour a portion of a user's head;

a set of electronic components, wherein each of the set of electronic components are coupled within the head shaped curvature of the curved temple arm housing, the set of electronics including:

a speaker, wherein the speaker is internal to the curved temple arm housing;

only one front battery cell; and only one rear battery cell, wherein the speaker is positioned adjacent to a user's ear and between the only one front battery cell and the only one rear battery cell; and an input device configured to control one or more electronic components positioned within a frame of a pair of AR glasses; and coupling the temple arm to the frame of the pair of augmented-reality (AR) glasses.

19. The method of manufacture of claim 18, wherein the curved temple arm housing further includes:

a hinge mount disposed at a front-end portion of the curved temple arm housing, wherein the front-end portion of the curved temple arm housing is adjacent to the only one front battery cell;

a hinge assembly coupled to the curved temple arm housing via the hinge mount, wherein, the hinge assembly is configured to couple the curved temple arm housing to the frame of the pair of AR glasses, and the hinge assembly includes:

one or more channels for routing one or more wires for communicatively coupling the set of electronic components with the electronic components positioned within the frame of the pair of AR glasses.

20. The method of manufacture of claim 18, wherein the set of electronic components includes at least one electronic component configured to provide power to the electronics within the frame of the pair of glasses.

* * * * *